United States Patent
Nomura et al.

(10) Patent No.: US 11,849,216 B2
(45) Date of Patent: Dec. 19, 2023

(54) IMAGING APPARATUS DETECTING A PUPIL IN MOVING AND STILL IMAGES

(71) Applicant: SONY GROUP CORPORATION, Tokyo (JP)

(72) Inventors: Kazunori Nomura, Tokyo (JP); Seiichi Inomata, Tokyo (JP); Kanako Yana, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 18 days.

(21) Appl. No.: 17/625,022

(22) PCT Filed: Jun. 12, 2020

(86) PCT No.: PCT/JP2020/023242
§ 371 (c)(1),
(2) Date: Jan. 5, 2022

(87) PCT Pub. No.: WO2021/010070
PCT Pub. Date: Jan. 21, 2021

(65) Prior Publication Data
US 2022/0264005 A1     Aug. 18, 2022

(30) Foreign Application Priority Data

Jul. 12, 2019   (JP) ................... 2019-130101

(51) Int. Cl.
*H04N 23/667* (2023.01)
*H04N 23/67* (2023.01)
(Continued)

(52) U.S. Cl.
CPC ......... *H04N 23/667* (2023.01); *H04N 23/611* (2023.01); *H04N 23/635* (2023.01); *H04N 23/67* (2023.01)

(58) Field of Classification Search
CPC .. H04N 23/667; H04N 23/611; H04N 23/635; H04N 23/67; H04N 23/633;
(Continued)

(56) References Cited

U.S. PATENT DOCUMENTS

2010/0214431 A1   8/2010  Watanabe
2012/0147252 A1   6/2012  Kunishige
(Continued)

FOREIGN PATENT DOCUMENTS

JP        2010-230870 A    10/2010
JP        2012163588 A     8/2012
(Continued)

OTHER PUBLICATIONS

International Search Report dated Sep. 8, 2020 in PCT/JP2020/023242 filed on Jun. 12, 2020, 2 pages.

*Primary Examiner* — Gevell V Selby
(74) *Attorney, Agent, or Firm* — Oblon, McClelland, Maier & Neustadt, L.L.P.

(57) ABSTRACT

An imaging apparatus includes: a detection unit that detects a pupil in a captured image; an autofocus control unit that executes a pupil autofocus control to perform autofocus on the pupil detected by the detection unit according to a predetermined operation in a still image capturing mode, and executes a pupil autofocus control when the pupil is detected by the detection unit in a moving image capturing mode; and a display control unit that performs a control to display a pupil frame indicating the pupil that is in focus on the captured monitor image when focusing is achieved by the pupil autofocus control.

18 Claims, 28 Drawing Sheets

(51) Int. Cl.
*H04N 23/611* (2023.01)
*H04N 23/63* (2023.01)

(58) Field of Classification Search
CPC .... H04N 23/672; H04N 23/675; H04N 23/60;
G02B 7/08; G02B 7/28; G03B 13/36;
G03B 15/00; G03B 17/18; G03B 17/20
See application file for complete search history.

(56) References Cited

U.S. PATENT DOCUMENTS

| | | | |
|---|---|---|---|
| 2014/0104483 A1* | 4/2014 | Kunishige | H04N 23/635 |
| | | | 348/349 |
| 2017/0289441 A1* | 10/2017 | Zhang | G06V 40/165 |
| 2019/0094655 A1* | 3/2019 | Ego | H04N 23/51 |
| 2019/0116311 A1 | 4/2019 | Sato | |
| 2019/0116312 A1 | 4/2019 | Funatsu | |
| 2019/0116318 A1 | 4/2019 | Ogawa | |
| 2019/0349515 A1* | 11/2019 | Shimosato | H04N 23/611 |

FOREIGN PATENT DOCUMENTS

| | | |
|---|---|---|
| JP | 2012-185516 A | 9/2012 |
| JP | 2014-56169 A | 3/2014 |
| JP | 2015-111746 A | 6/2015 |
| JP | 2019-75699 A | 5/2019 |
| JP | 2019-75719 A | 5/2019 |

\* cited by examiner

FIG. 18
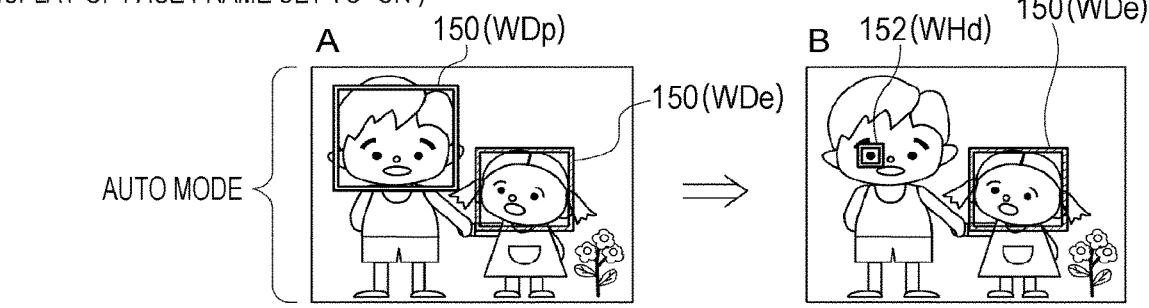
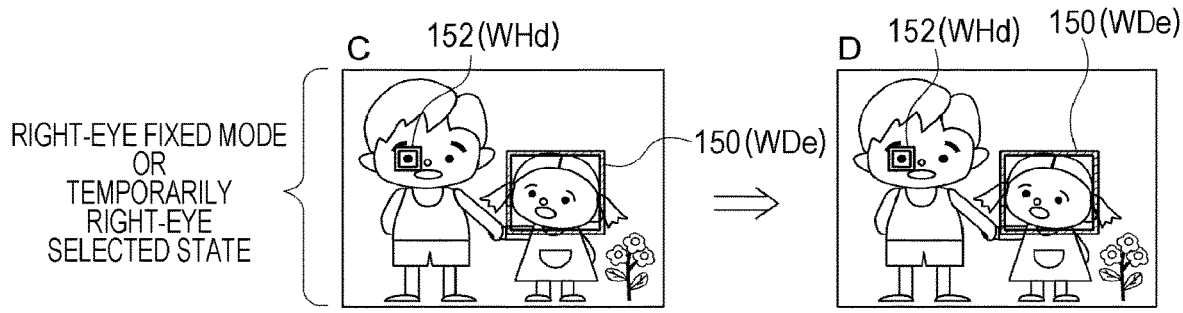
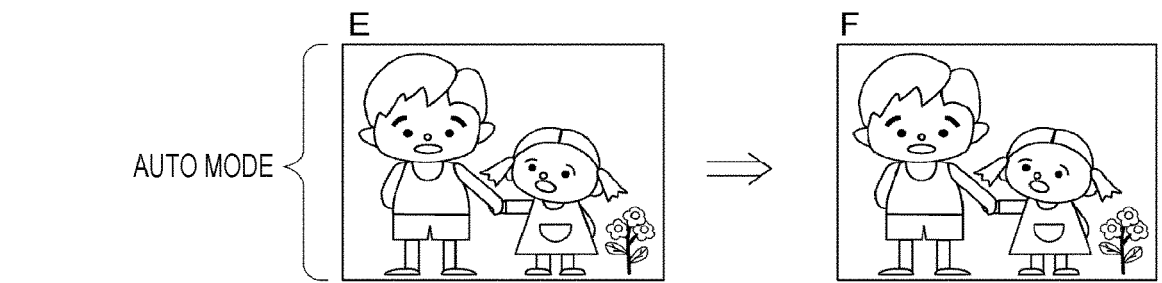
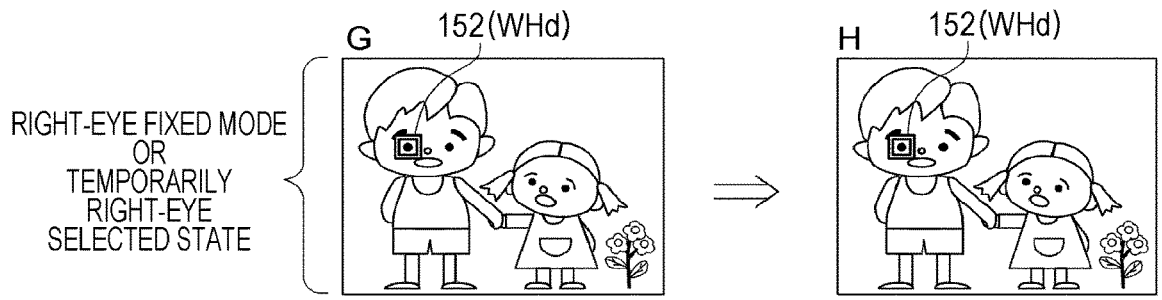

IMAGING APPARATUS DETECTING A PUPIL IN MOVING AND STILL IMAGES

TECHNICAL FIELD

The present technology relates to an imaging apparatus, an imaging method, and a program, and particularly, to an autofocus operation and a display related to the autofocus operation.

BACKGROUND ART

Autofocus is a function widely adopted in the field of imaging apparatus, and there is an imaging apparatus in which an autofocus operation is performed, for example, by half-pressing a shutter button.

Furthermore, in recent years, autofocus is performed on a target subject while tracking the subject using a technology for analyzing a captured image or recognizing a subject.

Patent Document 1 below describes a technology related to an autofocus operation and a tracking operation.

CITATION LIST

Patent Document

Patent Document 1: Japanese Patent Application Laid-Open No. 2015-111746

SUMMARY OF THE INVENTION

Problems to be Solved by the Invention

Meanwhile, there has recently been provided an imaging apparatus, such as a digital camera, in which a still image capturing mode and a moving image capturing mode are prepared, so that a user can selectively capture a still image or a moving image.

However, an appropriate autofocus operation and an appropriate condition for presenting information to the user may not need to coincide between the still image capturing mode and the moving image capturing mode.

Therefore, the present disclosure proposes a technology for performing an appropriate autofocus and display control in the still image capturing mode and in the moving image capturing mode.

Solutions to Problems

An imaging apparatus according to the present technology includes: a detection unit that detects a pupil in a captured image; an autofocus control unit that executes a pupil autofocus control to perform autofocus on the pupil detected by the detection unit according to a predetermined operation in a still image capturing mode, and executes a pupil autofocus control when the pupil is detected by the detection unit in a moving image capturing mode; and a display control unit that performs a control to display a pupil frame indicating the pupil that is in focus on the captured monitor image when focusing is achieved by the pupil autofocus control.

The autofocus control is performed on the pupil detected on the captured image, e.g., a human pupil or an animal pupil. In this case, the control is performed in a different way between the still image capturing mode and the moving image capturing mode.

In the imaging apparatus according to the present technology, in the still image capturing mode, the display control unit may perform the control to display a pupil focus frame as the pupil frame when focusing is achieved by the pupil autofocus control, and in the moving image capturing mode, the display control unit may perform the control to display a pupil detection frame, which is in a different display form from the pupil focus frame, as the pupil frame when focusing is achieved by the pupil autofocus control.

The pupil focus frame and the pupil detection frame refer to pupil frames displayed in different forms, and it is not strictly defined under what conditions and at what timings the respective pupil frames are displayed.

As an example, the pupil focus frame is a pupil frame displayed to indicate to the user that the pupil is in a focus-in state.

The pupil detection frame is a pupil frame presented to the user at least in a state where the pupil is detected. That is, the pupil detection frame may be displayed even before the pupil is in focus, or may be displayed in a state where the pupil is in focus.

In the imaging apparatus according to the present technology, in the still image capturing mode, when the pupil autofocus control has been performed according to the predetermined operation, the display control unit may perform the control to display no pupil frame until focusing is achieved.

That is, in the still image capturing mode, the pupil frame is displayed after focusing is achieved during the autofocus on the pupil.

In the imaging apparatus according to the present technology, the pupil detection frame and the pupil focus frame may be displayed in different colors.

For example, the pupil detection frame is a white pupil frame, and the pupil focus frame is a green pupil frame, with a difference in color.

In the imaging apparatus according to the present technology, the predetermined operation may be a half-pressing operation of a shutter button.

In the still image capturing mode, the pupil autofocus control is initiated by half-pressing the shutter button.

In the imaging apparatus according to the present technology, a mode related to the pupil autofocus control may be selectable between an auto mode in which it is automatically set which one of left and right pupils is to be a target for the pupil autofocus control and a fixed mode in which a pupil designated by a user operation is set as a target for the pupil autofocus control; and in the moving image capturing mode, when the pupil is not in focus during the pupil autofocus control, the display control unit may perform the control to display no pupil frame in the auto mode and display the pupil frame in the fixed mode.

For example, as the fixed mode, one or both of a right-eye fixed mode in which the pupil autofocus control is performed with the right pupil selected by the user operation as the target and a left-eye fixed mode in which the pupil autofocus control is performed with the left pupil selected by the user operation as the target are assumed.

In the moving image capturing mode, the pupil autofocus control is performed when the pupil is detected, but at a stage before focusing is achieved, the pupil frame is displayed or not displayed depending on the mode related to the pupil autofocus control.

In the imaging apparatus according to the present technology, in the auto mode, a temporarily selected state may be settable, so that the pupil autofocus control is performed with the target temporarily fixed to the pupil designated by the user operation; and in the moving image capturing mode, when the pupil is not in focus during the pupil autofocus control, the display control unit may perform the control to display the pupil frame in the temporarily selected state.

Even in the auto mode, the target for the pupil autofocus control can be temporarily fixed. For example, a temporarily right-eye selected state can be set, so that the pupil autofocus control is performed with the target temporarily fixed to the right pupil by the user operation, and a temporarily left-eye selected state can be set, so that the pupil autofocus control is performed with the target temporarily fixed to the left pupil by the user operation.

In this case, the display of the pupil frame is similar to that in the fixed mode.

In the imaging apparatus according to the present technology, in the moving image capturing mode, when the pupil autofocus control has been performed, the display control unit may perform the control to display a pupil detection frame as the pupil frame until focusing is achieved, and display a pupil focus frame, which is in a different display form from the pupil detection frame, as the pupil frame when focusing is achieved.

That is, in the moving image capturing mode, the pupil frame is switched from the pupil detection frame to the pupil focus frame between before and after focusing is achieved during the autofocus on the pupil.

In the imaging apparatus according to the present technology, an on/off setting may be selectable as to whether to display a face frame when a face is detected by the detection unit; and in the moving image capturing mode, the display control unit may perform the control as to whether to display a face frame depending on whether the on setting or the off setting is selected.

For example, the user can arbitrarily set the on/off setting as to whether to display a face frame.

In the imaging apparatus according to the present technology, a mode related to the pupil autofocus control may be selectable between an auto mode in which it is automatically set which one of left and right pupils is to be a target for the pupil autofocus control and a fixed mode in which a pupil designated by a user operation is set as a target for the pupil autofocus control; and in a case where the off setting is selected as to whether to display a face frame, the display control unit may perform the control to display no face frame in the auto mode, and display the pupil frame while displaying no face frame when the pupil is detected, regardless of whether or not focusing is achieved, in the fixed mode.

In the moving image capturing mode, in a case where the off setting is selected as to whether to display a face frame, although no face frame is displayed, a condition under which the pupil frame is displayed is different depending on the mode.

In the imaging apparatus according to the present technology, in the auto mode, a temporarily selected state may be settable, so that the pupil autofocus control is performed with the target temporarily fixed to the pupil designated by the user operation; and in a case where the off setting is selected as to whether to display a face frame, in the temporarily selected state, when the pupil is detected, the display control unit may perform the control to display the pupil frame while displaying no face frame, regardless of whether or not focusing is achieved.

Even in the auto mode, the target for the pupil autofocus control can be temporarily fixed to the right pupil or the left pupil. In this case, when the off setting is selected as to whether to display a face frame, the display of the pupil frame is similar to that in the fixed mode.

In the imaging apparatus according to the present technology, in a case where the off setting is selected as to whether to display a face frame, in the auto mode, when the pupil is in focus, the display control unit may perform the control to display the pupil frame while displaying no face frame.

Even in the auto mode, the pupil frame is displayed on the condition that focusing is achieved.

In the imaging apparatus according to the present technology, as one mode related to the pupil autofocus control, an auto mode may be selectable to automatically set which one of left and right pupils is to be a target for the pupil autofocus control; in the auto mode, a temporarily selected state may be settable, so that the pupil autofocus control is performed with the target temporarily fixed to a pupil designated by a user operation; in the still image capturing mode, the temporarily selected state may be released according to a release operation for giving an instruction to record a still image; and in the moving image capturing mode, the temporarily selected state may be released according to an operation different from the release operation.

For example, the temporarily selected state is released by the release operation using a shutter button in the still image capturing mode, and is released by operating another operation element such as an enter button in the moving image capturing mode.

In the imaging apparatus according to the present technology, in the still image capturing mode, according to an operation for giving an instruction to operate autofocus on the pupil, the autofocus control unit may initiate the pupil autofocus control based on the detection of the pupil in the entire captured image, and the display control unit may display a pupil focus frame as the pupil frame when focusing is achieved; and in the moving image capturing mode, according to the operation, the autofocus control unit may switch an autofocus control with a face as a target to the pupil autofocus control based on the detection of the pupil in the entire captured image, and the display control unit may display a pupil detection frame as the pupil frame when the pupil is detected.

For example, the user can perform an operation for giving an instruction for the pupil autofocus control using a predetermined operation element.

In the imaging apparatus according to the present technology, a touch operation may be detectable on a screen where the captured monitor image is displayed; in the still image capturing mode, the autofocus control unit may perform the pupil autofocus control by tracking the pupil according to the touch operation; and in the moving image capturing mode, the autofocus control unit may perform the pupil autofocus control with respect to the pupil selected after tracking a face according to the touch operation.

For example, tracking is initiated when the user touches a face portion or the like on the display unit.

In the imaging apparatus according to the present technology, in the still image capturing mode, when the touch operation is performed on the face in the captured monitor image, the autofocus control unit may perform the pupil autofocus control to track the pupil on a side close to a touch location; and when the touch operation is performed on a portion other than the face in the captured monitor image, the autofocus control unit may track a face close to a touch location and perform an autofocus control with respect to the face.

For example, a tracking target is selected according to a location touched by the user on the display unit.

An imaging method performed by an imaging apparatus according to the present technology includes: detection processing for detecting a pupil in a captured image; autofocus control processing for executing a pupil autofocus control to perform autofocus on the pupil detected in the detection processing according to a predetermined operation in a still image capturing mode, and executing a pupil autofocus control when the pupil is detected in the detection processing in a moving image capturing mode; and display control processing for displaying a pupil frame indicating the pupil that is in focus on the captured monitor image when focusing is achieved by the pupil autofocus control.

As a result, an appropriate autofocus control and an appropriate display control for the user are realized for each of the still image capturing mode and the moving image capturing mode.

A program according to the present technology causes an arithmetic processing device, for example, an arithmetic processing device in the imaging apparatus, or the like to execute processing corresponding to the imaging method.

As a result, the autofocus control and the display control according to the present disclosure can be executed by various imaging apparatuses.

BRIEF DESCRIPTION OF DRAWINGS

FIG. 18 is an explanatory diagram of an example in which a frame is displayed in a moving image capturing mode according to a third embodiment.

MODE FOR CARRYING OUT THE INVENTION

Figure 1:
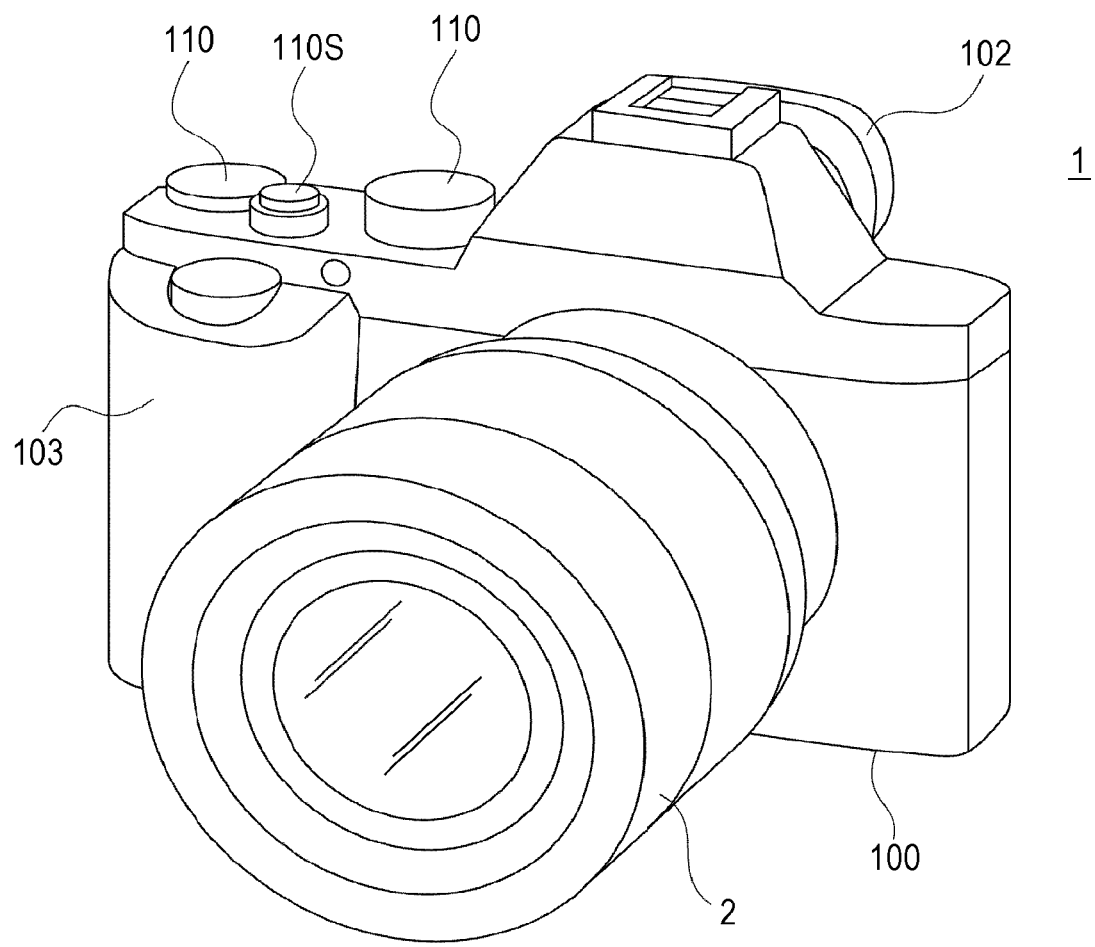
FIG. 1 is a perspective view of an external appearance of an imaging apparatus according to an embodiment of the present technology.

Hereinafter, embodiments will be described in the following order.

<1. Configuration of Imaging Apparatus>
<2. Transition of Pupil AF Mode>
<3. First Embodiment>
<4. Second Embodiment>
<5. Third Embodiment>
<6. Fourth Embodiment>
<7. Fifth Embodiment>
<8. Sixth Embodiment>
<9. Conclusion and Modifications>

Note that, in the present disclosure, the term "autofocus" will also be referred to as "AF".

In addition, basic operation modes of an imaging apparatus include a "still image capturing mode" and a "moving image capturing mode".

The "still image capturing mode" is an operation mode in which the imaging apparatus captures/records a still image. For example, in the still image capturing mode, an image of a subject is displayed on a display unit as a captured monitor image (so-called through image), such that a user can confirm the subject. Then, when the user performs a shutter button operation (release operation), still image data is recorded.

The "moving image capturing mode" is an operation mode in which the imaging apparatus captures/records a moving image. For example, in the moving image capturing mode as well, an image of a subject is displayed on the display unit as a captured monitor image, such that the user can confirm the subject.

Then, in a standby state as the moving image capturing mode, when the user performs a recording initiation operation, moving image recording is initiated, and when the user performs a recording stop operation, moving image recording is terminated.

In addition, when the user performs a recording initiation operation in the still image capturing mode, this may be considered as the moving image capturing mode, and moving image recording may be initiated.

In addition, "pupil AF" refers to a control and an operation for performing AF with a pupil of a person or the like as a target. The control is also referred to as "pupil AF control", and the operation is also referred to as "pupil AF operation".

Here, the "pupil AF control" refers to processing in which an AF control unit 52, which will be described later, generates and transmits a control signal for driving a focus lens with a pupil as a target on the basis of a distance measurement result or the like.

The "pupil AF operation" indicates an overall AF operation targeting the pupil, including the pupil AF control and the operation of the focus lens driven thereby.

Note that a control and an operation for performing AF with a face as a target may be referred to as "face AF" to be distinguished from the pupil AF.

Modes for the pupil AF include an "auto mode", a "right-eye fixed mode", and a "left-eye fixed mode".

The "auto mode" is a mode for performing autofocus targeting a pupil, and is a mode for automatically performing AF targeting a pupil on an appropriate side according to a direction of a face or the like.

The "right-eye fixed mode" is a mode selected, for example, on the basis of a user's operation, and is a mode for performing AF targeting a pupil of a right eye (which may also be referred to as "right pupil").

The "left-eye fixed mode" is a mode selected, for example, on the basis of a user's operation, and is a mode for performing AF targeting a pupil of a left eye (which may also be referred to as "left pupil").

Note that the term "fixed mode" is a generic term for "right-eye fixed mode" and "left-eye fixed mode", and refers to one or both of "right-eye fixed mode" and "left-eye fixed mode".

In the embodiments, it is exemplified that, as a state in the auto mode, an AF target can be temporarily fixed by stopping the automatic selection of the left or right pupil.

A state in which the right eye (the pupil of the right eye) is temporarily selected fixedly as an AF target during the auto mode will be referred to as a "temporarily right-eye selected state", and a state in which the left eye (the pupil of the left eye) is temporarily selected fixedly as an AF target during the auto mode will be referred to as a "temporarily left-eye selected state".

In addition, the term "temporarily selected state" is a generic term for "temporarily right-eye selected state" and "temporarily left-eye selected state", and refers to one or both of "temporarily right-eye selected state" and "temporarily left-eye selected state".

In a case where it is assumed that the imaging apparatus can be operated in such a temporarily selected state, the "auto mode" covers the "temporarily selected state" in a broad sense, and does not cover the "temporarily selected state" in a narrow sense. That is, the auto mode in the narrow sense is a mode for automatically setting which one of the left and right pupils the pupil AF control will target.

On the other hand, in a case where it is not assumed that the imaging apparatus can be operated in the temporarily selected state, the "auto mode" in the broad sense is not different from that in the narrow sense.

<1. Configuration of Imaging Apparatus>

Figure 2:
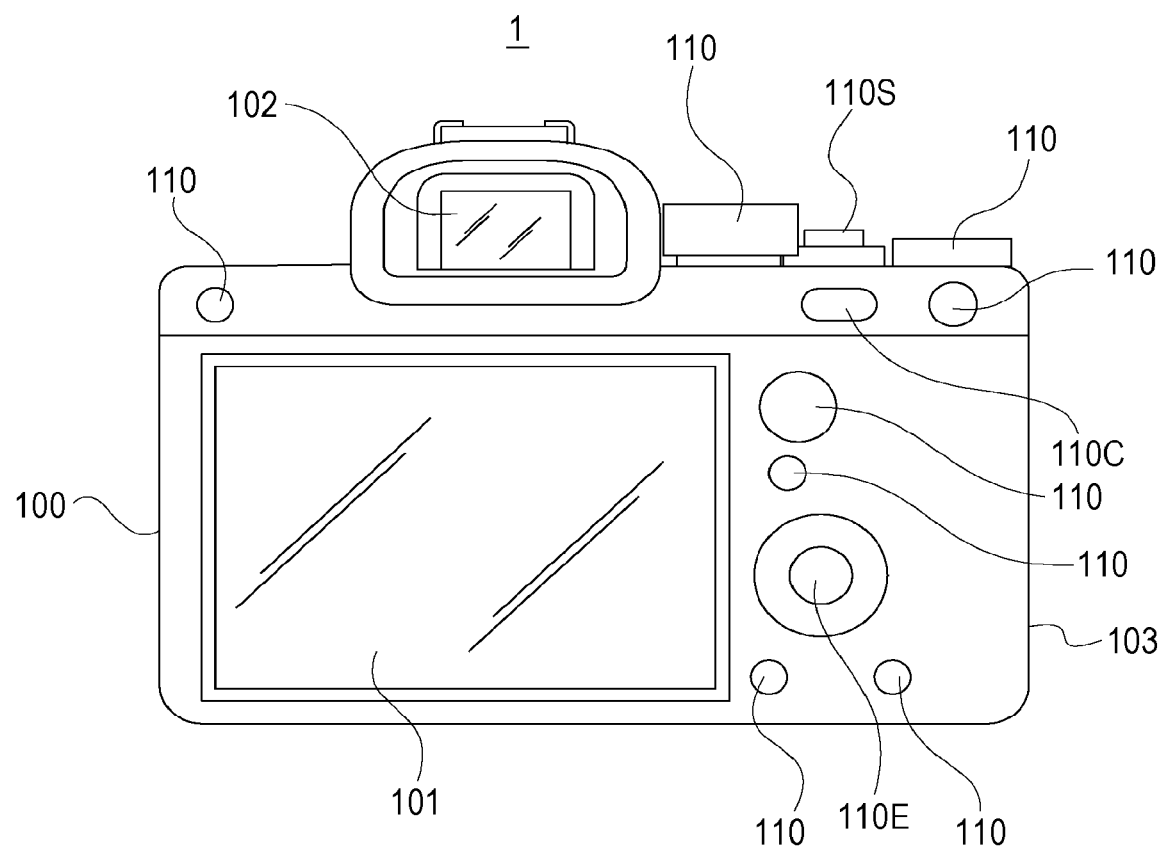
FIG. 2 is a rear view of the imaging apparatus according to the embodiment.

FIG. 1 illustrates a front perspective view of an imaging apparatus 1 according to an embodiment, and FIG. 2 illustrates a rear view of the imaging apparatus 1. Here, the imaging apparatus 1 is a so-called digital still camera which is capable of capturing either a still image or a moving image by switching an imaging mode.

Note that, in the present embodiment, the imaging apparatus 1 is not limited to the digital still camera, and may be a video camera that is mainly used for capturing a moving image and is also capable of capturing a still image.

In the imaging apparatus 1, a lens barrel 2 is disposed on a front side of a main body housing 100 constituting a camera main body, or is detachable.

A display panel 101, e.g., a display device such as a liquid crystal display (LCD) or an organic electro-luminescence (EL) display, is provided on a rear side (a side facing a user) of the imaging apparatus 1.

In addition, a display unit formed using an LCD, an organic EL display, or the like is also provided as a viewfinder 102. The viewfinder 102 is not limited to an electronic viewfinder (EVF), and may be an optical viewfinder (OVF).

The user can visually recognize images and various types of information through the display panel 101 and the viewfinder 102.

Although both the display panel 101 and the viewfinder 102 are provided in the imaging apparatus 1 in this example, the imaging apparatus 1 is not limited thereto. Only one of the display panel 101 and the viewfinder 102 may be provided, or both or one of the display panel 101 and the viewfinder 102 may be detachable.

Various operation elements 110 are provided on the main body housing 100 of the imaging apparatus 1.

For example, the operation elements 110 are provided in various forms, such as a key, a dial, and a combined press/rotation operation element, to realize various operation functions. For example, a menu operation, a reproduction operation, a mode selection operation, a focus operation, a zoom operation, an operation for selecting a parameter such as a shutter speed or an F value, and the like can be performed. Although each of the operation elements 110 is not described in detail, a shutter button 110S, an assignable button 110C, and an enter button 110E among the operation elements 110 are particularly illustrated in the present embodiment.

The shutter button 110S is used for a shutter operation (release operation) or an AF operation based on half pressing.

For example, in the still image capturing mode, the AF operation is initiated by half-pressing the shutter button 110S.

The assignable button 110C is an operation element that is also called a custom button, and is a button to which the user can assign an arbitrary operation function.

In the present embodiment, an operation function for giving an instruction for pupil AF may be assigned to the assignable button 110C, such that the assignable button 110C is used as a pupil AF operation button.

In addition, an operation function for switching between "auto mode", "right-eye fixed mode", and "left-eye fixed mode" may be assigned to the assignable button 110C, such that the assignable button 110C is used as a mode switching operation button.

In addition, an operation function for shifting to the "temporarily right-eye selected state" or "temporarily left-eye selected state" in the "auto mode" may be allocated to the assignable button 110C, such that the assignable button 110C is used as a state switching operation button in the auto mode.

Note that the number of assignable buttons 110C is not limited to one, and a plurality of assignable buttons 110C may be provided. For example, three assignable buttons 110C to which the respective functions described above are allocated may be provided.

In addition, the operation element for each of the functions described above may be formed as an operation element installed in advance for exclusive use, rather than the assignable button 110C.

The enter button 110E is a button used for various determination operations. For example, the enter button 110E is used for an option determination operation on a menu screen.

In the present embodiment, it will be described later as an example that an operation function for releasing the temporary fixation from the "temporarily right-eye selected state" or the "temporarily left-eye selected state" and returning to the normal (narrow-sense) auto mode is allocated to the enter button 110E.

The shutter button 110S is disposed on an upper right surface of the main body housing 100, and can be pressed, for example, by an index finger of a right hand in a state where the user holds a grasping unit 103 with the right hand.

In addition, the assignable button 110C is disposed, for example, at an upper portion on the rear side of the main body housing 100 as illustrated in FIG. 2, and can be pressed by the user with a thumb of the right hand.

That is, the shutter button 110S and the assignable button 110C are disposed at positions to be operable with the index finger and the thumb when the user holds the main body housing 100 by grasping the grasping unit 103 with the right hand, that is, can be pressed either individually or simultaneously in an arbitrary manner.

Note that the shutter button 110S and the assignable button 110C are not necessarily limited to being operable simultaneously with one hand. For example, the shutter button 110S may be pressed with the right hand, and the assignable button 110C may be operated with the left hand.

To this end, although not illustrated, the assignable button 110C may be provided, for example, on the lens barrel 2.

Figure 3:
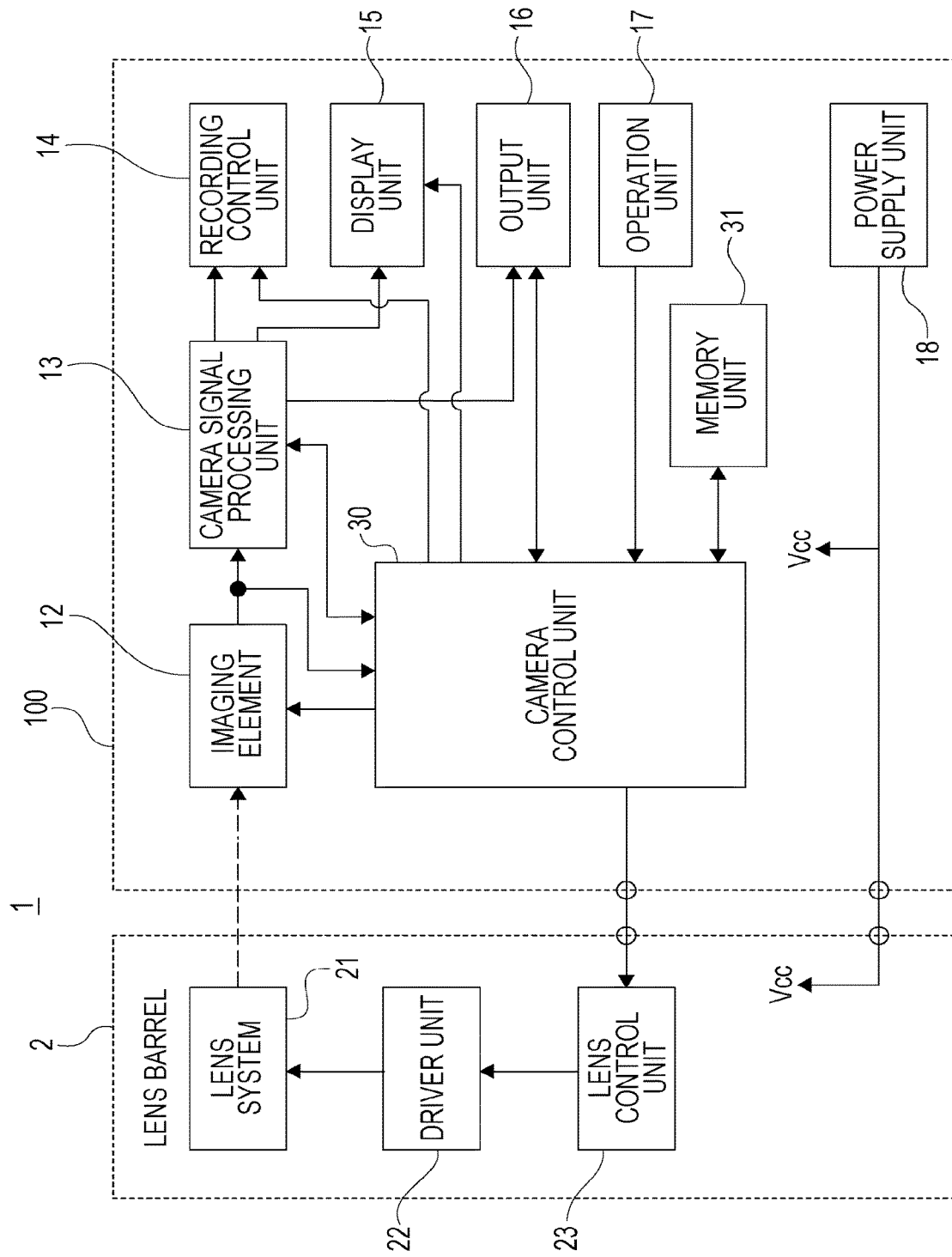
FIG. 3 is a block diagram of an internal configuration of the imaging apparatus according to the embodiment.

FIG. 3 illustrates an internal configuration of the imaging apparatus 1 including the lens barrel 2. Note that, although an example in which the imaging apparatus 1 is divided into the main body housing 100 and the lens barrel 2 will be described here, a portion corresponding to the lens barrel 2 may be integrated with the main body housing 100.

The imaging apparatus 1 includes an imaging element (image sensor) 12, a camera signal processing unit 13, a recording control unit 14, a display unit 15, an output unit 16, an operation unit 17, a power supply unit 18, a camera control unit 30, and a memory unit 31 in the main body housing 100.

The lens barrel 2 includes a lens system 21, a driver unit 22, and a lens control unit 23.

The lens system 21 in the lens barrel 2 includes lenses, such as a zoom lens and a focus lens, and an aperture mechanism. Light (incident light) from a subject is guided and condensed on the imaging element 12 by the lens system 21.

The imaging element 12 is configured, for example, in a charge coupled device (CCD) type, a complementary metal oxide semiconductor (CMOS) type, or the like.

The imaging element 12 executes, for example, correlated double sampling (CDS) processing, automatic gain control (AGC) processing, and the like with respect to an electrical signal obtained by photoelectrically converting received light, and further performs analog/digital (A/D) conversion processing. Then, an imaging signal as digital data is output to the camera signal processing unit 13 and the camera control unit 30 for the subsequent stage.

The camera signal processing unit 13 is configured as an image processing processor by, for example, a digital signal processor (DSP) or the like. The camera signal processing unit 13 performs various types of signal processing with respect to a digital signal (captured image signal) from the imaging element 12. For example, the camera signal processing unit 13 performs preprocessing, synchronization processing, YC generation processing, resolution conversion processing, codec processing, and the like as a camera process.

In the preprocessing, processing for clamping black levels of R, G, and B to predetermined levels, processing for correction between R, G, and B color channels, and the like are performed with respect to the captured image signal from the imaging element 12.

In the synchronization processing, color separation processing is performed so that image data for each pixel has all R, G, and B color components. For example, in a case where the imaging element uses a Bayer-array color filter, demosaic processing is performed as the color separation processing.

In the YC generation processing, a luminance (Y) signal and a color (C) signal are generated (separated) from the R, G, and B image data.

In the resolution conversion processing, the resolution conversion processing is executed with respect to the image data subjected to the various types of signal processing.

The recording control unit 14 performs recording and reproduction with respect to a recording medium, e.g., a nonvolatile memory. For example, the recording control unit 14 performs processing for recording an image file MF such as moving image data or still image data, a thumbnail image, or the like with respect to the recording medium.

Actual forms of the recording control unit 14 may be various. For example, the recording control unit 14 may be configured as a flash memory and a write/read circuit thereof built in the imaging apparatus 1, or may be in a form of a card recording and reproduction unit accessing a recording medium that can be attached to and detached from the imaging apparatus 1, e.g., a memory card (portable flash memory or the like), for recording and reproduction. Alternatively, as a form built in the imaging apparatus 1, the recording control unit 14 may be realized by a hard disk drive (HDD) or the like.

The display unit 15 is a display unit performing various displays for an imaging person, and specifically represents the display panel 101 and the viewfinder 102 illustrated in FIG. 2.

The display unit 15 executes various displays on a display screen on the basis of instructions from the camera control unit 30. For example, the display unit 15 displays a reproduced image of the image data read from the recording medium by the recording control unit 14. In addition, the image data of the captured image whose resolution has been converted for a display by the camera signal processing unit 13 is supplied to the display unit 15. In response to an instruction from the camera control unit 30, the display unit 15 displays a so-called through image (captured monitor image based on subject light received by the imaging element 12) by performing a display on the basis of the image data of the captured image.

In addition, the display unit 15 displays various operation menus, icons, messages, and the like, as a graphical user interface (GUI), on the screen on the basis of instructions from the camera control unit 30.

The output unit 16 performs data communication and network communication with an external device in a wired or wireless manner.

For example, the output unit 16 outputs the captured image data (still image file or moving image file) for transmission to an external display device, recording device, reproduction device, or the like.

In addition, the output unit 16 may serve as a network communication unit performing communication via various networks, e.g., the Internet, a home network, and a local area network (LAN), so that various kinds of data are transmitted and received to and from servers, terminals, and the like on the networks.

The operation unit 17 collectively represents input devices for the user to perform various operation inputs. Specifically, the operation unit 17 refers to various operation elements 110 (including the shutter button 110S, the assignable button 110C, and the enter button 110E) provided in the main body housing 100.

A user's operation is detected by the operation unit 17, and a signal according to the input operation is transmitted to the camera control unit 30.

As the operation unit 17, not only the operation elements 110 but also a touch panel may be used. For example, the touch panel may be formed on the display panel 101, and various operations may be available by operating the touch panel using icons, menus, and the like displayed on the display panel 101.

Alternatively, the operation unit 17 may detect a user's tap operation or the like through a touch pad or the like.

Furthermore, the operation unit 17 may be configured as a reception unit of an external operation device such as a separate remote controller.

The power supply unit 18 generates a power supply voltage Vcc required for each unit from, for example, a battery loaded inside, and supplies the generated power supply voltage Vcc as an operating voltage.

The power supply unit 18 is configured to supply a power supply voltage Vcc to a circuit in the lens barrel 2 as well, in a state where the lens barrel 2 is attached to the imaging apparatus 1.

Note that the power supply unit 18 may be formed with a circuit charging a battery using a DC voltage, which is input after being converted by an AC adapter connected to a commercial AC power supply, as a power source or a circuit generating a power supply voltage Vcc.

The camera control unit 30 is constituted by a microcomputer (arithmetic processing device) including a central processing unit (CPU).

The memory unit 31 stores information and the like used for processing by the camera control unit 30. The memory unit 31 as illustrated comprehensively represents, for example, a read only memory (ROM), a random access memory (RAM), a flash memory, and the like.

The memory unit 31 may be a memory area built in a microcomputer chip as the camera control unit 30 or may be constituted by a separate memory chip.

The camera control unit 30 controls the imaging apparatus 1 and the lens barrel 2 overall by executing programs stored in the ROM, the flash memory, and the like of the memory unit 31.

For example, the camera control unit 30 controls a required operation of each unit, such as a control of a shutter speed of the imaging element 12, an instruction to the camera signal processing unit 13 to process various signals, an imaging operation or a recording operation according to a user's operation, an operation for reproducing a recorded image file, an operation of the lens system 21 such as zooming, focusing, and aperture adjustment in the lens barrel 2, or a user interface operation. Regarding the aperture adjustment, the camera control unit 30 performs a variable control of F value according to a user operation or gives an instruction for an F value for an automatic control (automatic iris).

The RAM in the memory unit 31 is used to temporarily store data, programs, and the like as a work area at the time of processing of various data by the CPU of the camera control unit 30.

The ROM and the flash memory (nonvolatile memory) in the memory unit 31 are used for storing an operating system (OS) for the CPU to control each unit, content files such as image files, application programs for various operations, firmware, and the like.

In a state where the lens barrel 2 is attached to the main body housing 100, the camera control unit 30 communicates with the lens control unit 23 to gives various instructions.

In the lens barrel 2, for example, a microcomputer is mounted as the lens control unit 23, enabling various data communications with the camera control unit 30. In the present embodiment, the camera control unit 30 instructs the lens control unit 23 to drive the zoom lens, the focus lens, the aperture mechanism, or the like. According to the drive instruction, the lens control unit 23 causes the driver unit 22 to operate the lens system 21.

Note that the camera control unit 30 and the lens control unit 23 are configured to execute wired communication therebetween in a state where the lens barrel 2 is attached to the main body housing 100. However, the camera control unit 30 and the lens control unit 23 may be configured to be able to perform wireless communication therebetween.

The driver unit 22 includes, for example, a motor driver for a motor driving the zoom lens, a motor driver for a motor driving the focus lens, a motor driver for a motor of the aperture mechanism, and the like.

According to an instruction from the lens control unit 23, a drive current is applied to a corresponding driver, and the motor driver executes a movement of the focus lens or the zoom lens, an opening or closing of an aperture blade of the aperture mechanism, or the like.

Figure 4:
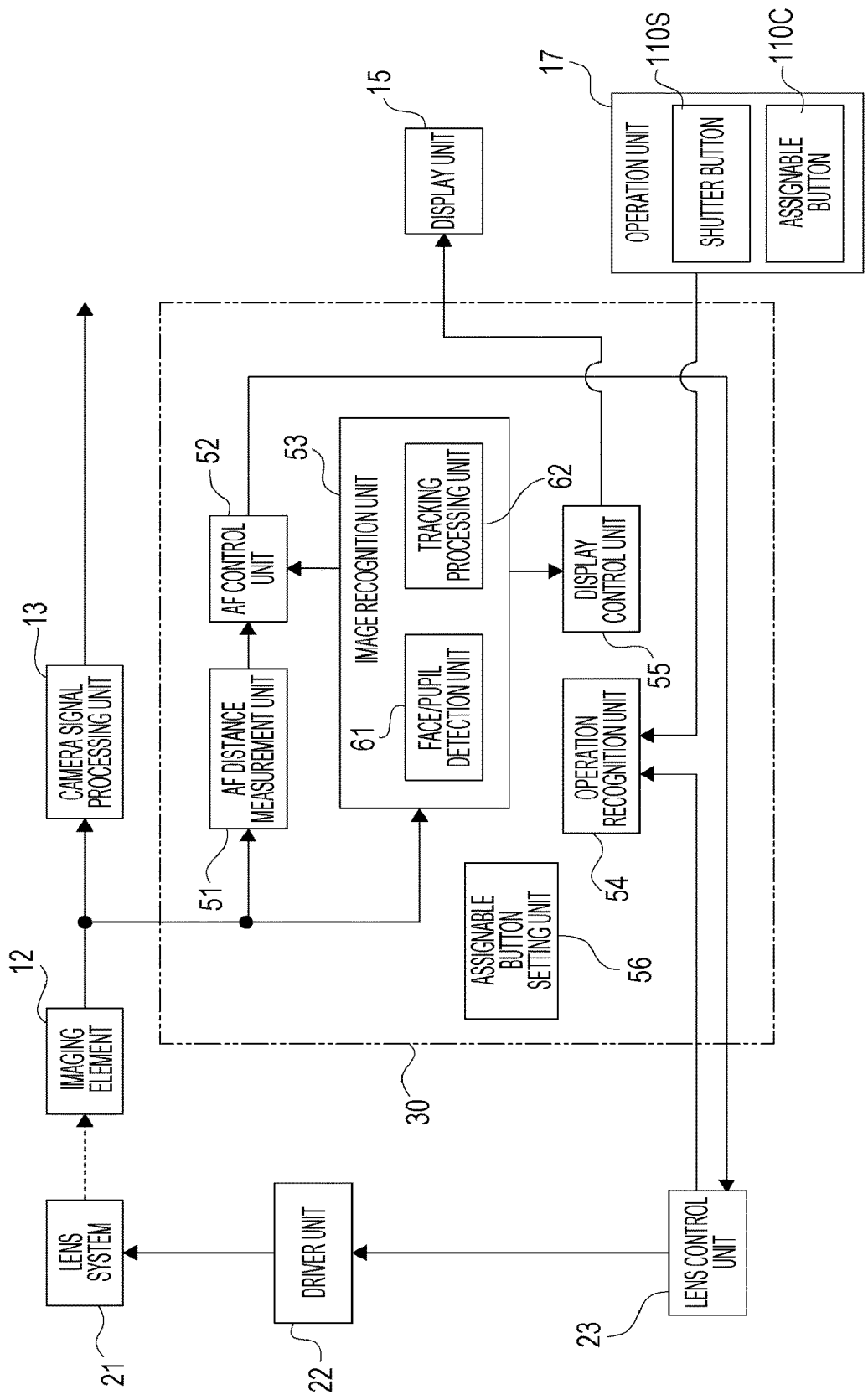
FIG. 4 is an explanatory diagram of a functional configuration of a camera control unit according to the embodiment.

FIG. 4 illustrates functions of the camera control unit 30 for performing operations in the present embodiment by extracting a part of the configuration of FIG. 3.

For the functions of the camera control unit 30, an AF distance measurement unit 51, an AF control unit 52, an image recognition unit 53, an operation recognition unit 54, a display control unit 55, and an assignable button setting unit 56 are provided.

Note that, although these functions are provided in the camera control unit 30 by software as an example for description, some or all of these functions may be provided in, for example, a DSP or a microcomputer used as the camera signal processing unit 13 or the like, or may be provided in another part, for example, a microcomputer or the like that is a chip separate from the camera control unit 30 or the camera signal processing unit 13. It is only needed to provide a configuration for performing these functions, no matter what part of the imaging apparatus 1 the configuration is provided.

The AF distance measurement unit 51 performs distance measurement processing for autofocus. For example, an arithmetic operation is performed, using an image plane phase difference pixel signal or a captured image signal obtained by the imaging element 12, for AF control in a so-called phase difference detection scheme, contrast detection scheme, hybrid AF scheme having characteristics of both the phase difference detection scheme and the contrast detection scheme, or the like.

The AF control unit 52 generates an AF control signal on the basis of a control value requested by the AF distance measurement unit 51 to perform processing for executing an AF operation. The AF control signal from the AF control unit 52 is transmitted to the lens control unit 23. Then, the lens control unit 23 causes the driver unit 22, on the basis of the AF control signal, to drive the focus lens in the lens system 21, such that the AF operation is performed.

The image recognition unit 53 performs image analysis with respect to the captured image signal obtained by the imaging element 12 for image content recognition processing. In the present embodiment, the recognition processing is performed particularly by the face/pupil detection unit 61 and the tracking processing unit 62.

The face/pupil detection unit 61 performs processing for detecting a face or a pupil of a person (or animal) as a subject in a frame of the captured image signal.

The face/pupil determination unit 61 may further determine the face of the subject. This is an example of processing for determining a region of the face of the person in the frame, and furthermore, identifying an individual from the face. For example, when a plurality of people is subjects, it is assumed that a face of a target individual is also recognized.

The tracking processing unit 62 performs processing for determining and tracking a position of a target subject in the frame of the captured image signal. Note that the target to be tracked is, for example, an AF-targeted subject. The target to be tracked may also be selected by the user (imaging person) through an operation for selecting an AF-targeted subject.

The display control unit 55 controls a display operation of the display unit 15. For example, the display control unit 55 represents control functions for displaying captured monitor images and displaying various operation menus, icons, messages, and the like on the screen.

In particular, the display control unit 55 controls a display of a face frame 150 or a pupil frame 152, which will be described later, as a display related to the pupil AF operation.

The operation recognition unit 54 recognizes an operation by the operation unit 17. The camera control unit 30 performs necessary control processing according to a user operation recognized by the operation recognition unit 54.

In particular, regarding the processing in the embodiment, the operation recognition unit 54 recognizes the user operation according to an operation of the shutter button 110S, the assignable button 110C, or the enter button 110E in the operation unit 17 or according to a touch operation detected by the touch panel provided on the display unit 15 (display panel 101 in this case).

According to the recognition of the operation, the AF control unit 52, the face/pupil detection unit 61 and the tracking processing unit 62 in the image recognition unit 53, the display control unit 55, and the like perform corresponding processing.

The assignable button setting unit 56 represents a function of setting an operation function of the assignable button 110C according to a user's setting operation.

When the operation recognition unit 54 detects the operation of the assignable button 110C, the camera control unit 30 recognizes that the operation of the assigned function has been performed on the basis of the setting of the assignable button setting unit 56.

Figure 5:
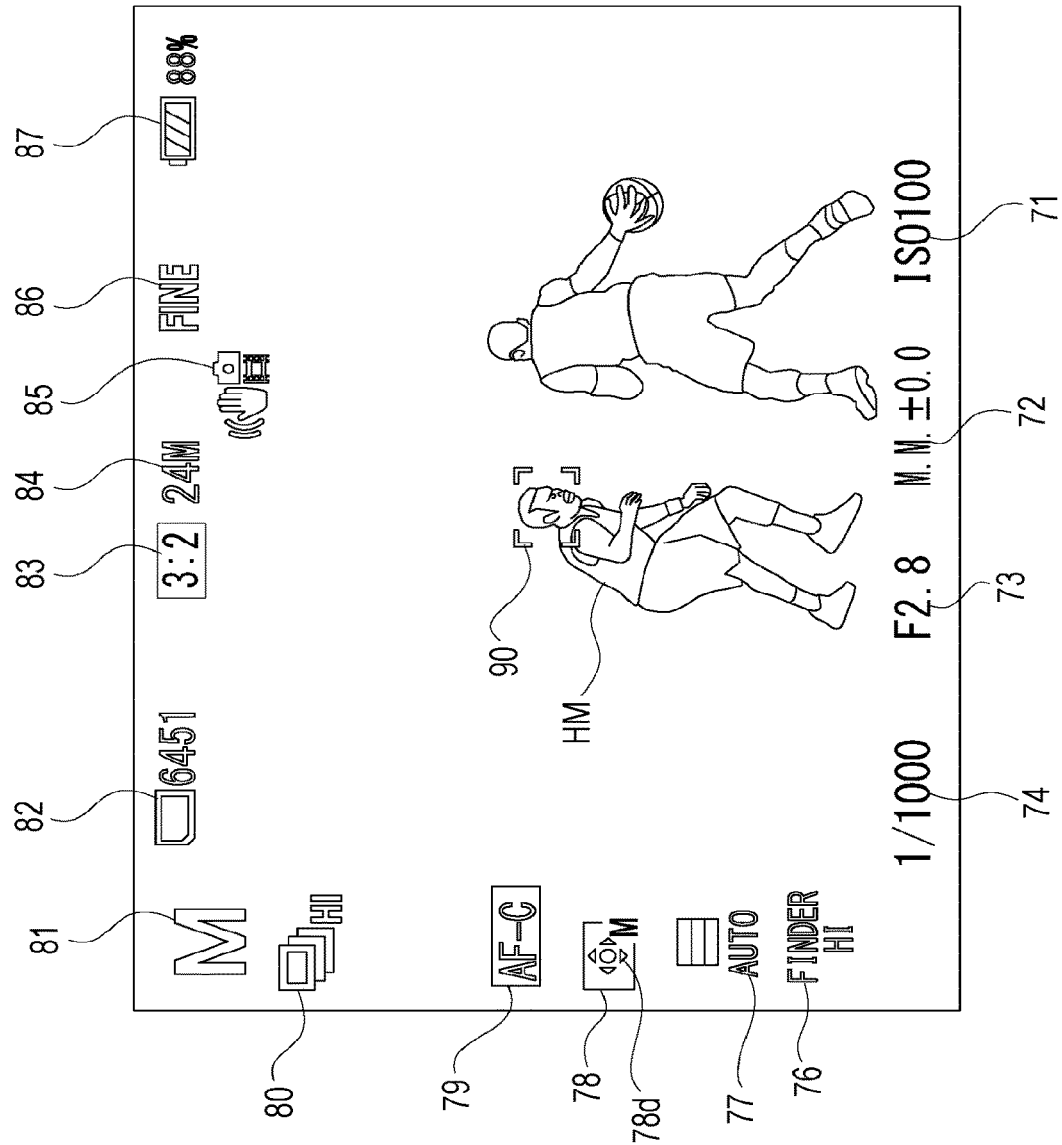
FIG. 5 is an explanatory diagram of an example of a display at the time of autofocus according to the embodiment.
Figure 6:
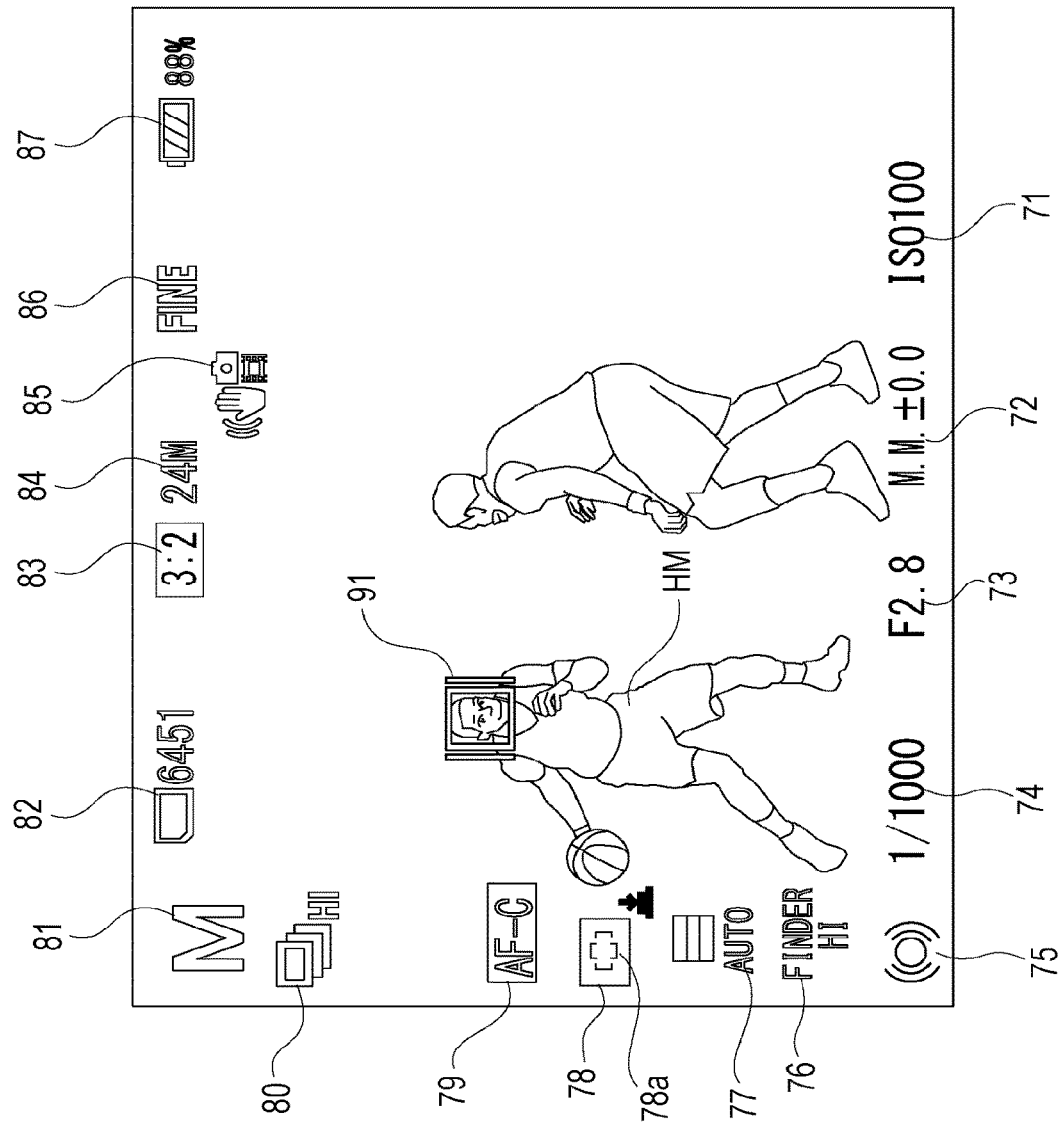
FIG. 6 is an explanatory diagram of an example of a display at the time of tracking according to the embodiment.

FIGS. 5 and 6 illustrate examples of displays on the display unit 15. In these examples, various icons are displayed to be superimposed on a captured monitor image.

In FIG. 5, a person HM is captured as a subject substantially at the center of the screen of the display unit 15 (that is, an angle of view being captured).

Here, a focus frame 90 is displayed at the center of the screen. The focus frame 90 is a frame indicating an AF target, and is a frame indicating a so-called AF distance measurement point.

A position at which the focus frame 90 is displayed varies based on various modes, and a plurality of focus frames 90 may be displayed. Here, one focus frame 90 is displayed at the center of the screen as an example.

FIG. 6 illustrates a state in which tracking is performed. For example, it is assumed that an AF control is performed with respect to a face of the person HM on the basis of the focus frame 90 of FIG. 5, and the face of the person HM is a target for tracking.

At the point of time of FIG. 6, it is assumed that the person HM is located close to the left in the screen. A tracking frame 91 is displayed for the person HM. The tracking frame 91 is displayed to follow the target subject (the face of the person HM) and overlap the subject.

In addition, as illustrated in FIGS. 5 and 6, various icons and characters/numbers indicating modes, operation states, and the like of the imaging apparatus 1 are displayed on the screen.

For example, an ISO sensitivity 71, an exposure value 72, an aperture value 73, a shutter speed 74, and a focus mark 75 are displayed at a lower portion of the screen.

Figure 7:
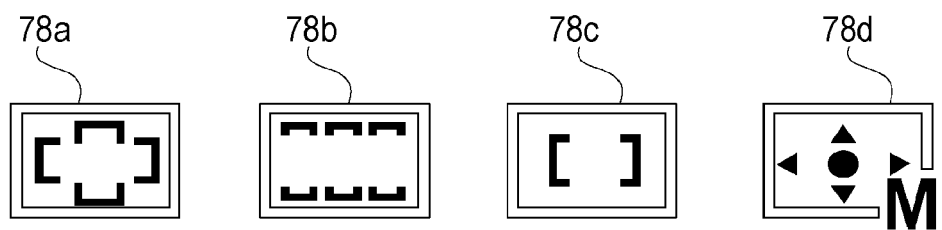
FIG. 7 is an explanatory diagram of focus area icons according to the embodiment.

The focus mark 75 indicates a focus state with respect to the target, and FIG. 7 illustrates states in which the target for tracking is in focus.

A finder frame rate 76, a shutter scheme 77, a focus area 78, a focus mode 79, a drive mode 80, and an imaging mode 81 are displayed on a left side of the screen.

The finder frame rate 76 is displayed as an icon indicating a frame rate of images displayed on the viewfinder 102.

The shutter scheme 77 is displayed as an icon indicating a mechanical shutter scheme, an electronic shutter scheme, or an auto. The auto is illustrated, and indicates a mode in which the mechanical shutter scheme and the electronic shutter scheme are automatically switched depending on an imaging situation and a shutter speed.

The focus area 78 is displayed as an icon indicating a focus area setting as an area for performing a focus control. Examples of the focus area setting include "wide", "zone", "center", and "flexible spot". Examples of icons indicating the respective focus area settings include icons 78a, 78b, 78c, and 78d illustrated in FIG. 7.

The "wide" is a focus area mode in which automatic focusing is performed with respect to an entire monitor as a through image, and is represented by, for example, the icon 78a. In FIG. 6, the icon 78a is displayed as the focus area 78.

The "zone" is a focus area mode in which, when a position of a zone desired to be focused on is selected on the monitor, automatic focusing is performed within the zone, and is represented by, for example, the icon 78b.

The "center" is a focus area mode in which automatic focusing on a subject is performed near the center of the monitor, and is represented by, for example, the icon 78c.

The "flexible spot" is a focus area mode in which the focus frame is moved to a desired location on the monitor to focus on a very small subject or a narrow area, and is represented by, for example, the icon 78d.

As described above, the icon for the focus area 78 is switched according to a focus area setting at that time.

Note that the image examples of the icons displayed as the focus areas 78 as illustrated in FIGS. 5, 6, and 7 are examples for description, and are not limited to these image designs.

As illustrated in FIGS. 5 and 6, the focus mode 79 is displayed as an icon indicating an AF operation mode. Examples of the AF operation mode include single AF (AF-S) and continuous AF (AF-C).

The single AF is a mode in which, when the shutter button 110S is half-pressed, autofocus is activated, and once focusing is achieved, the focus is fixed thereto.

The continuous AF is a mode in which, while the shutter button 110S is being half-pressed, autofocus is activated and focusing is continued. In the examples of FIGS. 5 and 6, an icon representing the continuous AF is displayed.

Regarding the pupil AF control in the present embodiment, in the still image capturing mode, the pupil AF control is performed as AF-S by half-pressing the shutter button 110S.

In addition, in the moving image capturing mode, when a pupil has been detected, the pupil AF control is continuously performed as AF-C.

The drive mode 80 illustrated in FIGS. 5 and 6 is displayed as an icon indicating one-shot imaging, consecutive imaging, bracket imaging, or the like.

The imaging mode 81 is displayed as an icon indicating an imaging mode such as "program auto", "aperture priority", "shutter speed priority", "manual exposure", "moving image", and "slow/quick motion".

In FIGS. 5 and 6, a storage medium/number of pictures 82, an aspect ratio 83, an image size 84, a camera shake correction 85, an image quality 86, and a state-of-charge of battery 87 are displayed at an upper portion of the screen.

The number of pictures saved in the recording medium, the number of pictures that can be saved, or the like is displayed as the storage medium/number of pictures 82.

An aspect ratio of an image to be captured is displayed by the aspect ratio 83.

A size of an image to be captured is displayed by the image size 84.

An on/off state and a mode of the camera shake correction function are displayed by the camera shake correction 85.

An image quality setting of an image to be captured is displayed by the image quality 86.

A state-of-charge of battery is indicated by the state-of-charge of battery 87, for example, by displaying a pattern and a percentage.

Although the various icons and the like displayed on the display unit 15 have been exemplified so far, other icons, numbers, characters, or graphics for providing various kinds of information are also displayed.

In addition, such displaying is an example.

<2. Transition of Pupil AF Mode>

An example of mode transition regarding the pupil AF will be described.

Figure 8:
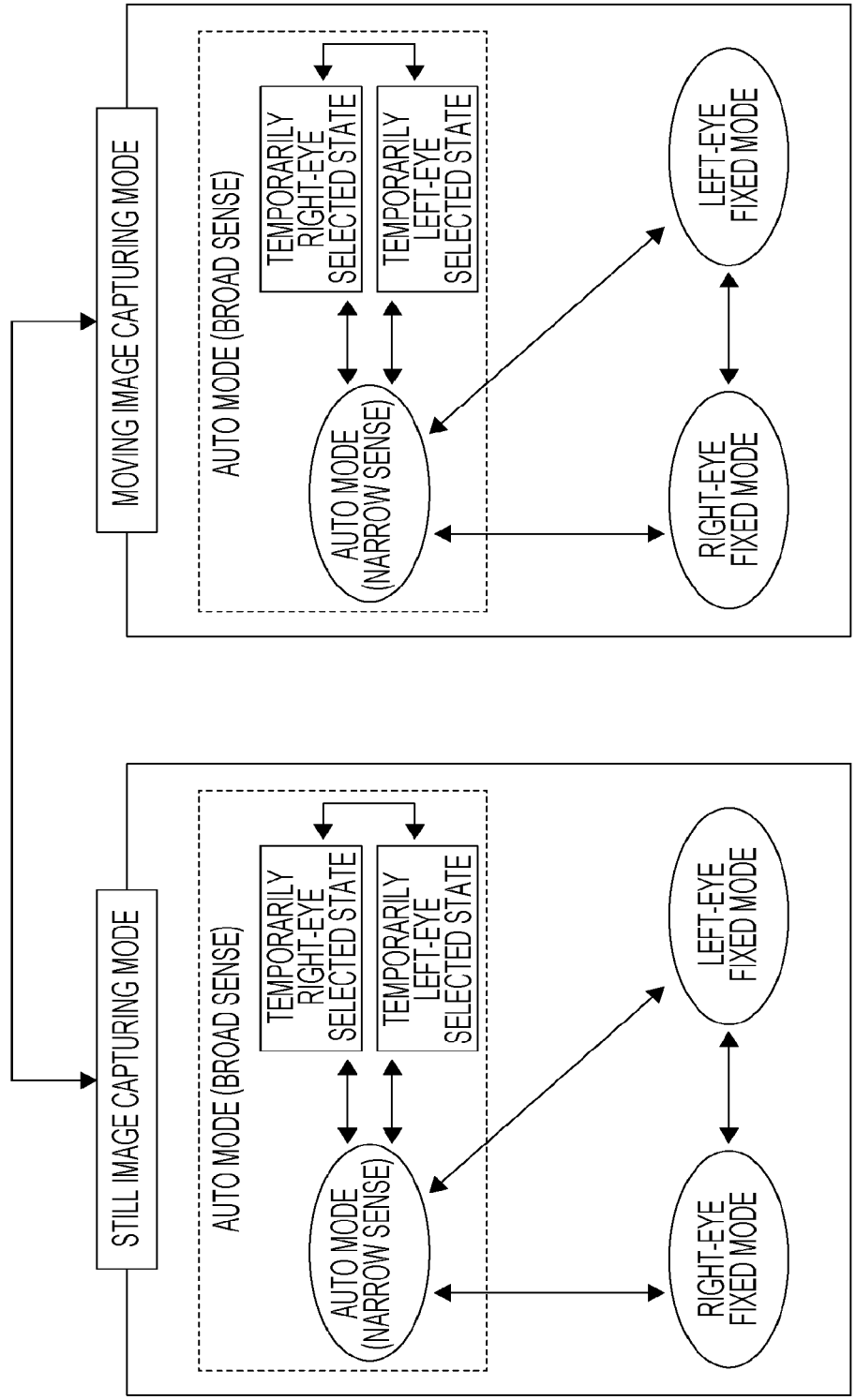
FIG. 8 is an explanatory diagram of mode transition related to pupil AF according to the embodiment.

FIG. 8 schematically illustrates an aspect of the mode transition.

As described above, the operation modes of the imaging apparatus 1 are divided largely into a still image capturing mode and a moving image capturing mode. In addition to them, there may be, for example, various setting and maintenance modes and the like, but description of modes not directly related to the pupil AF control and the UI control of the present disclosure will be omitted.

The still image capturing mode and the moving image capturing mode are switched according to a user's mode selection operation. Alternatively, the mode may be switched in another way, not by the direct mode selection operation. For example, in a case where a "record button" is provided as an operation element 110 for exclusive use, even in the still image capturing mode, a transition to the moving image capturing mode is made to initiate moving image capturing by operating the "record button", while omitting the mode selection operation.

No matter how the still image capturing mode or the moving image capturing mode is selected, the mode is selected according to a user's operation.

In each of the still image capturing mode and the moving image capturing mode, regarding the pupil AF control, there are an auto mode, a right-eye fixed mode, and a left-eye fixed mode. Each of the modes is as described above.

Note that, in FIG. 8, the "auto mode" indicates both a broad sense in which the "temporarily selected state" is included and a narrow sense in which the "temporarily selected state" is not included.

Each of the auto mode, the right-eye fixed mode, and the left-eye fixed mode is selected according to a user's operation. For example, they may be selected in order by a toggling operation using the assignable button 110C.

The temporarily right-eye selected state or the temporarily left-eye selected state can be set temporarily in the auto mode, that is, in a state where the auto mode is maintained.

When the "temporarily selected state" as the temporarily right-eye selected state or the temporarily left-eye selected state is released, the mode returns to the auto mode in the narrow sense.

In the still image capturing mode, in a case where the temporarily selected state is set during the auto mode, when the release operation is performed, for example, by using the shutter button 110S, the temporarily selected state is released, and the mode returns to the auto mode in the narrow sense. For example, during the auto mode, in a case where the user desires to capture and record a still image by focusing on either a right eye or a left eye, the user is only required to set the temporarily selected state. The temporarily selected state is released by the release operation, such that the auto mode can be continued without particularly performing another operation for returning to the auto mode.

On the other hand, in the moving image capturing mode, in a case where the temporarily selected state is set during the auto mode, there is no appropriate release timing for the release operation or the like.

Therefore, for example, in a case where the user operates the enter button 110E, this is recognized as an operation for releasing the temporarily selected state, so that the temporarily selected state is released and the mode returns to the auto mode in the narrow sense.

3. First Embodiment

A pupil AF control and a user interface (UI) display in a first embodiment will be described. The UI display is a display performed by the display unit 15 according to a control of the display control unit 55. In particular, the display of the face frame 150 and the pupil frame 152 will be mainly described below.

Furthermore, in each embodiment to be described below, the "auto mode" is basically used in the narrow sense. When the "auto mode" is used in the broad sense, an explanation or additional remark will be given each time.

Figure 9:
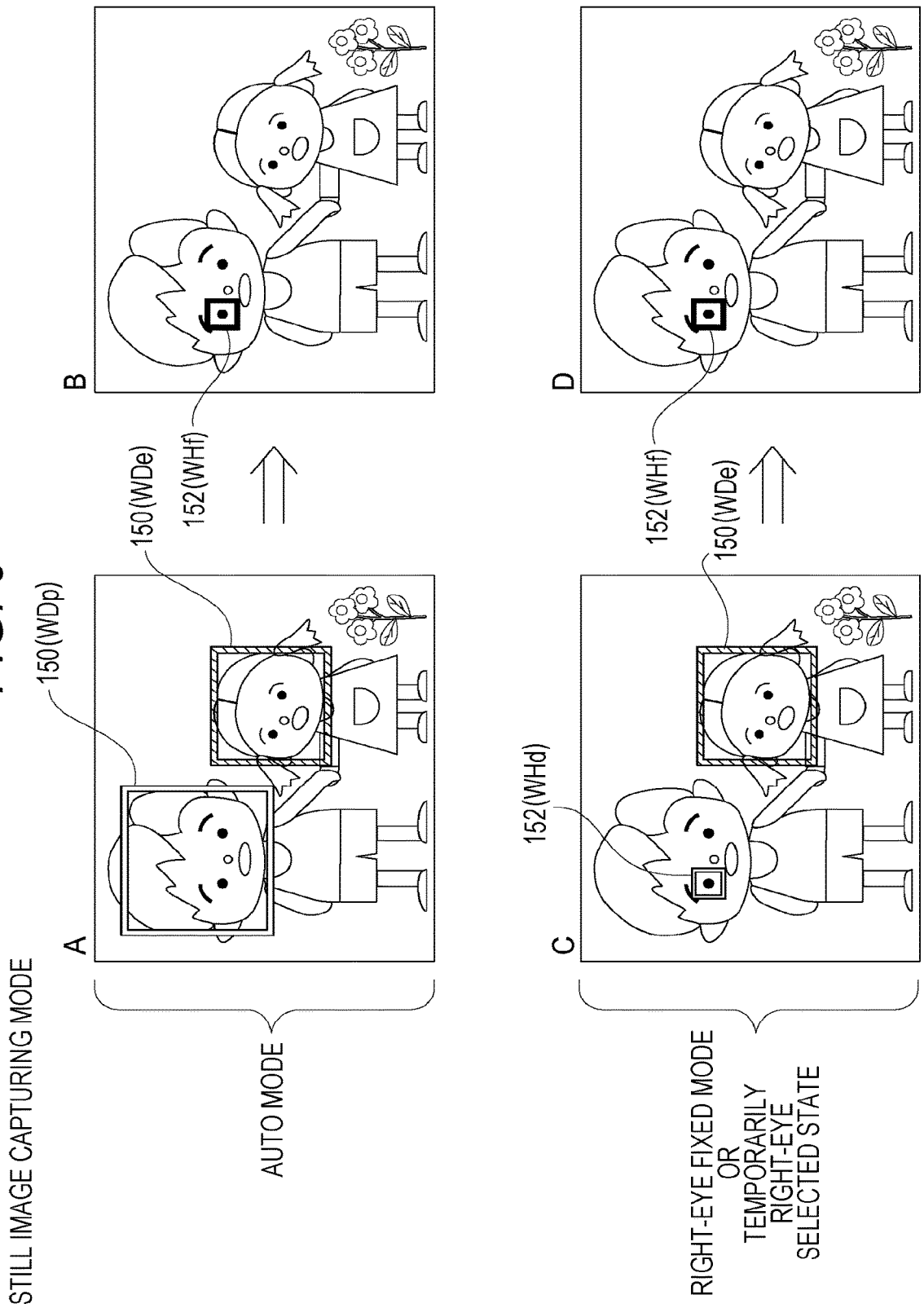
FIG. 9 is an explanatory diagram of an example in which a frame is displayed in a still image capturing mode according to a first embodiment.

FIG. 9 illustrates examples of UI displays at the time of pupil AF in the still image capturing mode.

FIG. 9A is an example of a display when a pupil has been detected in the auto mode.

FIG. 9B is an example of a display when focusing is achieved by the pupil AF in the auto mode.

FIG. 9C is an example of a display when a pupil has been detected in the right-eye fixed mode or in the temporarily right-eye selected state.

FIG. 9D is an example of a display when focusing is achieved by the pupil AF in the right-eye fixed mode or in the temporarily right-eye selected state.

Note that the left-eye fixed mode or the temporarily left-eye selected state is different from the right-eye fixed mode or the temporarily right-eye selected state only in that an eye displayed in the pupil frame 152 is a left eye, and thus illustration of examples of UI displays is omitted in each embodiment. The left-eye fixed mode or the temporarily left-eye selected state may be considered to be similar to the right-eye fixed mode or the temporarily right-eye selected state, with a difference only in whether the right eye or the left eye is involved.

As illustrated in FIG. 9A, in the auto mode, when a pupil has been detected although not in focus, a face frame 150 is displayed.

The face frame 150 is displayed for each recognized face, and a priority face and the other faces are displayed to be distinguished from each other. The priority face is a face that is preferentially AF-targeted. In a case where a plurality of faces is detected, various selection algorithms may be considered to set which one is to be a priority face. Although it is not described in detail herein, any one of the faces is set as the priority face.

The face frame 150 of the priority face is displayed, for example, as a white frame. In the drawings, reference sign "WDp" is used for the face frame 150 of the priority face.

The face frame 150 of the face other than the priority face is displayed, for example, as a gray frame. In the drawings, a hatched frame is illustrated. Reference sign "WDe" is used for the face frame 150 of the face other than the priority face (non-priority face). Of course, the color of the frame is an example.

Hereinafter, the face frame 150 may be distinguishably described as a "priority face frame WDp" or a "non-priority face frame WDe".

The pupil AF control is performed using a pupil of the priority face as a target.

In a state of FIG. 9A as a stage before focusing is achieved, even though pupils have been detected, it is not necessarily stable which one of the left and right pupils is suitable as the AF target. In the auto mode, either the pupil of the right eye or the pupil of the left eye is selected according to a predetermined algorithm and set as the AF target.

For this reason, the pupil selected as the AF target often changes between the left and right pupils according to changes in the situation of the subject, the orientation of the face, or the like. In this case, it is assumed that the position of the pupil frame 152 may frequently change between the left and right pupils in a flickering manner. Therefore, at a stage where focusing is not performed, a face frame 150 (priority face frame WDp) is displayed without displaying a pupil frame 152.

In the auto mode, if focusing is achieved by the pupil AF, then a pupil frame 152 is displayed as illustrated in FIG. 9B. As the pupil frame 152 in the present embodiment, there are a pupil focus frame WHf and a pupil detection frame WHd that are displayed in different forms. Although both are pupil frames, they are different in, for example, color. The pupil focus frame WHf is, for example, a green frame, and the pupil detection frame WHd is, for example, a white frame. Of course, the color of the frame is an example.

The pupil focus frame and the pupil detection frame refer to pupil frames displayed in different forms, and it is not strictly defined under what conditions and at what timings the respective pupil frames are displayed.

As an example, the pupil focus frame WHf is a pupil frame 152 representing a focus state.

In addition, the pupil detection frame WHd may represent a focus state, but may also be displayed even before a pupil is in focus. Therefore, the pupil detection frame WHd is a pupil frame 152 that may be displayed at least in a state where the pupil is detected.

Both the pupil focus frame WHf and the pupil detection frame WHd may be displayed in the focus state, but they are different in a process of reaching the focus state, for example, a mode or an operation related to the pupil AF.

In FIG. 9B, a pupil focus frame WHf is displayed as the pupil frame 152.

All the face frames 150 are not displayed. As a result, the pupil frame 152 is conspicuous, and the user can easily recognize that the AF control is being performed with respect to a portion corresponding to the pupil frame 152.

In the right-eye fixed mode or in the temporarily right-eye selected state, when a pupil has been be detected although not in focus, a pupil frame 152 is displayed as a pupil detection frame WHd around the pupil of the priority face without displaying a priority face frame WDp, as illustrated in FIG. 9C. The display is simplified by not displaying both the pupil detection frame WHd and the priority face frame WDp together. In addition, a non-priority face frame WDe is displayed.

In this case, the reason why the pupil frame 152 (pupil detection frame WHd) is displayed is that the AF target is fixed to the right eye, and accordingly, the pupil frame 152 does not frequently move between the left and right eyes. By displaying the pupil frame 152, it is possible to clearly indicate to the user that the pupil AF control is being performed.

If focusing is achieved by the pupil AF in the right-eye fixed mode or in the temporarily right-eye selected state, then a pupil frame 152 is displayed as illustrated in FIG. 9D. In this case, a pupil focus frame WHf is displayed as the pupil frame 152.

In addition, by not displaying all face frames 150, the pupil frame 152 is conspicuous, and the user can easily recognize that the AF control is being performed with the pupil frame 152 as a target.

Figure 10:
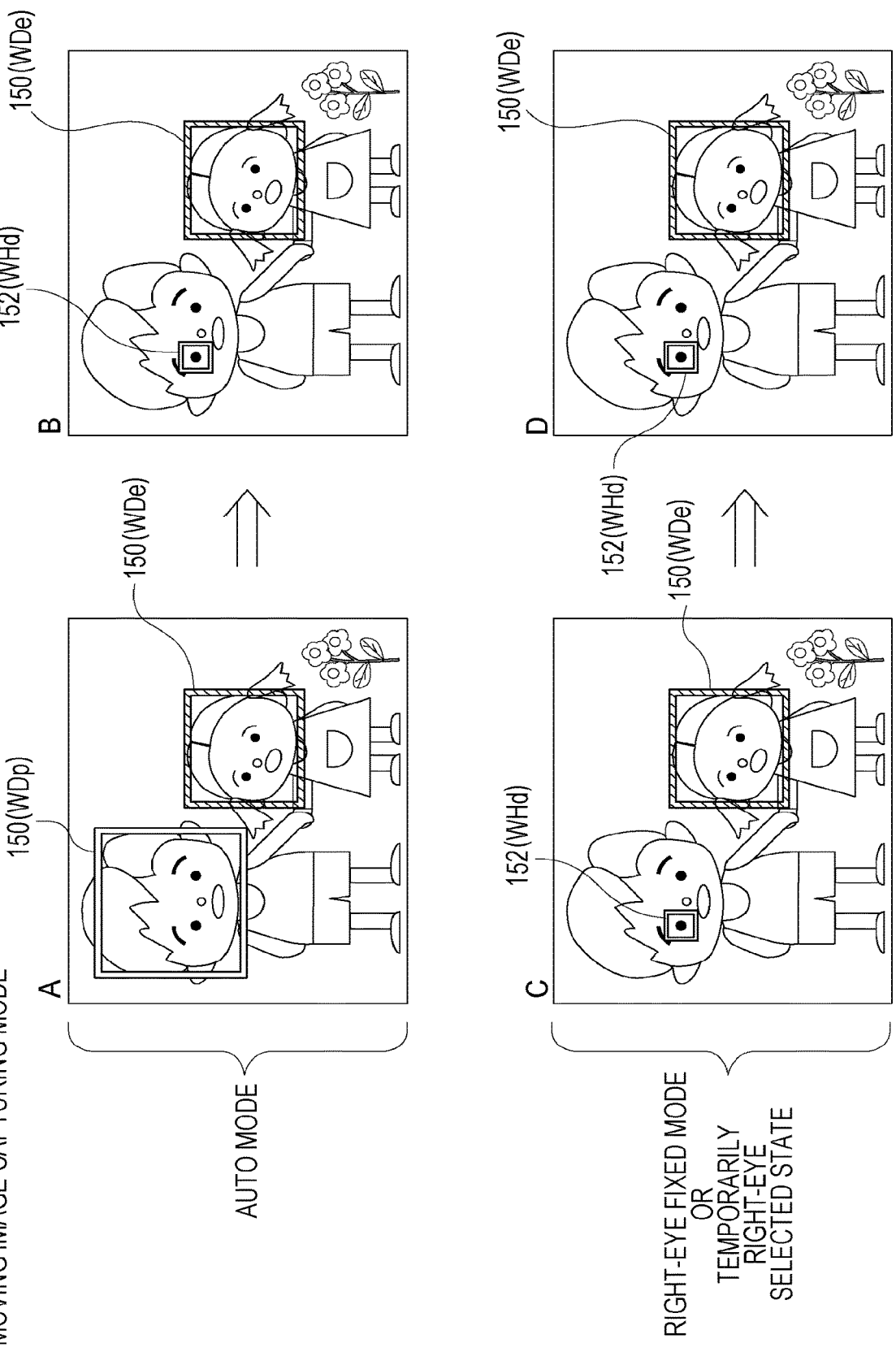
FIG. 10 is an explanatory diagram of an example in which a frame is displayed in a moving image capturing mode according to the first embodiment.

FIG. 10 illustrates examples of UI displays at the time of pupil AF in the moving image capturing mode.

FIG. 10A is an example of a display when a pupil has been detected in the auto mode.

FIG. 10B is an example of a display when focusing is achieved by the pupil AF in the auto mode.

FIG. 10C is an example of a display when a pupil has been detected in the right-eye fixed mode or in the temporarily right-eye selected state.

FIG. 10D is an example of a display when focusing is achieved by the pupil AF in the right-eye fixed mode or in the temporarily right-eye selected state.

As illustrated in FIG. 10A, in the auto mode, when pupils have been detected although not in focus, a priority face frame WDp and a non-priority face frame WDe are displayed as face frames 150.

Similarly to the still image capturing mode, at a stage before focusing is achieved in the auto mode, it is not necessarily stable which one of the left and right pupils is suitable as the AF target. For this reason, it is assumed that if a pupil frame 152 is displayed, the position thereof may frequently change between the left and right pupils in a flickering manner. Therefore, at a stage where focusing is not performed, no pupil frame 152 is displayed.

In the moving image capturing mode, the pupil AF control is continuously performed as AF-C according to the detection of the pupil, and it is usual that a period from the detection of the pupil until focusing is achieved is extremely short. Thus, the user may hardly feel uncomfortable when a face frame 150 is being displayed even during the pupil AF control.

In the auto mode, if focusing is achieved by the pupil AF, then a pupil detection frame WHd is displayed as a pupil frame 152 as illustrated in FIG. 10B. The reason why the pupil detection frame WHd is displayed, rather than a pupil focus frame WHf, is that the pupil AF control is continuously performed as AF-C in the moving image capturing mode. That is, since the AF operation is being performed at all times, the display is stabilized by displaying only the pupil detection frame WHd as the pupil frame 152. In addition, regardless of whether or not focusing is performed, the pupil detection frame WHd is displayed during the pupil AF control so as not to make the user misunderstand that focusing is not performed unless the pupil focus frame WHf is displayed.

In addition, the display is simplified by not displaying a priority face frame WDp for the priority face in which the pupil frame 152 is displayed.

In addition, a non-priority face frame WDe is displayed. However, the non-priority face frame WDe may not be displayed.

In the right-eye fixed mode or in the temporarily right-eye selected state, when a pupil has been be detected although not in focus, a pupil frame 152 is displayed as a pupil detection frame WHd around the pupil of the priority face without displaying a priority face frame WDp, as illustrated in FIG. 10C. The display is simplified by not displaying a priority face frame WDp. In addition, a non-priority face frame WDe is displayed.

In this case, the reason why the pupil frame 152 is displayed is that the AF target is fixed to the right eye, and accordingly, the pupil frame 152 does not frequently move between the left and right eyes. By displaying the pupil frame 152, it is possible to clearly indicate to the user that the pupil AF control is being performed.

It is illustrated in FIG. 10D that, when focusing is achieved by the pupil AF in the right-eye fixed mode or in the temporarily right-eye selected state, a pupil detection frame WHd is displayed as a pupil frame 152 similarly to FIG. 10C. No pupil focus frame WHf is displayed. In addition, a non-priority face frame WDe is displayed.

That is, in the moving image capturing mode, since the pupil AF control is performed as AF-C, and the pupil AF target is fixed to the right eye in the right-eye fixed mode or in the temporarily right-eye selected state, the pupil detection frame WHd is displayed around the right eye regardless of whether or not the right eye is in a focused-on state. In addition, the display is simplified by not displaying a priority face frame WDp for the priority face in which the pupil frame 152 (pupil detection frame WHd) is displayed.

For example, as in the examples of FIGS. 9 and 10 described above, the display form of the pupil frame 152 according to the situation is different between the still image capturing mode and the moving image capturing mode. In particular, as can be seen from comparison between FIGS. 9D and 10D, in the still image capturing mode, the pupil focus frame WHf is displayed as focusing is achieved by the pupil AF, but in the moving image capturing mode, the pupil detection frame WHd is continuously displayed from before focusing is achieved even after the focusing is achieved by the pupil AF.

Moreover, regarding the pupil AF operation, in the still image capturing mode, the pupil AF control is initiated as AF-S according to a user's predetermined operation, for example, by half-pressing the shutter button 110S. On the other hand, in the moving image capturing mode, when a pupil has been detected, the pupil AF control is continuously performed as AF-C.

Examples of processing for performing the pupil AF control and the display control in the still image capturing mode and in the moving image capturing mode will be described below.

Note that an example of processing to be described below based on a flowchart in each embodiment can be considered as processing by the camera control unit 30. In particular, it can be considered that the processing is performed by the AF control unit 52, the face/pupil detection unit 61, and the display control unit 55 in the camera control unit 30 according to a user operation recognized by the operation recognition unit 54.

Furthermore, in each flowchart, only processing for the pupil AF control and the display control related thereto is illustrated.

Figure 11:
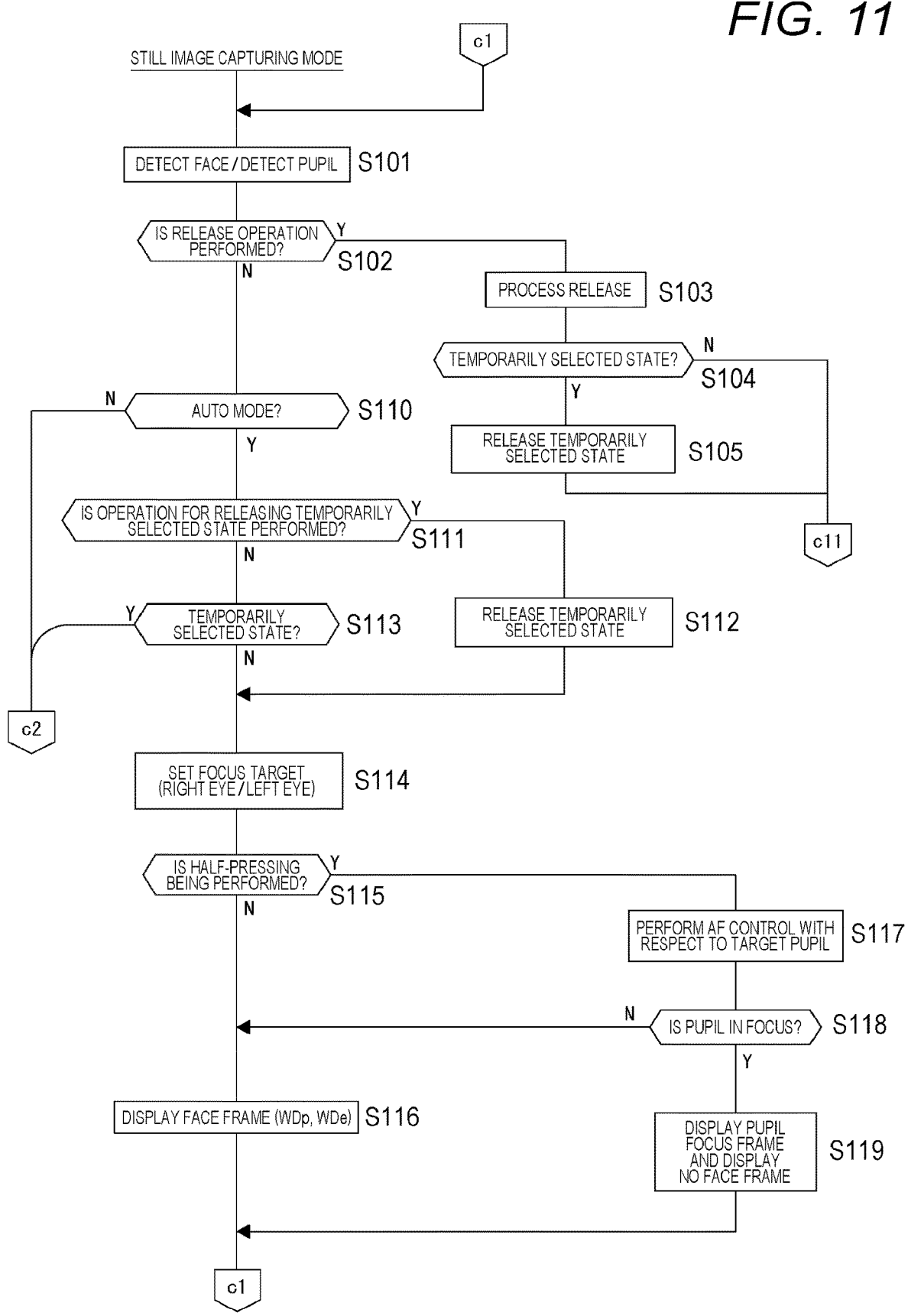
FIG. 11 is a flowchart of processing in the still image capturing mode according to the first embodiment.
Figure 12:
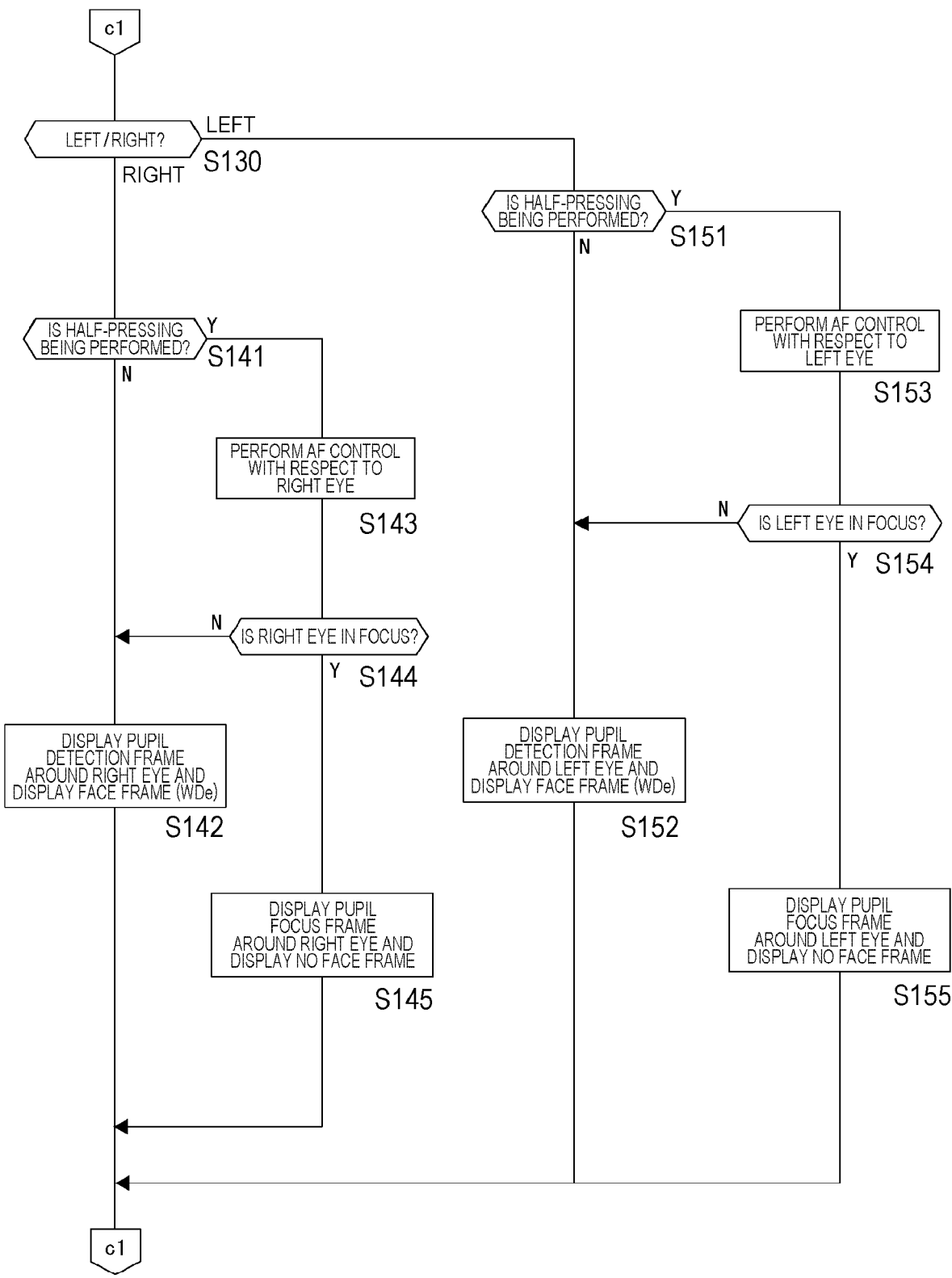
FIG. 12 is a flowchart of processing in the still image capturing mode according to the first embodiment.

FIGS. 11 and 12 illustrate an example of processing in the still image capturing mode. FIGS. 11 and 12 illustrate a chain of flowcharts separately, and connection relationships therebetween are indicated by "c1" and "c2".

The camera control unit 30 performs processing for detecting a face and a pupil in a captured image in step S101 of FIG. 11. The processing of FIGS. 11 and 12 is continuously and repeatedly performed. Thus, it can be considered that the face and pupil detection processing is being performed at all times.

Note that the following processing will be described on the premise that a pupil has been detected in step S101. When a pupil has not been detected, this is because no pupil AF control is performed in the first place.

In step S102, the camera control unit 30 monitors a release operation by the shutter button 110S. In a case where the release operation is detected, the camera control unit 30 performs release processing in step S103. That is, processing for recording a still image of a frame corresponding to an operation timing is performed.

In step S104, the camera control unit 30 checks whether or not the mode is in the temporarily selected state (temporarily right-eye selected state or temporarily left-eye selected state). If the mode is not in the temporarily selected state, the processing returns to step S101.

If the mode is in the temporarily selected state, the camera control unit 30 releases the temporarily selected state in step S105. That is, the processing returns to the auto mode in the narrow sense by returning to step S101.

When no release operation is detected, the camera control unit 30 proceeds from step S102 to step S110, and performs processing in a different way depending on whether or not the current mode is the auto mode (broad sense).

In the auto mode (broad sense), in step S111, the camera control unit 30 checks whether or not an operation for releasing the temporarily selected state has been performed?

For example, it is checked whether or not the enter button 110E has been operated in the temporarily selected state.

In a case where the operation for releasing the temporarily selected state is detected, the camera control unit 30 releases the temporarily selected state in step S112. Then, the camera control unit 30 proceeds to step S114.

Note that the processing of steps S111 and S112 may not be performed. In the still image capturing mode, since the temporarily selected state is released by the release operation as described above (steps S104 and S105), a specific operation element for releasing an operation, for example, the enter button 110E or the like, may not be operated.

When no operation for releasing the temporarily selected state is detected in step S111, the camera control unit 30 performs processing in a different way depending on whether or not the current mode is in the temporarily selected state in step S113.

In a case where the current mode is not in the temporarily selected state, that is, when the current mode is the auto mode in the narrow sense, the camera control unit 30 proceeds to step S114.

In step S114, the camera control unit 30 sets a pupil AF target in the auto mode in the narrow sense. That is, it is set which one of a pupil of a left eye and a pupil of a right eye is to be an AF target. For example, in a case where one eye has been detected for a subject of a priority face by analyzing current frame image data, a pupil of the eye is set as the AF target. In a case where both eyes have been detected for a subject of a priority face, a pupil of one eye determined to be preferable as the AF target according to a predetermined algorithm is set as the AF target.

In step S115, the camera control unit 30 determines whether or not the shutter button 110S is half-pressed to perform processing in a different way depending on the determination.

When the shutter button 110S is not half-pressed, the camera control unit 30 performs a control to display a face frame 150 in step S116, for example, as in FIG. 9A. In this case, both a priority face frame WDp and a non-priority face frame WDe are displayed.

Then, the camera control unit 30 returns to step S101.

In a case where the half-pressing is detected in step S115, the camera control unit 30 proceeds to step S117 and executes a pupil AF control with respect to the pupil set as the AF target in step S114.

In this case, the pupil AF control is performed as AF-S according to the half-pressing.

During a period in which the user continues the half-pressing, the pupil AF control is continued by repeating the processing of FIG. 11 to proceed to step S117.

During a period from the initiation of the pupil AF control until focusing is achieved, the camera control unit 30 proceeds from step S118 to step S116 and continues the control to display the face frame 150. In this case, both a priority face frame WDp and a non-priority face frame WDe are displayed.

Then, the camera control unit 30 returns to step S101.

If focusing is achieved by the pupil AF operation at a certain point of time, then the camera control unit 30 proceeds from step S118 to step S119, and performs a control to display a pupil focus frame WHf as a pupil frame 152 around a target pupil of the pupil AF as in FIG. 9B. In this case, all face frames 150 are not displayed.

Then, the camera control unit 30 returns to step S101.

In a case where the mode is not the auto mode in the broad sense, that is, when the mode is the right-eye fixed mode or the left-eye fixed mode, the processing of the camera control unit 30 proceeds from step S110 to step S130 of FIG. 12 except when the release operation is performed.

In addition, even in the auto mode in the broad sense, when the mode is in the temporarily selected state, the processing of the camera control unit 30 proceeds from step S113 of FIG. 11 to step S130 of FIG. 12.

In step S130, the processing is performed in a different way depending on whether the fixed target for the pupil AF control is a right eye or a left eye.

In a case where the right eye is a target in the right-eye fixed mode or in the temporarily right-eye selected state, the camera control unit 30 proceeds from step S130 to step S141, and determines whether or not the shutter button 110S is half-pressed to perform processing in a different way depending on the determination.

When the shutter button 110S is not half-pressed, the camera control unit 30 performs a control to display a pupil frame 152 and a non-priority face frame WDe in step S142, for example, as in FIG. 9C.

In this case, the pupil frame 152 is a pupil detection frame WHd. In addition, no priority face frame WDp is displayed.

Then, the camera control unit 30 returns to step S101.

In a case where the half-pressing is detected in step S141, the camera control unit 30 proceeds to step S143, and executes a pupil AF control with respect to the pupil of the right eye. In this case, the pupil AF control is performed as AF-S according to the half-pressing.

During a period in which the user continues the half-pressing, the pupil AF control is continued by repeating the processing of FIGS. 11 and 12 to proceed to step S143.

During a period from the initiation of the pupil AF control until focusing is achieved, the camera control unit 30 proceeds from step S144 to step S142, and performs a control to display a pupil frame 152 (pupil detection frame WHd in this case) and a non-priority face frame WDe.

Then, the camera control unit 30 returns to step S101.

When focusing is achieved by the pupil AF operation at a certain point of time, the camera control unit 30 proceeds from step S144 to step S145, and performs a control to display a focus frame WHf as a pupil frame 152 around the right pupil as in FIG. 9D. In this case, all face frames 150 are not displayed.

Then, the camera control unit 30 returns to step S101.

In a case where the left eye is a target in the left-eye fixed mode or in the temporarily left-eye selected state, the camera control unit 30 proceeds from step S130 to step S151.

Then, the camera control unit 30 determines whether or not the shutter button 110S is half-pressed to perform processing in a different way depending on the determination.

When the shutter button 110S is not half-pressed, the camera control unit 30 performs a control to display a pupil frame 152 and a non-priority face frame WDe in step S152.

In this case, the pupil frame 152 is displayed at a position of the left eye as a pupil detection frame WHd. In addition, no priority face frame WDp is displayed.

Then, the camera control unit 30 returns to step S101.

In a case where the half-pressing is detected in step S151, the camera control unit 30 proceeds to step S153, and executes a pupil AF control with respect to the left pupil. In this case as well, the pupil AF control is performed as AF-S according to the half-pressing. During a period in which the user continues the half-pressing, the pupil AF control is continued by repeating the processing of FIGS. 11 and 12 to proceed to step S153.

During a period from the initiation of the pupil AF control until focusing is achieved, the camera control unit 30 proceeds from step S154 to step S152, and performs a control to display a pupil frame 152 (pupil detection frame WHd in this case) and a non-priority face frame WDe.

Then, the camera control unit 30 returns to step S101.

If focusing is achieved by the pupil AF operation at a certain point of time, the camera control unit 30 proceeds from step S154 to step S155, and performs a control to display a focus frame WHf as a pupil frame 152 around the pupil of the left eye. In this case, all face frames 150 are not displayed.

Then, the camera control unit 30 returns to step S101.

Figure 13:
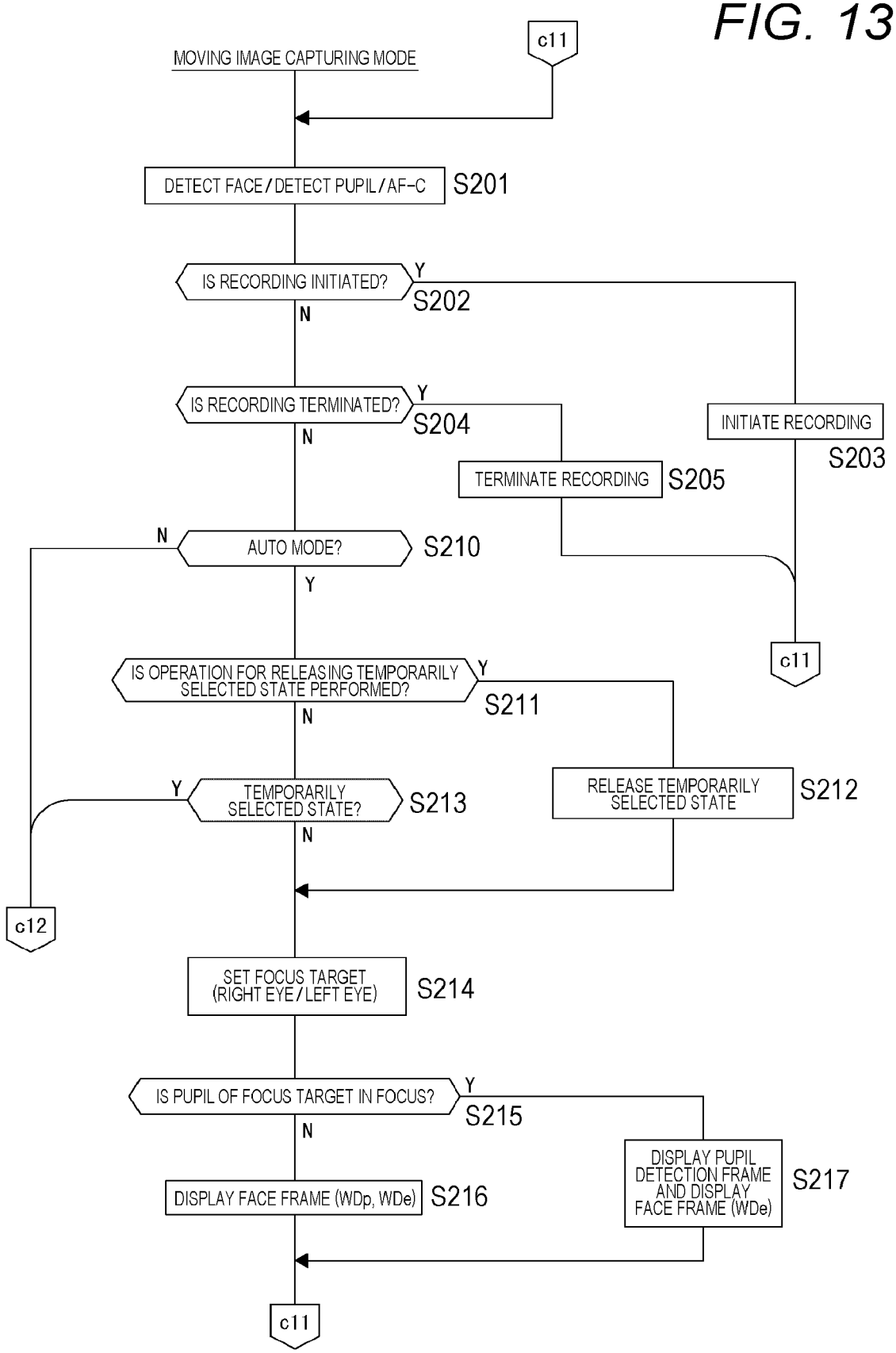
FIG. 13 is a flowchart of processing in the moving image capturing mode according to the first embodiment.
Figure 14:
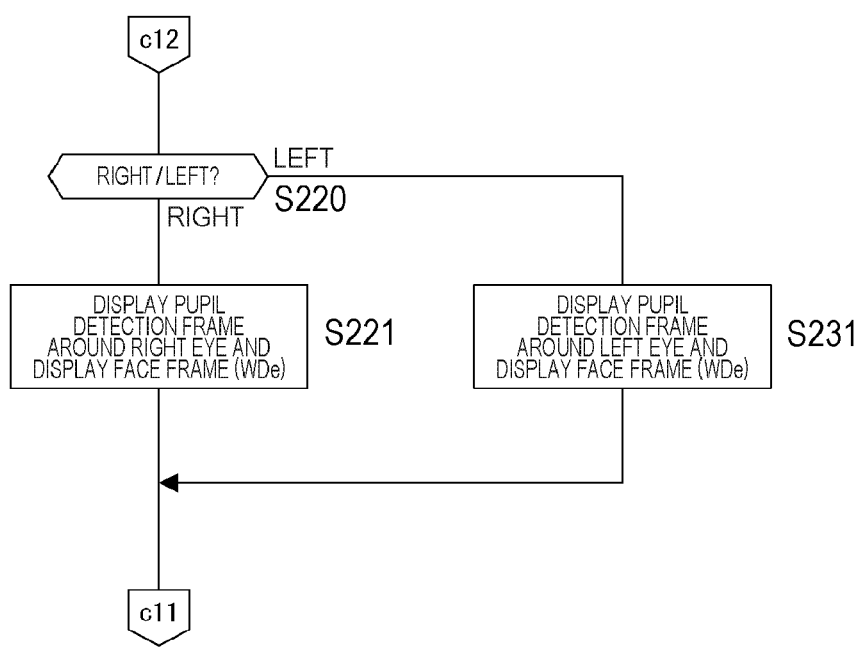
FIG. 14 is a flowchart of processing in the moving image capturing mode according to the first embodiment.

FIGS. 13 and 14 illustrate an example of processing in the moving image capturing mode. FIGS. 13 and 14 illustrate a chain of flowcharts separately, and connection relationships therebetween are indicated by "c11" and "c12".

The camera control unit 30 performs processing for detecting a face and a pupil in a captured image in step S201 of FIG. 13. In addition, the camera control unit 30 performs a pupil AF control as AF-C according to the detection of the pupil.

The processing of FIGS. 13 and 14 is continuously and repeatedly performed. Thus, it can be considered that the face and pupil detection processing is being performed at all times, and the pupil AF control is also performed according to the detection of the pupil.

Note that the following processing will be described on the premise that the detection of the pupil and the pupil AF control as AF-C corresponding thereto are performed in step S201.

In step S202, the camera control unit 30 monitors a user's recording initiation operation. In a case where the recording initiation operation is detected, the camera control unit 30 performs a control to initiate recording a moving image in step S203, and returns to step S201.

In step S204, the camera control unit 30 monitors a user's recording termination operation. In a case where the recording termination operation is detected, the camera control unit 30 performs a control to terminate recording the moving image in step S203, and returns to step S201.

The camera control unit 30 proceeds to step S210 except for a timing at which the recording initiation operation or the recording termination operation is detected, and performs processing in a different way depending on whether or not the current mode is the auto mode (broad sense).

In the auto mode (broad sense), in step S211, the camera control unit 30 checks whether or not an operation for releasing the temporarily selected state has been performed? For example, it is checked whether or not the enter button 110E has been operated in the temporarily selected state.

In a case where the operation for releasing the temporarily selected state is detected, the camera control unit 30 releases the temporarily selected state in step S212. Then, the camera control unit 30 proceeds to step S214.

In the moving image capturing mode, it is preferable that the temporarily selected state is released by the processing of steps S211 and S212. This is because, in the moving image capturing mode, it is not possible to determine an appropriate timing for releasing the temporarily selected state like the release operation in the still image capturing mode. Therefore, a specific operation element, for example, the enter button 110E or the like, is provided to the user as a release operation element, and the temporarily selected state is released according to a user's intention, for example, even during recording the moving image or the like.

When no operation for releasing the temporarily selected state is detected in step S211, the camera control unit 30 performs processing in a different way depending on whether or not the current mode is in the temporarily selected state in step S213.

In a case where the current mode is not in the temporarily selected state, that is, when the current mode is the auto mode in the narrow sense, the camera control unit 30 proceeds to step S214.

In step S214, the camera control unit 30 sets a pupil AF target in the auto mode in the narrow sense. That is, similarly to step S114 of FIG. 11 in the still image capturing mode, it is set which one of a pupil of a left eye and a pupil of a right eye is to be an AF target.

In step S215, the camera control unit 30 determines whether or not the target pupil of the pupil AF control is in focus.

When the target pupil of the pupil AF control is not in focus, the camera control unit 30 proceeds to step S216, and performs a control to display a face frame 150, for example, as in FIG. 10A. In this case, both a priority face frame WDp and a non-priority face frame WDe are displayed.

Then, the camera control unit 30 returns to step S201.

When it is determined in step S215 that the target pupil of the pupil AF control is in focus, the camera control unit 30 proceeds to step S217 and performs a control to display a pupil frame 152 around the target pupil of the pupil AF, for example, as in FIG. 10B. In this case, the pupil frame 152 is a pupil detection frame WHd. Concerning the face frame 150, no priority face frame WDp is displayed, and a non-priority face frame WDe is displayed.

Note that no non-priority face frame WDe may also be displayed.

Then, the camera control unit 30 returns to step S201.

In a case where the mode is not the auto mode in the broad sense, that is, when the mode is the right-eye fixed mode or the left-eye fixed mode, the processing of the camera control unit 30 proceeds from step S210 to step S220 of FIG. 14.

In addition, even in the auto mode in the broad sense, when the mode is in the temporarily selected state, the processing of the camera control unit 30 proceeds from step S213 of FIG. 13 to step S220 of FIG. 14.

In step S220, the processing is performed in a different way depending on whether the fixed target for the pupil AF control is a right eye or a left eye.

In a case where the right eye is a target in the right-eye fixed mode or in the temporarily right-eye selected state, the camera control unit 30 proceeds to step S221, and performs a control to display a pupil frame 152 around a right eye of a priority face and display a non-priority face frame WDe as well, for example, as in FIG. 10C or 10D.

In this case, the pupil frame 152 is a pupil detection frame WHd. In addition, no priority face frame WDp is displayed.

Then, the camera control unit 30 returns to step S201.

In a case where the left eye is a target in the left-eye fixed mode or in the temporarily left-eye selected state, the camera control unit 30 proceeds to step S231, and performs a control to display a pupil frame 152 around a left eye of a priority face and display a non-priority face frame WDe as well.

In this case, the pupil frame 152 is a pupil detection frame WHd. In addition, no priority face frame WDp is displayed.

Then, the camera control unit 30 returns to step S201.

4. Second Embodiment

A second embodiment will be described as an example in which some of the UI displays of the above-described first embodiment are changed.

Figure 15:
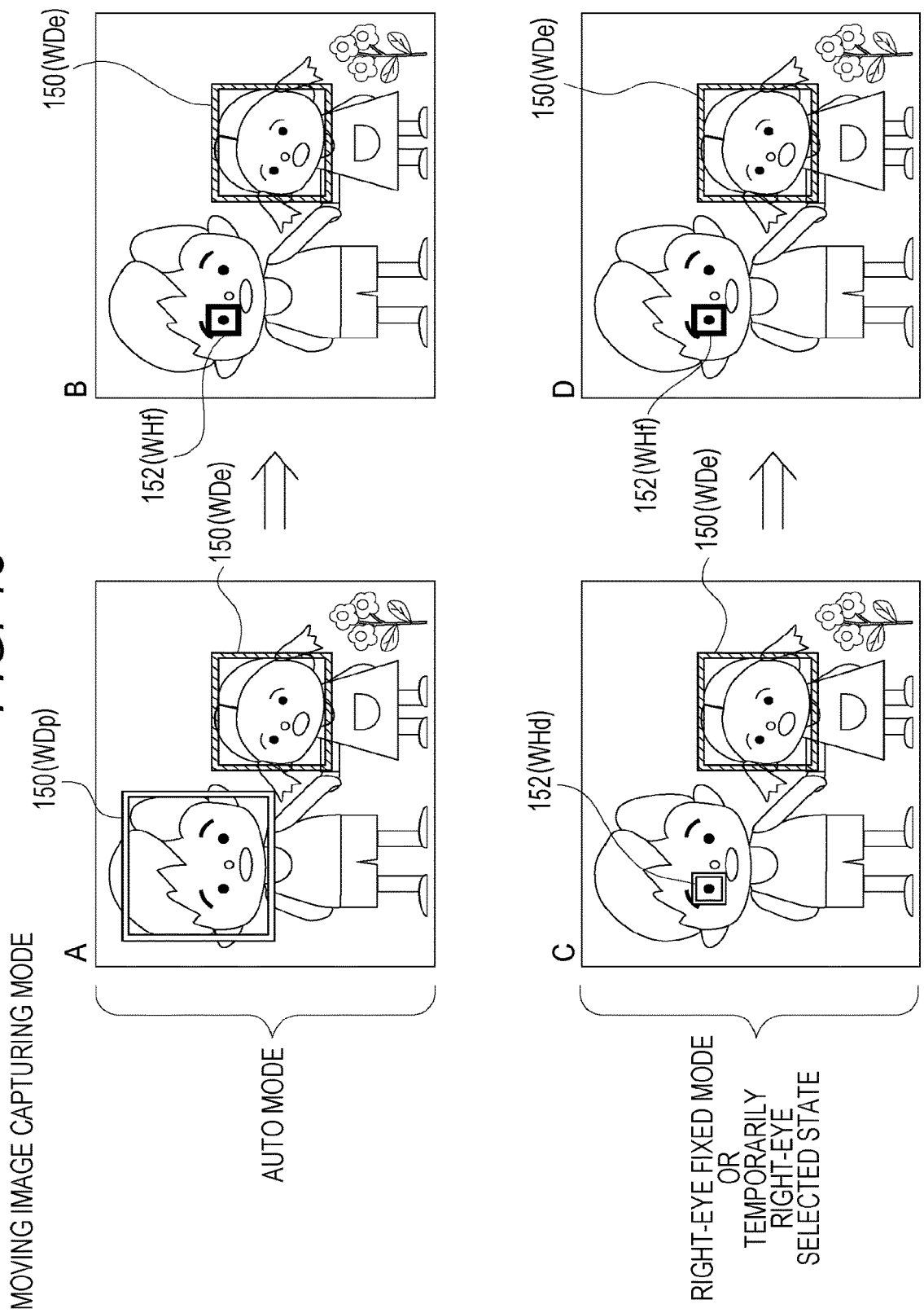
FIG. 15 is an explanatory diagram of an example in which a frame is displayed in a moving image capturing mode according to a second embodiment.

FIG. 15 illustrates examples of UI displays at the time of pupil AF in the moving image capturing mode.

FIG. 15A is an example of a display when a pupil has been detected in the auto mode.

FIG. 15B is an example of a display when focusing is achieved by the pupil AF in the auto mode.

FIG. 15C is an example of a display when a pupil has been detected in the right-eye fixed mode or in the temporarily right-eye selected state.

FIG. 15D is an example of a display when focusing is achieved by the pupil AF in the right-eye fixed mode or in the temporarily right-eye selected state.

The UI display of FIG. 15A is similar to that in the example of FIG. 10A.

If focusing is achieved by the pupil AF in the auto mode, then a pupil focus frame WHf is displayed as a pupil frame 152 as illustrated in FIG. 15B. At this point, FIG. 15B is different from FIG. 10B.

The UI display of FIG. 15C is similar to that in the example of FIG. 10A.

When focusing is achieved by the pupil AF in the right-eye fixed mode or in the temporarily right-eye selected state, a pupil focus frame WHf is displayed as a pupil frame 152 as illustrated in FIG. 15D. At this point, FIG. 15D is also different from FIG. 10D.

That is, in the example of FIG. 15, the pupil focus frame WHf is displayed when focusing is achieved in the moving image capturing mode. Furthermore, in the fixed mode or in the temporarily selected state, the display of the pupil frame 152 is switched between the pupil detection frame WHd and the pupil focus frame WHf depending on whether or not focusing is achieved.

Figure 16:
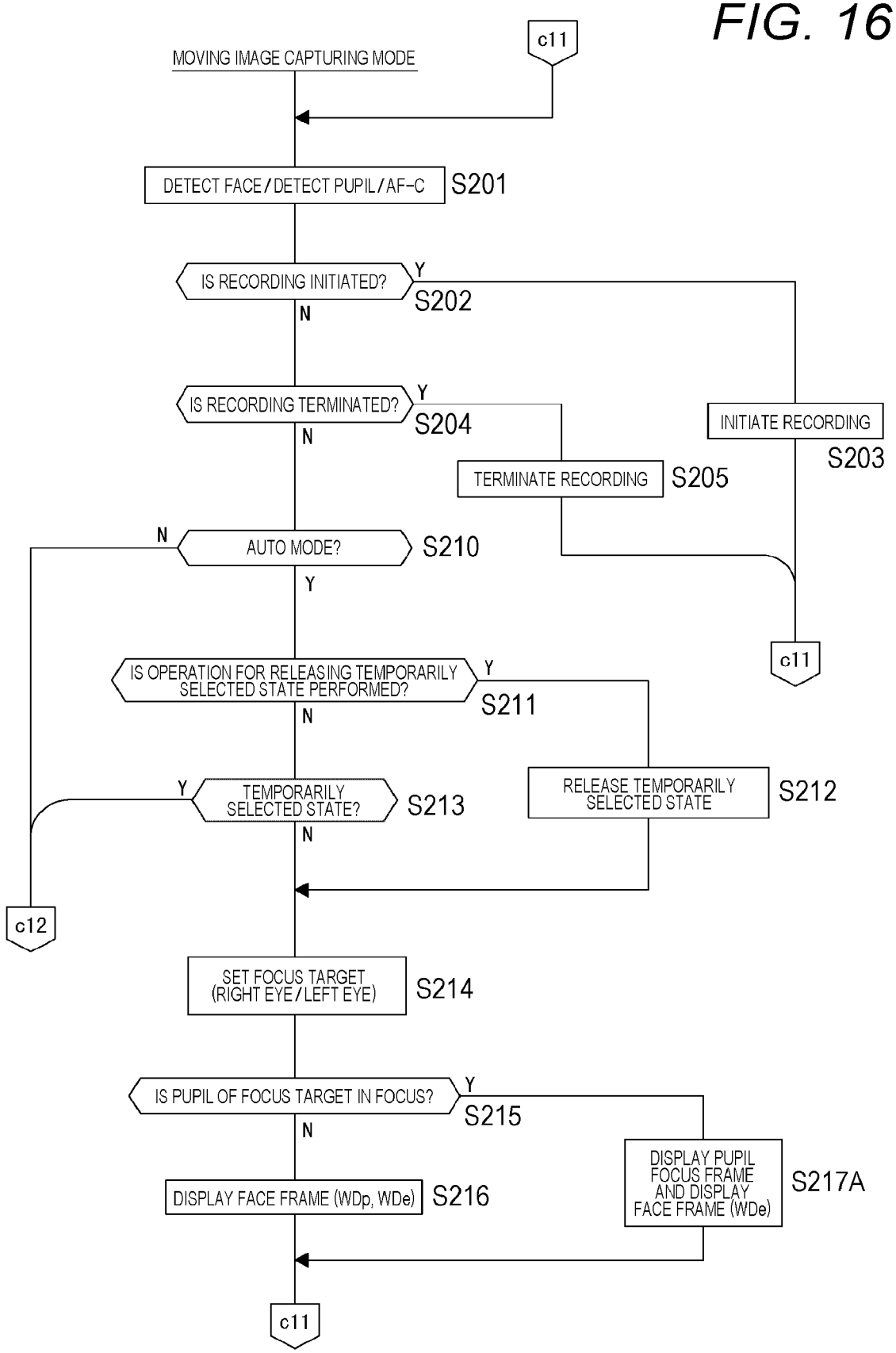
FIG. 16 is a flowchart of processing in the moving image capturing mode according to the second embodiment.
Figure 17:
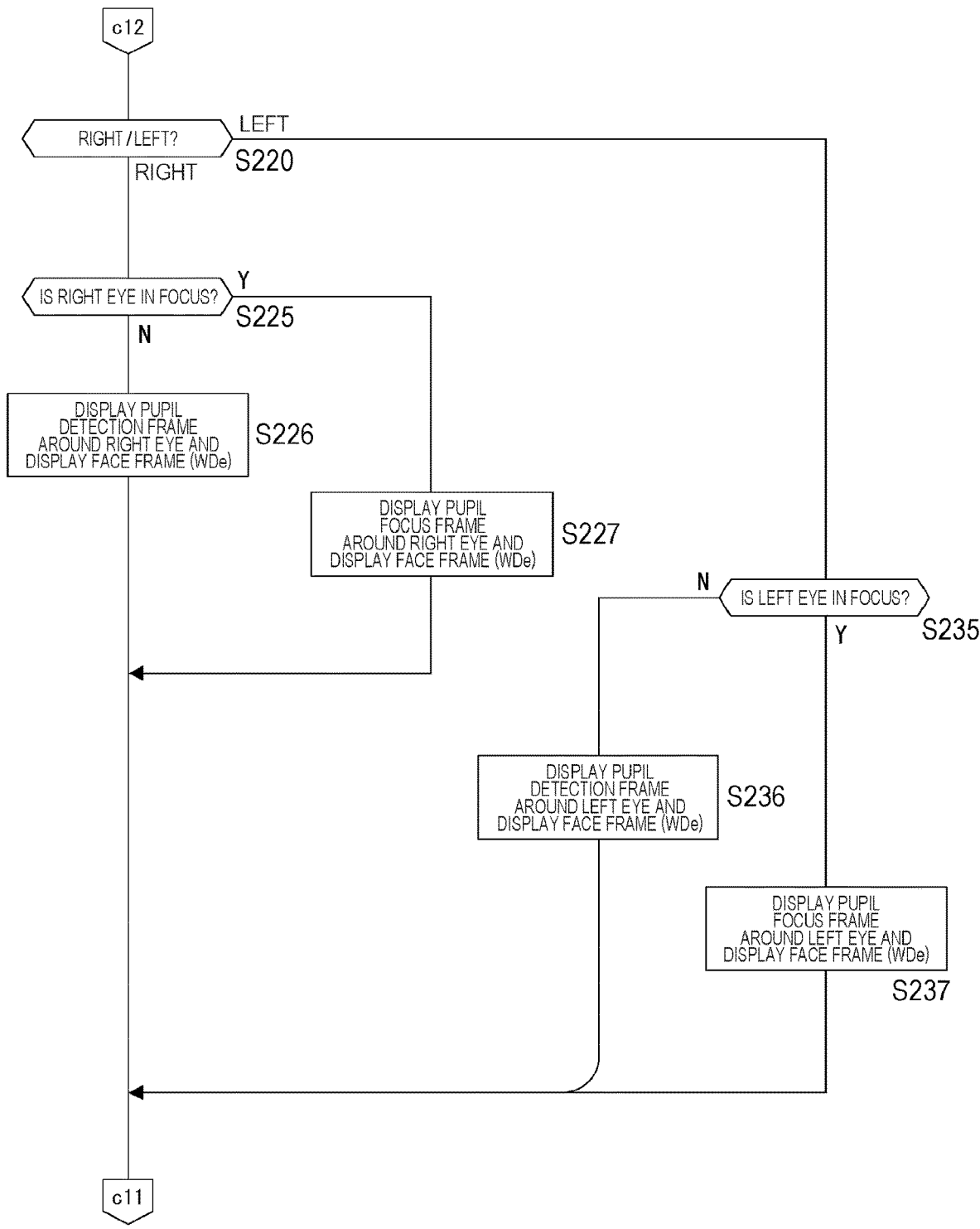
FIG. 17 is a flowchart of processing in the moving image capturing mode according to the second embodiment.

FIGS. 16 and 17 illustrate an example of processing in the moving image capturing mode. Note that, in FIGS. 16 and 17, processing steps similar to those in FIGS. 13 and 14 are denoted by the same step numbers, and description thereof will be omitted.

The processing from step S201 to step S216 in FIG. 16 is similar to that in FIG. 13. The difference is processing in step S217A.

In the auto mode, when it is determined in step S215 that the target pupil of the pupil AF control is not in focus, the camera control unit 30 proceeds to step S216 and performs a control to display a face frame 150, for example, as in FIG. 15A. In this case, both a priority face frame WDp and a non-priority face frame WDe are displayed.

Then, the camera control unit 30 returns to step S201.

In the auto mode, when it is determined in step S215 that the target pupil of the pupil AF control is in focus, the camera control unit 30 proceeds to step S217A and performs a control to display a pupil frame 152 around the target pupil of the pupil AF, for example, as in FIG. 15B. In this case, the pupil frame 152 is a pupil focus frame WHf. Concerning the face frame 150, no priority face frame WDp is displayed, and a non-priority face frame WDe is displayed.

Note that no non-priority face frame WDe may also be displayed.

Then, the camera control unit 30 returns to step S201.

In a case where the mode is not the auto mode in the broad sense, that is, the mode is the right-eye fixed mode or the left-eye fixed mode, the processing of the camera control unit 30 proceeds from step S210 of FIG. 16 to step S220 of FIG. 17.

In addition, even in the auto mode in the broad sense, when the mode is in the temporarily selected state, the processing of the camera control unit 30 proceeds from step S213 of FIG. 16 to step S220 of FIG. 17.

In step S220, the processing is performed in a different way depending on whether the fixed target for the pupil AF control is a right eye or a left eye.

In a case where the right eye is a target in the right-eye fixed mode or in the temporarily right-eye selected state, the camera control unit 30 proceeds to step S225 and determines whether or not the pupil of the right eye is in focus.

When the pupil of the right eye is not in focus, the camera control unit 30 proceeds to step S226, and performs a control to display a pupil frame 152 around the right eye of the priority face and display a non-priority face frame WDe as well, for example, as in FIG. 15C. In this case, the pupil frame 152 is a pupil detection frame WHd. In addition, no priority face frame WDp is displayed. Then, the camera control unit 30 returns to step S201.

When the pupil of the right eye is in focus, the camera control unit 30 proceeds from step S225 to step S227, and performs a control to display a pupil frame 152 around the right eye of the priority face and display a non-priority face frame WDe as well, for example, as in FIG. 15D. In this case, the pupil frame 152 is a pupil focus frame WHf. In addition, no priority face frame WDp is displayed.

Then, the camera control unit 30 returns to step S201.

In a case where the left eye is a target in the left-eye fixed mode or in the temporarily left-eye selected state, the camera control unit 30 proceeds to step S235 and determines whether or not the pupil of the left eye is in focus.

When the pupil of the left eye is not in focus, the camera control unit 30 proceeds to step S236, and performs a control to display a pupil frame 152 around the left eye of the priority face and display a non-priority face frame WDe as well. In this case, the pupil frame 152 is a pupil detection frame WHd. In addition, no priority face frame WDp is displayed.

Then, the camera control unit 30 returns to step S201.

When the pupil of the left eye is in focus, the camera control unit 30 proceeds from step S235 to step S237, and performs a control to display a pupil frame 152 around the left eye of the priority face and display a non-priority face frame WDe as well. In this case, the pupil frame 152 is a pupil focus frame WHf. In addition, no priority face frame WDp is displayed. Then, the camera control unit 30 returns to step S201.

5. Third Embodiment

As a third embodiment, an example of processing in a case where an on/off setting as to whether to display a face frame 150 can be selected by a user operation will be described.

The user can switch the on/off setting as to whether to display a face frame, for example, by operating a menu, operating a specific operation element, or the like.

FIGS. 18A, 18B, 18C, and 18D are examples of UI displays in a case where the display of the face frame is set to "on" in the moving image capturing mode. In addition, FIGS. 18E, 18F, 18G, and 18H are examples of UI displays in a case where the display of the face frame is set to "off" in the moving image capturing mode.

FIGS. 18A and 18E are examples of displays when a pupil has been detected in the auto mode.

FIGS. 18B and 18F are examples of displays when focusing is achieved by the pupil AF in the auto mode.

FIGS. 18C and 18G are examples of displays when a pupil has been detected in the right-eye fixed mode or in the temporarily right-eye selected state.

FIGS. 18D and 18H are examples of displays when focusing is achieved by the pupil AF in the right-eye fixed mode or in the temporarily right-eye selected state.

The examples of the UI displays illustrated in FIGS. 18A, 18B, 18C, and 18D in a case where the display of the face frame is set to "on" are similar to those in FIGS. 10A, 10B, 10C, and 10D of the first embodiment.

In the examples of the UI displays illustrated in FIGS. 18E, 18F, 18G, and 18H in a case where the display of the face frame is set to "off", the face frame 150 is removed from the displays of FIGS. 18A, 18B, 18C, and 18D.

As illustrated in FIG. 18E, in the auto mode, when a pupil has been detected although not in focus, neither a face frame 150 nor a pupil frame 152 is displayed.

In the auto mode, if focusing is achieved by the pupil AF, then neither a face frame 150 nor a pupil frame 152 is displayed as illustrated in FIG. 18F. That is, no frame is displayed both before and after focusing is achieved.

In this way, in the auto mode, neither the face frame 150 nor the pupil frame 152 is displayed by setting the display of the face frame to "off". It can be said that the user does not need to be particularly conscious in the auto mode. Thus, in a case where the display of the face frame is set to the "off" based on a user's intention, it may be preferable for the user to display neither the face frame 150 nor the pupil frame 152.

Note that, in the state of FIG. 18F, when focusing is achieved by the pupil AF in the auto mode, for example, a pupil detection frame WHd may be displayed as a pupil frame 152. This can be adopted in a case where it is preferable to notify the user that the focusing has been achieved in the auto mode as a UI display.

In the right-eye fixed mode or in the temporarily right-eye selected state, when a pupil has been be detected although not in focus, a pupil frame 152 is displayed as a pupil detection frame WHd around the pupil of the priority face, as illustrated in FIG. 18G.

It is illustrated in FIG. 18H that, when focusing is achieved by the pupil AF in the right-eye fixed mode or in the temporarily right-eye selected state, a pupil detection frame WHd is displayed as a pupil frame 152 similarly to FIG. 18G.

Figure 19:
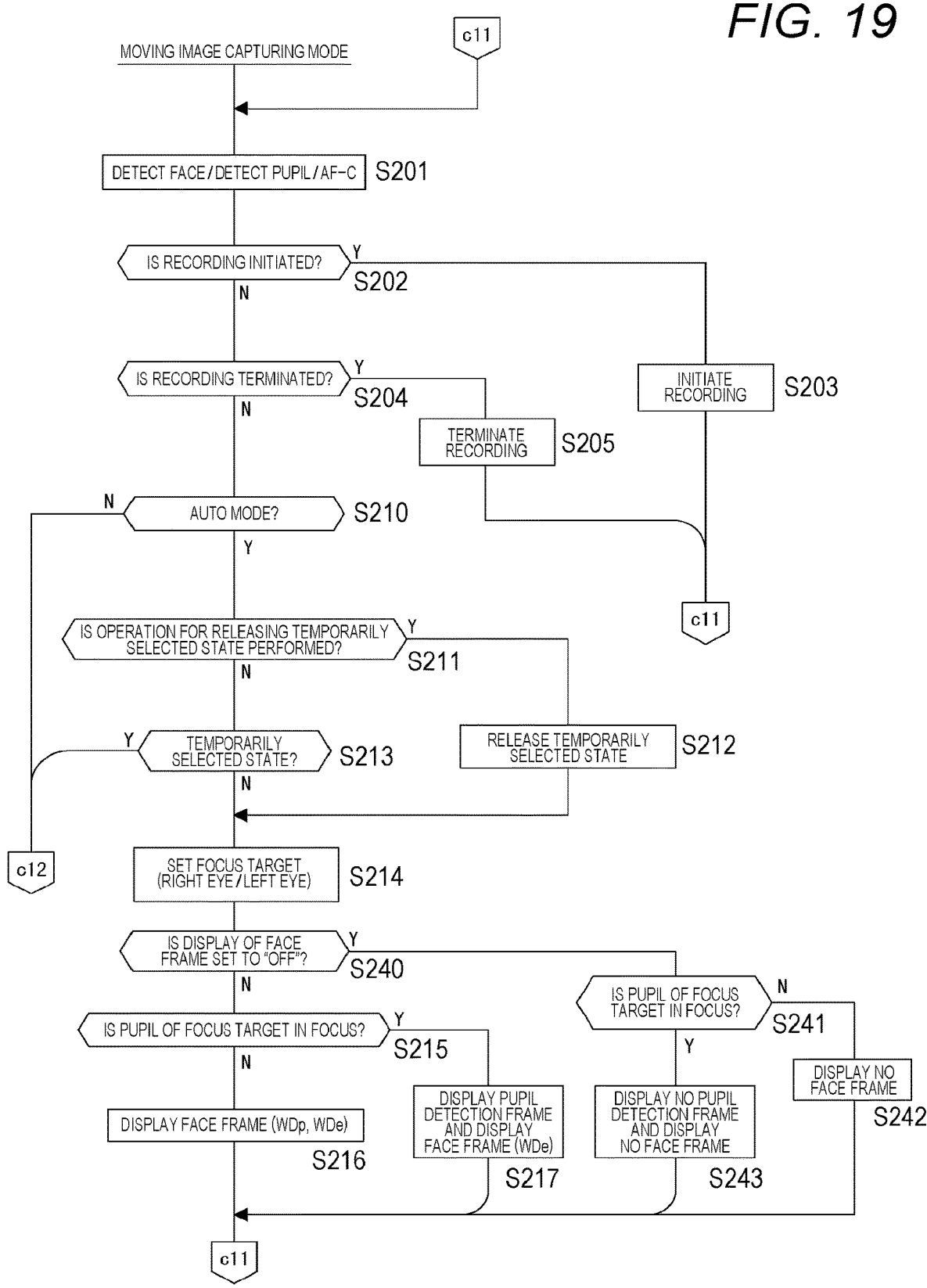
FIG. 19 is a flowchart of processing in the moving image capturing mode according to the third embodiment.
Figure 20:
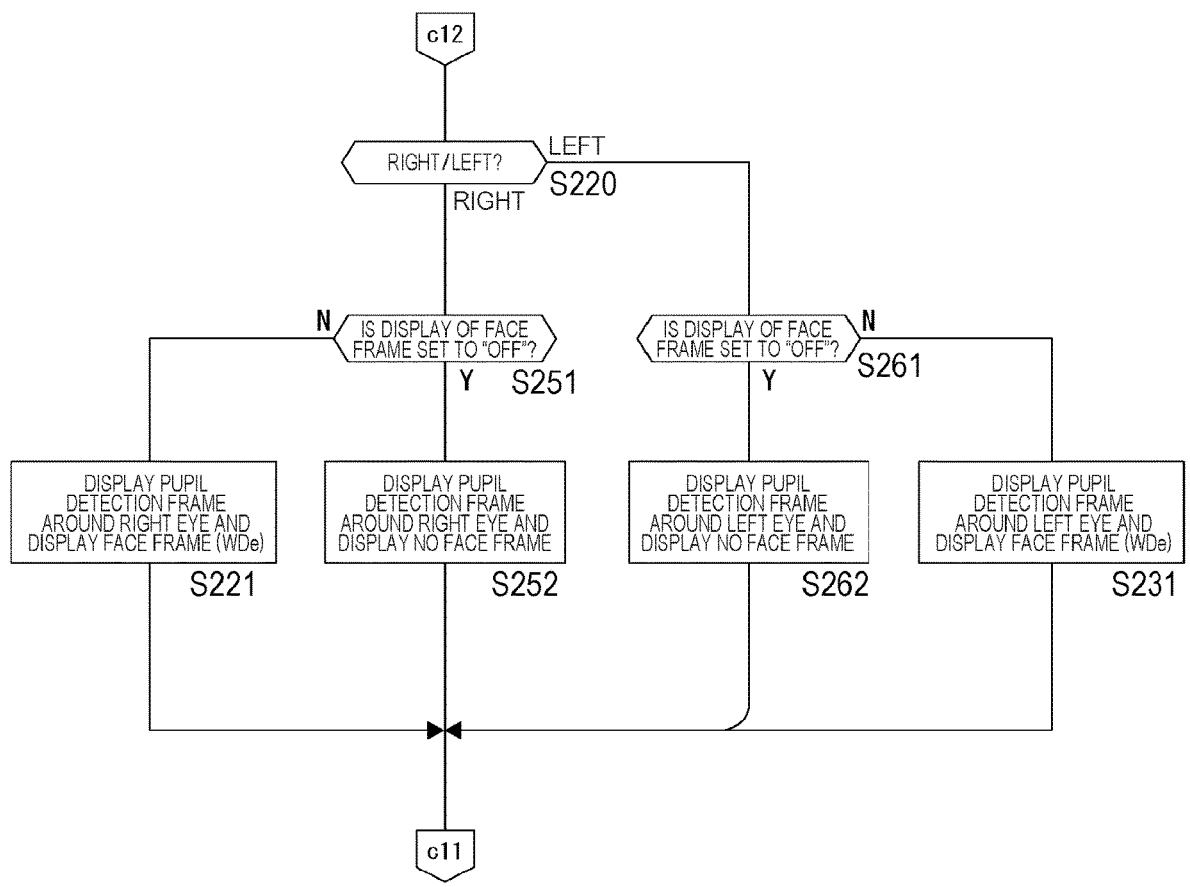
FIG. 20 is a flowchart of processing in the moving image capturing mode according to the third embodiment.

FIGS. 19 and 20 illustrate an example of processing in a case where the UI displays as in FIG. 18 are implemented. Note that, in FIGS. 19 and 20, processing steps similar to those in FIGS. 13 and 14 of the first embodiment are denoted by the same step numbers, and description thereof will be omitted.

The processing from step S201 to step S214 in FIG. 19 is similar to that in FIG. 13.

In FIG. 19, processing in step S240 subsequent to step S214 is performed.

In step S240, the camera control unit 30 checks whether or not the display of the face frame is set to "off".

When the display of the face frame is set to "on", the camera control unit 30 proceeds to step S215 and determines whether or not the target pupil of the pupil AF control is in focus.

When the target pupil of the pupil AF control is not in focus, the camera control unit 30 proceeds to step S216, and performs a control to display face frames 150 (priority face frame WDp and non-priority face frame WDe), for example, as in FIG. 18A.

When it is determined in step S215 that the target pupil of the pupil AF control is in focus, the camera control unit 30 proceeds to step S217, and displays a pupil frame 152 (pupil detection frame WHd) around the target pupil of the pupil AF, for example, as in FIG. 18B. Concerning the face frame 150, no priority face frame WDp is displayed, and a non-priority face frame WDe is displayed.

When the display of the face frame is set to "off", the camera control unit 30 proceeds from step S240 to step S241 and determines whether or not the target pupil of the pupil AF control is in focus.

When the target pupil of the pupil AF control is not in focus, no face frame 150 is displayed in step S242. For example, as in FIG. 18E, the display with no face frame 150 is continued.

When it is determined in step S241 that the target pupil of the pupil AF control is in focus, the camera control unit 30 proceeds to step S243 and performs a control to display neither a face frame 150 nor a pupil frame 152, for example, as in FIG. 18F.

However, in step S243, the control may also be performed to display a pupil frame 152 (pupil detection frame WHd) around the target pupil of the pupil AF and display no face frames 150 (priority face frame WDp and non-priority face frame WDe).

In a case where the mode is not the auto mode in the broad sense, that is, when the mode is the right-eye fixed mode or the left-eye fixed mode, or in a case where even in the auto mode in the broad sense, the mode is in the temporarily selected state, the processing of the camera control unit 30 proceeds from step S210 or step S213 of FIG. 19 to step S220 of FIG. 20.

In step S220, the processing is performed in a different way depending on whether the fixed target for the pupil AF control is a right eye or a left eye.

In a case where the right eye is a target in the right-eye fixed mode or in the temporarily right-eye selected state, the camera control unit 30 proceeds to step S251 and checks whether or not the display of the face frame is set to "off".

When the display of the face frame is set to "on", the camera control unit 30 proceeds to step S221, and performs a control to display a pupil frame 152 (pupil detection frame WHd) around the right eye of the priority face and display a non-priority face frame WDe as well, for example, as in FIG. 18C or 18D.

When the display of the face frame is set to "off", the camera control unit 30 proceeds from step S251 to step S252, and performs a control to display a pupil frame 152 (pupil detection frame WHd) around the right eye of the priority face and display no face frames 150 (priority face frame WDp and non-priority face frame WDe), for example, as in FIG. 18G or 18H.

In a case where the left eye is a target in the left-eye fixed mode or in the temporarily left-eye selected state, the camera control unit 30 proceeds from step S220 to step S261 and checks whether or not the display of the face frame is set to "off".

When the display of the face frame is set to "on", the camera control unit 30 proceeds to step S231, and performs a control to display a pupil frame 152 (pupil detection frame WHd) around the left eye of the priority face and display a non-priority face frame WDe as well.

When the display of the face frame is set to "off", the camera control unit 30 proceeds from step S261 to step S262, and performs a control to display a pupil frame 152 (pupil detection frame WHd) around the left eye of the priority face and display no face frames 150 (priority face frame WDp and non-priority face frame WDe).

Note that although the display of the face frame is set to "off" to display no face frame 150 without affecting a pupil frame 152 in this example, no pupil frame 152 may also be displayed in the auto mode in another example.

In addition, although the examples of the UI displays in FIG. 18 are examples in which no face frame 150 is displayed on the basis of the UI displays of the first embodiment, no face frame 150 may be displayed on the basis of the UI displays (FIGS. 15A, 15B, 15C, and 15D) of the second embodiment.

6. Fourth Embodiment

As a fourth embodiment, an example in a case where, for example, the assignable button 110C, or another specific operation element is an operation element for giving an instruction for a pupil AF operation will be described.

Figure 21:
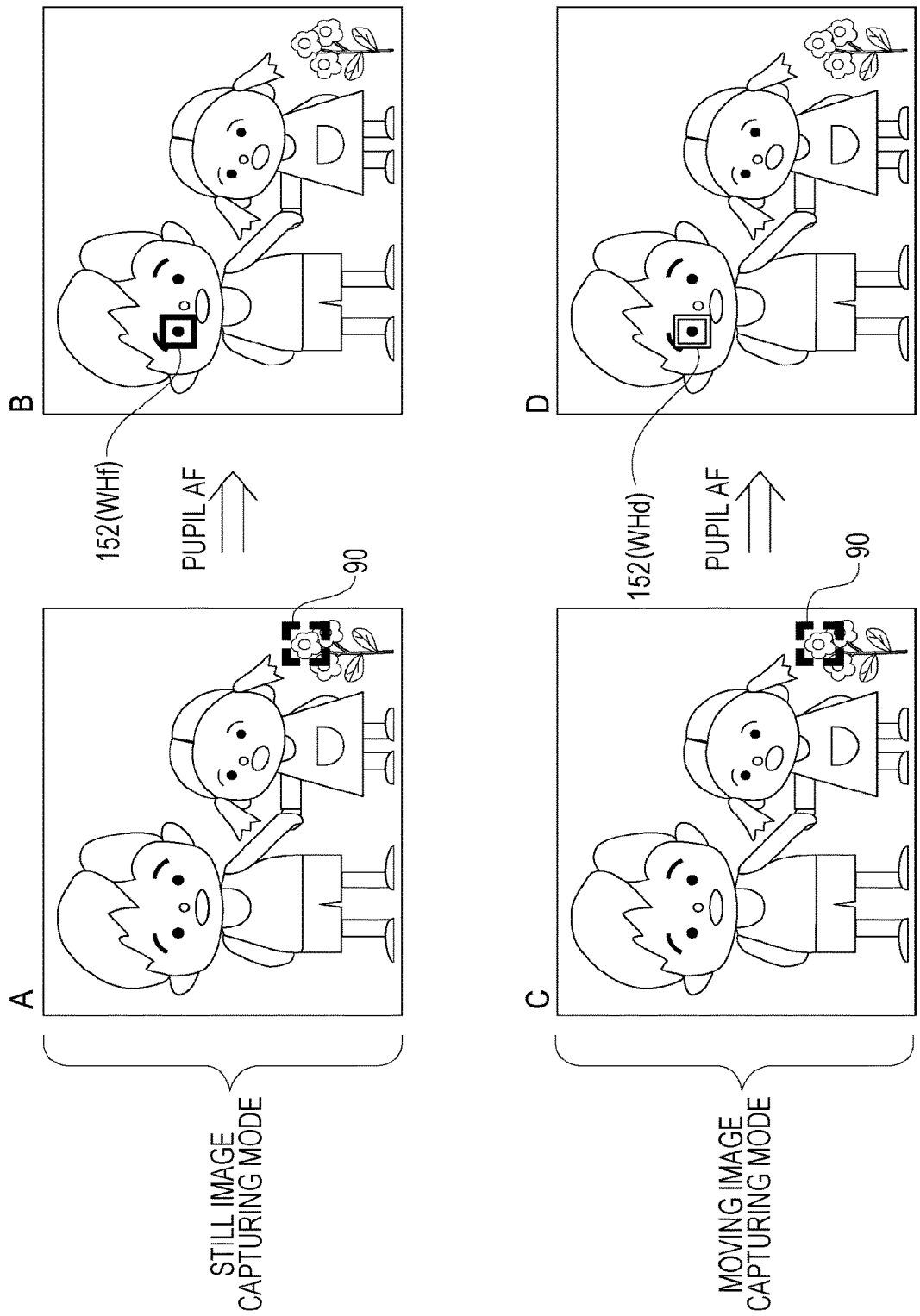
FIG. 21 is an explanatory diagram of an example in which a frame is displayed at the time of pupil AF operation according to a fourth embodiment.

FIGS. 21A and 21B illustrate UI displays in the still image capturing mode.

FIG. 21A illustrates an example in which a focus control is performed with respect to a portion other than a face, and a focus target is indicated by a focus frame 90.

Here, when the user performs an operation for giving the instruction for the pupil AF through, for example, the assignable button 110C, a pupil AF control is activated, and a pupil frame 152 is displayed around an eye of a priority face as in FIG. 21B. In the still image capturing mode, a pupil focus frame WHf is displayed as focusing is achieved.

FIGS. 21C and 21D illustrate UI displays in the moving image capturing mode.

FIG. 21C illustrates an example in which a focus control is performed with respect to a portion other than a face, and a focus target is indicated by a focus frame 90.

Here, when the user performs an operation for giving the instruction for the pupil AF through, for example, the assignable button 110C, a pupil AF control is activated, and a pupil frame 152 is displayed around an eye of a priority face as in FIG. 21D. In the moving image capturing mode, a pupil detection frame WHd is displayed.

Figure 22:
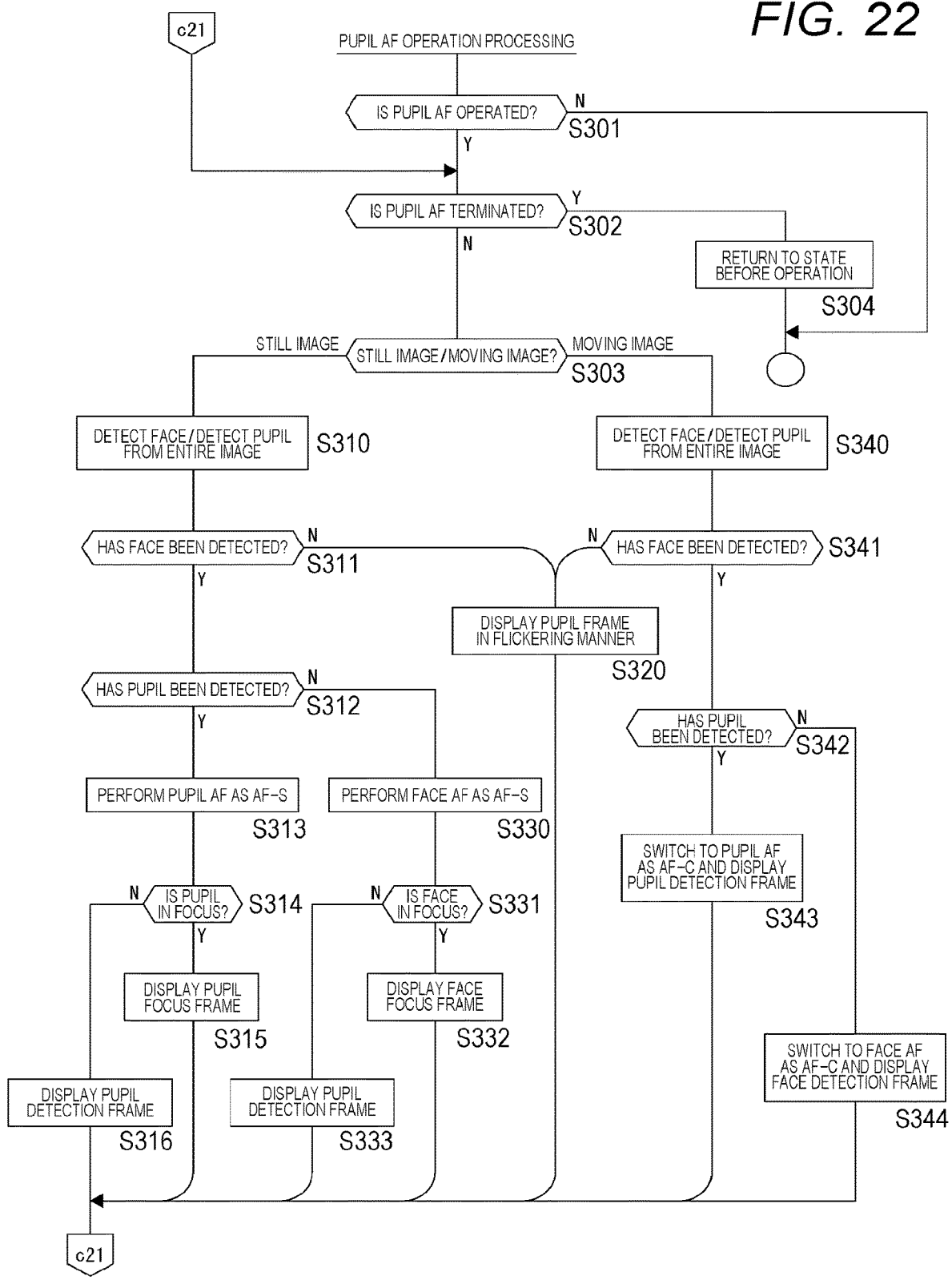
FIG. 22 is a flowchart of processing at the time of pupil AF operation according to the fourth embodiment.

For example, assuming that a pupil AF instruction function is assigned to the assignable button 110C, processing of the camera control unit 30 in a case where the assignable button 110C is operated is illustrated in FIG. 22.

In step S301, the camera control unit 30 monitors a pupil AF operation. For example, an operation of the assignable button 110C is monitored.

When the pupil AF operation is performed by the assignable button 110C, the camera control unit 30 proceeds from step S301 to step S302.

In step S302, a pupil AF termination is monitored. For example, in a case where a pupil AF termination operation is performed by the user or the pupil AF is terminated due to certain control circumstances, the camera control unit 30 proceeds from step S302 to step S304 and returns to the state before the pupil AF operation.

While the pupil AF function is activated by the pupil AF operation, the processing proceeds to step S303, and proceeds to step S310 or step S340 in a different way depending on whether the mode is the still image capturing mode or the moving image capturing mode.

In the still image capturing mode, the camera control unit 30 detects a face and a pupil from an entire captured image in step S310.

In step S311, the camera control unit 30 checks whether or not a face has been detected. When no face has been detected, the camera control unit 30 displays a pupil frame 152 in a flickering manner, for example, at the center or the like of the screen, and indicates to the user that detection for pupil AF is being performed. Then, the camera control unit 30 returns to step S302.

When a face has been detected, the processing proceeds from step S311 to step S312, and it is checked whether or not a pupil has been detected. This means that, when one person's face is detected, it is checked whether or not a pupil in the face has been detected, and when a plurality of faces is detected, a priority face is determined among the plurality of faces, and it is checked whether or not a pupil in the priority face has been detected.

When no pupil has been detected, the camera control unit 30 proceeds to step S330 and performs a face AF control as AF-S. That is, the AF control is performed with the detected face (priority face) as a target.

Then, the camera control unit 30 checks a focus state in step S331. When the detected face is not in focus, the camera control unit 30 proceeds to step S333 to perform a control to display a face detection frame, and returns to step S302.

When focusing is achieved by the face AF control, the camera control unit 30 proceeds from step S331 to step S332 and performs a control to display a face focus frame. Then, the camera control unit 30 returns to step S302.

Although the face detection frame and the face focus frame are not illustrated, for example, a white priority face frame WDp may be a face detection frame, and a green priority face frame WDp may be a face focus frame.

Note that a pupil cannot be detected even though a face has been detected, not only during a period from the detection of the face to the detection of the pupil, but also when a face is captured in a so small size as not to detect eyes, when a person as a subject faces backward after the person's face is detected and accordingly the person's eyes do not appear, or the like.

In such a case, the AF control is performed with a face as a target.

When a pupil has been detected, the processing of the camera control unit 30 proceeds from step S312 to step S313 to perform a pupil AF control as AF-S. That is, the AF control is performed with the detected pupil as a target.

Then, the camera control unit 30 checks a focus state in step S314. When the detected pupil is not in focus, the camera control unit 30 proceeds to step S316 to perform a control to display a pupil detection frame WHd. Then, the camera control unit 30 returns to step S302.

When focusing is achieved by the pupil AF control, the camera control unit 30 proceeds from step S314 to step S315 and performs a control to display a pupil focus frame WHf as in FIG. 21B. Then, the camera control unit 30 returns to step S302.

In the moving image capturing mode, the processing of the camera control unit 30 proceeds from step S303 to step S340, and detects a face and a pupil from an entire captured image. Note that, in the moving image capturing mode, the AF control is continued as AF-C.

In step S341, the camera control unit 30 checks whether or not a face has been detected. When no face has been detected, the camera control unit 30 displays a pupil frame 152 in a flickering manner, for example, at the center or the like of the screen, and indicates to the user that detection for pupil AF is being performed. Then, the camera control unit 30 returns to step S302.

When a face has been detected, the processing proceeds from step S341 to step S342, and it is checked whether or not a pupil has been detected.

When no pupil has been detected, the camera control unit 30 proceeds to step S344 and performs a face AF control as AF-C. That is, the AF control is performed with the detected face (priority face) as a target. In addition, the camera control unit 30 performs a control to display a face detection frame. Then, the camera control unit 30 returns to step S302.

When a pupil has been detected, the processing of the camera control unit 30 proceeds from step S342 to step S343 to perform a pupil AF control as AF-C. That is, the AF control is performed with the detected pupil as a target. In addition, the camera control unit 30 performs a control to display a pupil detection frame WHd as in FIG. 21D. Then, the camera control unit 30 returns to step S302.

In the above example of processing, the following operations are executed.

The pupil AF operation is activated by operating the assignable button 110C or the like (step S301).

A face and a pupil are detected from an entire screen, and a pupil AF control is performed (steps S310 and S340). At this time, a location close to a focus area set by the user may be preferentially searched. Examples of the focus area setting include "wide", "zone", "center", "flexible spot", and the like as described above, and preferential search is performed according to the setting.

Even if a pupil cannot be detected, if a face can be detected, AF on the face is performed and focusing is displayed when achieved (steps S330, S331, S332, S333, and S344).

When no face has been detected, flickering is displayed without performing the AF operation (step S320).

As a focus mode, AF-S is adopted in the still image capturing mode and AF-C is adopted in the moving image capturing mode.

Note that the pupil frame and the face frame indicating that focusing is achieved may be displayed as one frame in the AF-S mode as well.

Either in the still image capturing mode or in the moving image capturing mode, "AF on the pupil is performed in the current AF mode (AF-C or AF-S)".

However, in the still image capturing mode, the AF operation is initiated by triggering the assignable button 110C, and the pupil focus frame WHf is displayed after focusing is achieved. On the other hand, in the moving image capturing mode, since the AF operation is being performed at all times, only the focus target is changed to the pupil according to the pupil AF operation, and the pupil frame 152 is also displayed as the pupil detection frame WHd.

7. Fifth Embodiment

As a fifth embodiment, an example of a combination of pupil AF operation and tracking will be described.

In this example, a pupil AF control is performed to track a pupil according to a touch operation in the still image capturing mode, and a pupil AF control is performed with respect to a pupil selected after tracking a face according to a touch operation in the moving image capturing mode.

Figure 23:
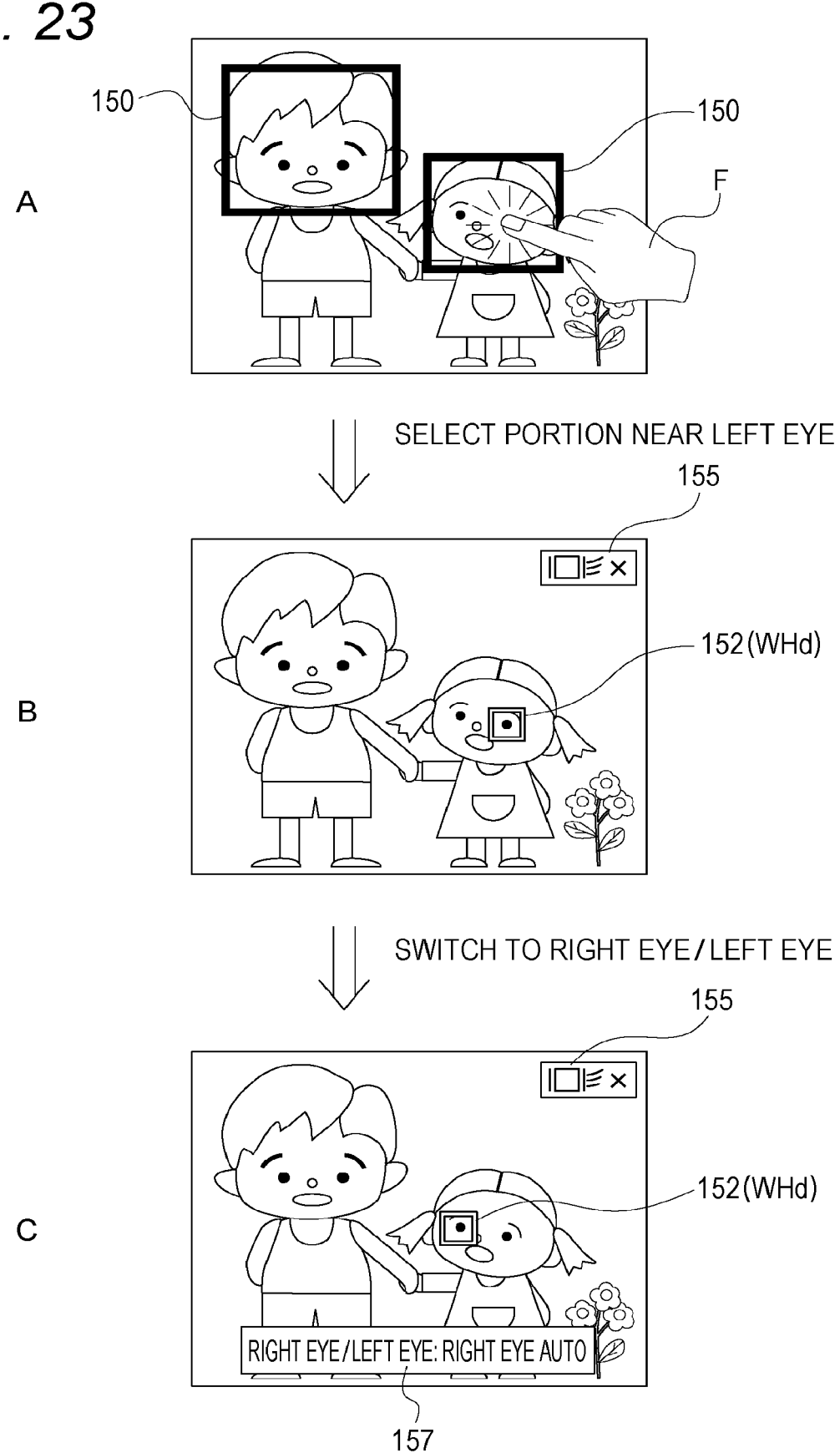
FIG. 23 is an explanatory diagram of an example in which a frame is displayed at the time of touch operation according to a fifth embodiment.
Figure 24:
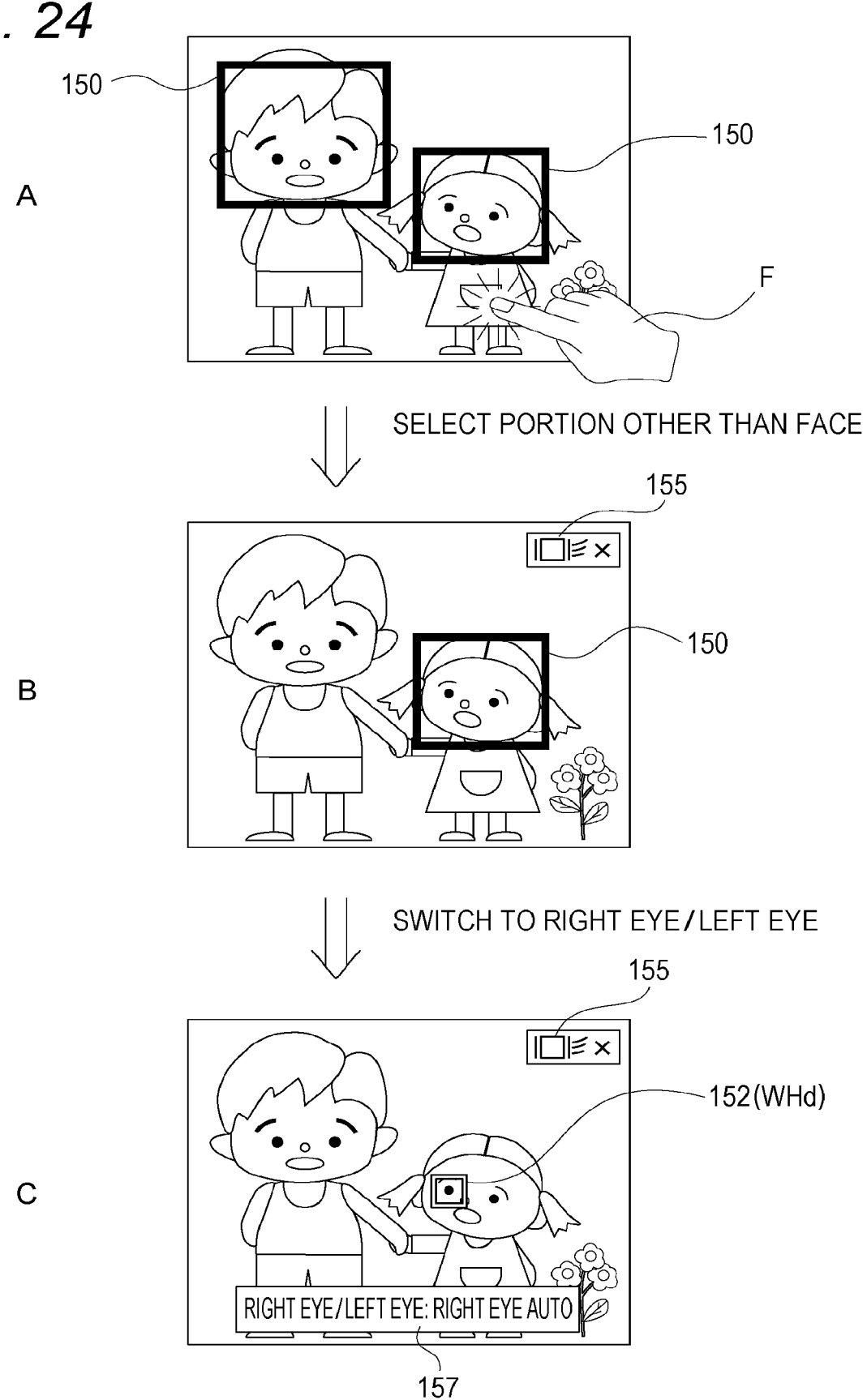
FIG. 24 is an explanatory diagram of an example in which a frame is displayed at the time of touch operation according to the fifth embodiment.

FIGS. 23 and 24 illustrate examples of UI displays in a case where a tracking instruction is made by a touch operation in the still image capturing mode.

As in FIG. 23A, while a face frame 150 is being displayed, the user performs a touch operation on a face in an image with a finger F or the like. The touch on the face in the image may be regarded as a touch in the face frame 150.

This operation is interpreted by the camera control unit 30 as making an instruction to track a pupil on a side closer to a touch location as a target in the face touched by the user.

In the case of FIG. 23A, a touch operation is performed at a location close to a left eye. Therefore, the camera control unit 30 performs processing for tracking a left pupil as a target. In a UI display, a pupil frame 152 (e.g., pupil detection frame WHd) is displayed around the left eye as in FIG. 23B. In addition, a tracking icon 155 is displayed as the tracking is initiated.

Even during the tracking, the tracking target can be switched by a predetermined user operation between the right eye and the left eye. For example, the tracking target may be alternately switched between the right eye and the left eye by toggling a certain operation element.

For example, in a case where the user performs a right-eye/left-eye switching operation from the state of FIG. 23B, the camera control unit 30 switches the tracking target to the right eye, and a pupil frame 152 is displayed around the right eye as in FIG. 23C.

Furthermore, it is indicated by a switching display 157 that the tracking target has been switched to the right eye/left eye. Note that "right-eye auto" in the drawing represents the temporarily right-eye selected state in the auto mode.

FIG. 24A illustrates that a touch operation is not performed on a face in an image. In this case, when the touched image has been determined as a person, this is interpreted as an instruction from the user to track the person, and the camera control unit 30 performs processing for tracking a face of the person as a target.

To this effect, in a case where the touch of FIG. 24A is made, a face frame 150 (e.g., face detection frame) is displayed only around the face of the touched person to initiate the tracking of the face as in FIG. 24B. In addition, a tracking icon 155 is displayed as the tracking is initiated.

Furthermore, for example, in a case where the user performs a right-eye/left-eye switching operation from the state of FIG. 24B, the camera control unit 30 switches the tracking target from the face to either or the left pupil or the right pupil. For example, in a case where the tracking target is switched to the right eye, a pupil frame 152 is displayed around the right eye as in FIG. 24C.

In a case where the user performs the right-eye/left-eye switching operation from the face tracking state, it may be determined according to the operation scheme which-side pupil is to be set as a tracking target, or an appropriate-side pupil may be automatically selected similarly to the auto-mode processing described above.

In addition, in a case where the user performs a right-eye/left-eye switching operation from the state of FIG. 24C, the camera control unit 30 switches the tracking target to the left eye.

FIGS. 23 and 24 are examples of UI displays in the still image capturing mode as described above, but in the moving image capturing mode, it is difficult to differentiate a touch operation when the user touches a portion near the face or a body portion. Therefore, in the moving image capturing mode, an appropriate pupil is selected and set as a tracking target by detecting a touch on a face portion.

An example of processing by the camera control unit 30 for such an operation will be described with reference to FIGS. 25, 26, and 27.

Figure 25:
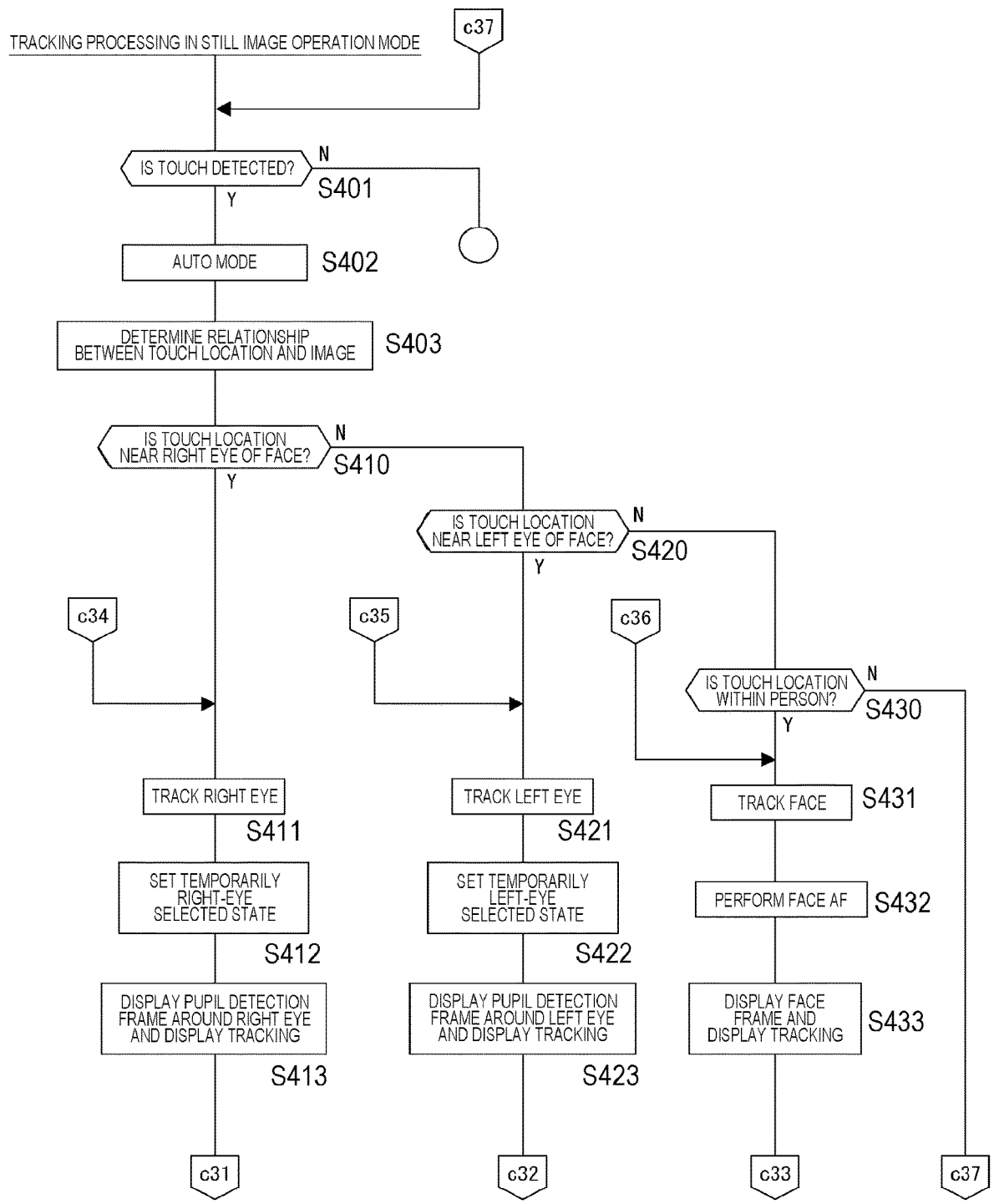
FIG. 25 is a flowchart of tracking processing in a still image capturing mode according to the fifth embodiment.
Figure 26:
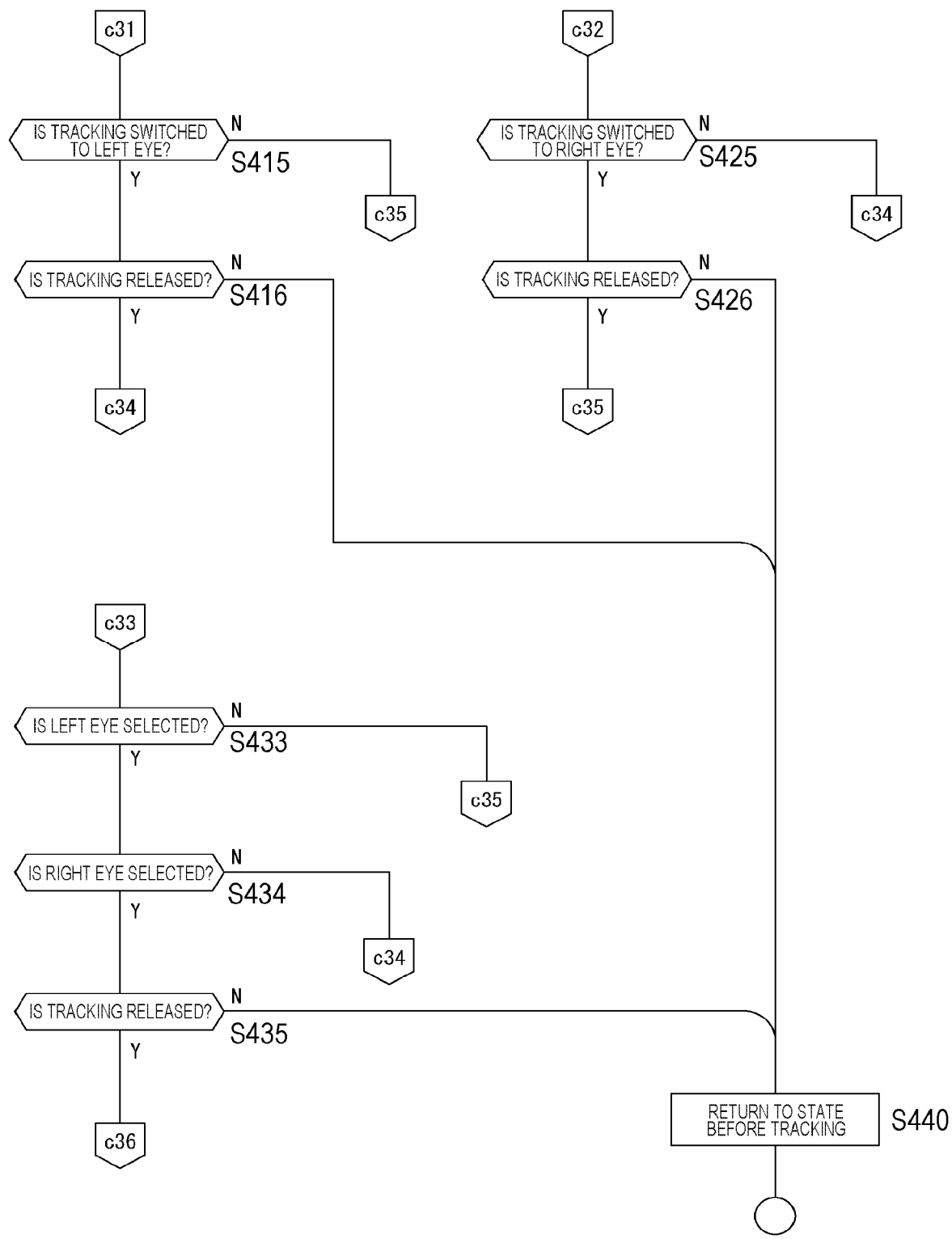
FIG. 26 is a flowchart of tracking processing in the still image capturing mode according to the fifth embodiment.

FIGS. 25 and 26 illustrate an example of a series of processing steps in the still image capturing mode, and connection relationships therebetween are indicated by "c31", "c32", "c33", "c34", "c35", "c36", and "c37".

In the still image capturing mode, when a touch operation has been detected, the camera control unit 30 proceeds from step S401 to step S402 of FIG. 25 for the pupil AF in the auto mode.

Then, in step S403, the camera control unit 30 determines a relationship between a touch location and an image. That is, it is determined whether the location touched by the user is a face or a portion other than the face, which one of left and right eyes is closer to the touched location when the face is touched, and the like.

When it is determined that the user has touched a portion near a right eye of a certain face in the image, the camera control unit 30 proceeds from step S410 to step S411 and initiates tracking a pupil of the right eye as a tracking target.

In addition, in step S412, the camera control unit 30 performs a pupil AF control with the mode of the pupil AF control set as the auto mode in the temporarily right-eye selected state.

In step S413, the camera control unit 30 performs a control to display, as a UI display, a pupil frame 152 (e.g., pupil detection frame WHd) around the right eye, which is a tracking target, together with a tracking icon 155.

Subsequently, the camera control unit 30 proceeds to step S415 of FIG. 26 and checks whether or not an operation for switching to the left eye has been performed.

In addition, in step S416, the camera control unit 30 determines whether or not the tracking has been released. For example, in a case where an operation for terminating the tracking has been performed by the user, or in a case where the subject person is out of frame and becomes non-trackable, it is determined that the tracking has been released.

If there has been no switching operation or if the tracking has not been released, the camera control unit 30 returns to step S411 of FIG. 25 and continues the processing for tracking the right pupil and the pupil AF control.

In a case where it is determined in step S403 that the user's touch operation has been performed on a portion near a left eye of a certain face in the image, the camera control unit 30 proceeds from step S420 to step S421, and initiates tracking a pupil of the left eye as a tracking target.

In addition, in step S422, the camera control unit 30 performs a pupil AF control with the mode of the pupil AF control set as the auto mode in the temporarily left-eye selected state.

In step S423, the camera control unit 30 performs a control to display, as a UI display, a pupil frame 152 (e.g., pupil detection frame WHd) around the left eye, which is a tracking target, together with a tracking icon 155.

Subsequently, the camera control unit 30 proceeds to step S425 of FIG. 26 and checks whether or not an operation for switching to the right eye has been performed.

In addition, in step S426, the camera control unit 30 determines whether or not the tracking has been released.

If there has been no switching operation or the tracking has not been released, the camera control unit 30 returns to step S421 of FIG. 25 and continues the processing for tracking the left pupil and the pupil AF control.

In a case where it is determined in step S403 that the user's touch operation has been performed on a portion other than the face, the camera control unit 30 proceeds to step S430 and checks whether or not the touched location is a region of a person (i.e., a region of a body image of the person) as in FIG. 24A.

In a case where the touched location is a region of a person, the camera control unit 30 proceeds to step S431 and initiates tracking a face of the touched person as a tracking target.

In addition, in step S432, the camera control unit 30 initiates a face AF control with the face as a target.

Then, in step S433, the camera control unit 30 performs a control to display, as a UI display, a face frame 150 around the face, which is a tracking target, together with a tracking icon 155.

Subsequently, the camera control unit 30 proceeds to step S425 of FIG. 26 and checks whether or not an operation for switching to the right eye has been performed.

In addition, in step S426, the camera control unit 30 determines whether or not the tracking has been released.

If there has been no switching operation or the tracking has not been released, the camera control unit 30 returns to step S421 of FIG. 25 and continues the processing for tracking the left pupil and the pupil AF control.

The processing of the camera control unit 30 proceeds to step S433 of FIG. 26 to check whether or not an operation for selecting the left eye has been performed or the left eye has been automatically selected. For example, this is a case where the left eye has been selected by a user's right-eye/left-eye switching operation, or a case where the left eye has been selected as a pupil AF target by the processing in the auto mode.

When the left eye is not selected, the camera control unit 30 checks in step S434 whether or not an operation for selecting the right eye has been performed or the right eye has been automatically selected. For example, this is a case where the right eye has been selected by a user's right-eye/left-eye switching operation, or a case where the right eye has been selected as a pupil AF target by the processing in the auto mode.

If the left eye or the right eye has not been selected, the camera control unit 30 determines in step S435 whether or not the tracking has been released.

If there has been no operation or automatic determination for selecting the left eye or the right eye or if the tracking has not been released, the camera control unit 30 returns to step S431 of FIG. 25 and continues the processing for tracking the face and the face AF control.

Note that, in this example of processing, the tracking of the face and the face AF are performed when it is determined that the location touched by the user is in the region of the person.

In a case where the location touched by the user is not in the region of the person, the processing returns from step S430 to step S401. That is, the processing does not proceed to steps S431, S432, and S433, and the tracking and AF operations are not initiated.

However, in a case where the touch location is not in the region of the person, the processing may proceed to steps S431, S432, and S433 by designating a person closest to the touch location.

In a case where the left eye has been designated by a user's right-eye/left-eye switching operation while the tracking and the pupil AF control are performed with respect to the right pupil, the camera control unit 30 proceeds from step S415 of FIG. 26 to steps S421, S422, and S423 of FIG. 25, initiates the tracking and the pupil AF control with respect to the left pupil, and performs a UI display control to display a pupil frame 152 around the left eye.

In addition, in a case where it has been detected that the left eye is selected while the face tracking and the face AF control are performed, the camera control unit 30 proceeds from step S433 of FIG. 26 to steps S421, S422, and S423 of FIG. 25, initiates the tracking and the pupil AF control with respect to the left pupil, and performs a UI display control to display a pupil frame 152 around the left eye.

In a case where the right eye has been designated by a user's right-eye/left-eye switching operation while the tracking and the pupil AF control are performed with respect to the left pupil, the camera control unit 30 proceeds from step S425 of FIG. 26 to steps S411, S412, and S413 of FIG. 25, initiates the tracking and the pupil AF control with respect to the right pupil, and performs a UI display control to display a pupil frame 152 around the right eye.

In addition, in a case where it has been detected that the right eye is selected while the face tracking and the face AF control are performed, the camera control unit 30 proceeds from step S434 of FIG. 26 to steps S411, S412, and S413 of FIG. 25, initiates the tracking and the pupil AF control with respect to the right pupil, and performs a UI display control to display a pupil frame 152 around the right eye.

In a case where it has been detected in any of steps S416, S426, and S435 of FIG. 26 that the tracking is released, the camera control unit 30 proceeds to step S440 and returns to the state before the tracking.

Next, processing in the moving image capturing mode will be described with reference to FIG. 27.

In the moving image capturing mode, the camera control unit 30 monitors a face touch operation in step S450. Here, only a touch within a region of a face (e.g., within a face frame 150) is recognized as a tracking operation.

Note that, since it may be difficult to accurately touch a region of a face in an image, a touch at a location close to the face to some extent may be determined as a face touch, rather than necessarily strictly determining the touch. Alternatively, in a case where there is a face image, any touch is a face touch, and may be determined as a touch operation with respect to a face closest to the touch.

When a face touch operation has been detected, the camera control unit 30 proceeds from step S450 to step S451 for the pupil AF in the auto mode. This is the auto mode in the narrow sense. At this time, if the auto mode is in the temporarily selected state, the temporarily selected state is released.

Then, in step S452, the camera control unit 30 initiates tracking the touched face of the person as a tracking target.

In step S453, the camera control unit 30 performs processing for selecting which one of left and right pupils in the face, which is a tracking target, is to be a target for the pupil AF control. This processing is similar to that in step S214 of FIG. 13. Then, the target for the pupil AF control as AF-C is switched (or maintained) to the selected pupil.

In a case where the right eye has been selected in step S453, the camera control unit 30 proceeds from step S460 to step S461, and performs a control to display a pupil detection frame WHd around the right eye of the face that is being tracked and display a tracking icon 155 as well.

In addition, in a case where the left eye has been selected in step S453, the camera control unit 30 proceeds from step S470 to step S471, and performs a control to display a pupil detection frame WHd around the left eye of the face that is being tracked and display a tracking icon 155 as well.

In step S453, neither the right eye nor the left eye may be selected. This is a case where an orientation of the face that is being tracked changes, a case where the face becomes far away from the imaging apparatus 1, making a face size small, or the like. In such a case, the camera control unit 30 proceeds to step S480, performs an AF control with the face as a target, and performs a control to display a face frame 150 and a tracking icon 155.

In step S440, the camera control unit 30 checks whether or not the tracking has been terminated. When the tracking has been terminated, the camera control unit 30 proceeds to step S491 and returns to the state before the tracking.

When the tracking is being continued, the processing of the camera control unit 30 returns to step S452.

Figure 27:
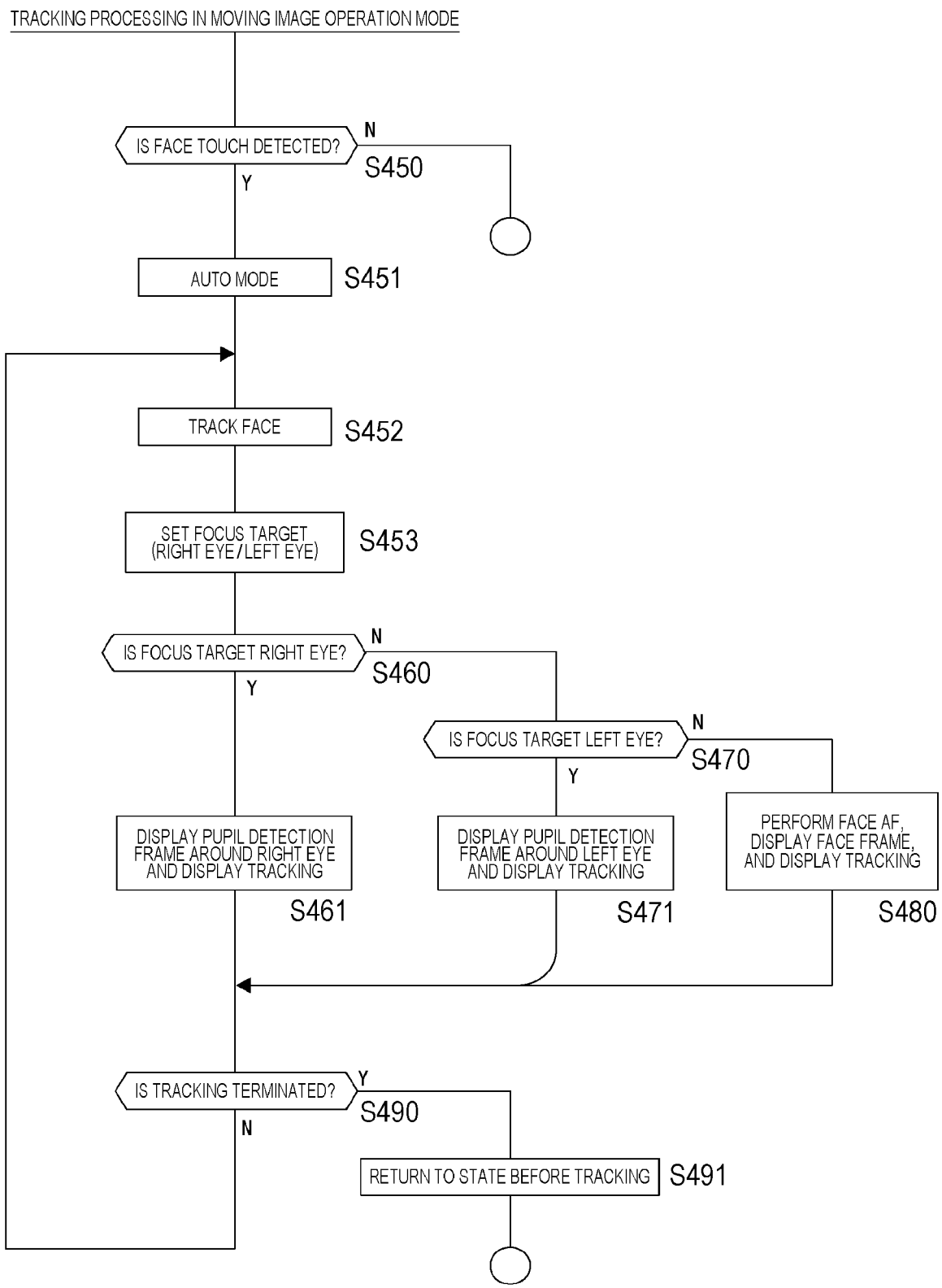
FIG. 27 is a flowchart of tracking processing in a moving image capturing mode according to the fifth embodiment.

As described above, in a case where a tracking instruction has been detected, the camera control unit 30 performs the processing of FIGS. 25 and 26 in the still image capturing mode, and performs the processing of FIG. 27 in the moving image capturing mode. Accordingly, the following operations are executed.

In the still image capturing mode, in a case where the location touched by the user is a face, an eye on side closer to the touch location is selected. In a case where a right eye has been selected, the right eye is tracked, and a pupil AF control is performed with respect to the right eye in the temporarily right-eye selected state. In a case where a left eye has been selected, the left eye is tracked, and a pupil AF control is performed with respect to the left eye in the temporarily left-eye selected state.

In the still image capturing mode, in a case where the location touched by the user is a portion other than the face, the face of the person is tracked, and a face AF control is performed.

The tracking and AF target can be switched between the right eye and the left eye according to a user's operation.

In the moving image capturing mode, a face is tracked by detecting a user's face touch operation. The pupil AF is performed with respect to the right eye or the left eye of the face that is being tracked in the auto mode in the narrow sense.

Note that the control processing may be performed in various other ways.

For example, the tracking target may be selected based on a face size. In this processing, when a touch operation is detected on the face, if the face size is larger than a predetermined size on the image, the pupil is selected to track the pupil and perform a pupil AF control, and if the face size is equal to or smaller than the predetermined size, the face is selected to track the face and perform a face AF control.

8. Sixth Embodiment

An example of processing in the sixth embodiment will be described with reference to FIG. 28.

In the examples of FIG. 13 for the first embodiment and FIG. 16 for the second embodiment described above, it has been described that, in step S201, a face and a pupil are detected in a captured image, and a pupil AF control is performed as AF-C according to the detection of the pupil.

In FIGS. 13 and 16, the description has been given on the premise that the pupil is detected and the AF-C is performed in step S201. In the sixth embodiment, an example of a flow from the detection of the face through the detection of the pupil to the pupil AF until the premise is completed will be described.

Figure 28:
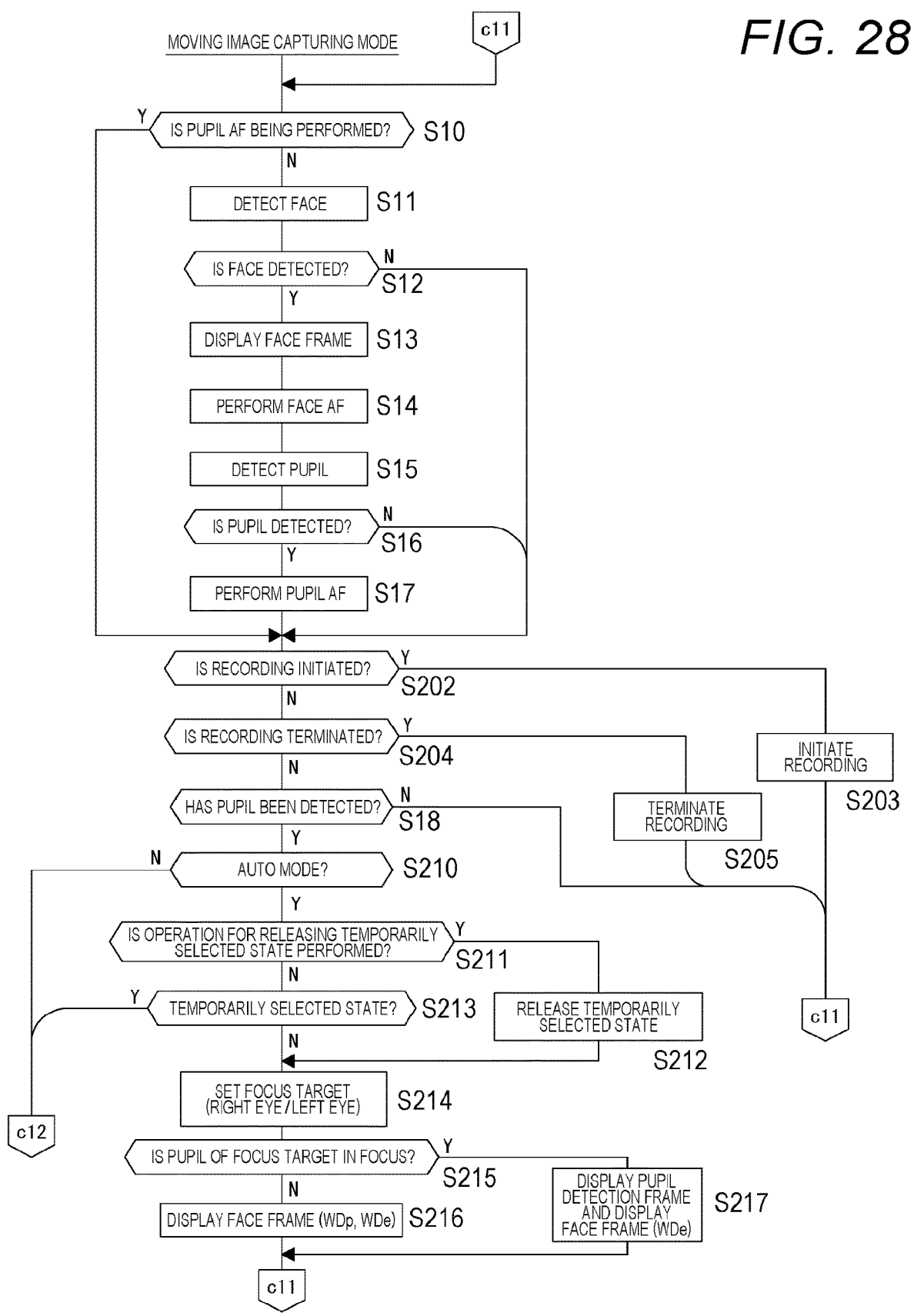
FIG. 28 is a flowchart of processing in a moving image capturing mode according to a sixth embodiment.

In FIG. 28, steps S202 to S217 are similar to those in FIG. 13. Furthermore, FIG. 28 is also similar to FIG. 13 in that a chain of processing flows are constituted in combination with FIG. 14.

The processing corresponding to step S201 in FIG. 13 is illustrated as steps S10 to S17 in FIG. 28.

Furthermore, step S18 is added.

In step S10, the camera control unit 30 performs processing in a different way depending on whether or not a pupil AF control is being currently performed.

If the pupil AF control is being performed, this means that a face and a pupil have already been detected. Therefore, the processing proceeds to step S202 and the subsequent steps, similarly to the processing of FIG. 13 described above.

If the pupil AF control is not being performed, the camera control unit 30 proceeds from step S10 to step S11 and performs a face detection. For example, a face image of a person (or an animal) is searched for in a range of an entire frame.

During a period in which no face has been detected, the camera control unit 30 proceeds from step S12 to steps S202 and S204. In a case where there has been an operation for initiating recording or terminating recording, the above-described corresponding processing (step S203 or S205) is performed. Then, the camera control unit 30 returns to step S10.

In particular, unless such processing is performed, this means that no pupil has been detected yet, and thus, the camera control unit 30 returns from step S18 to step S10.

When a face has been detected, the camera control unit 30 proceeds from step S12 to step S13, and performs a control to display a face frame 150. For example, both a priority face frame WDp and a non-priority face frame WDe are displayed.

In addition, the camera control unit 30 initiates face AF as AF-C in step S14.

The camera control unit 30 performs a pupil detection in step S15. For example, a pupil of a priority face among detected faces is detected.

During a period in which no pupil is detected, the camera control unit 30 proceeds from step S16 to step S202.

When a pupil has been detected, the camera control unit 30 proceeds from step S16 to step S17, and switches the target for AF-C from the face to the pupil. That is, pupil AF is initiated.

In this case, in the auto mode, it is determined in step S214 which one of left and right eyes is to be a target for the pupil AF, and in the fixed mode or in the temporarily fixed state, the left or right eye is designated by the user as a target for the pupil AF.

By performing the face detection, the face AF, the pupil detection, and the pupil AF in a stepwise manner as described above, an appropriate AF operation is flexibly executed each time, for example, according to the situations of the subject and the captured image.

9. Conclusion and Modifications

According to the above embodiments, the following effects can be obtained.

As described in the first, second, and third embodiments, the imaging apparatus 1 includes: a face/pupil detection unit 61 that detects a pupil in a captured image; an AF control unit 52 that executes a pupil AF control to perform AF on the pupil detected by the face/pupil detection unit 61 according to a predetermined operation in a still image capturing mode, and executes a pupil AF control when the pupil is detected by the face/pupil detection unit 61 in a moving image capturing mode; and a display control unit 55 that performs a control to display a pupil frame 152 indicating the pupil that is in focus on the captured monitor image when focusing is achieved by the pupil AF control.

Therefore, the pupil AF operation is performed according to a user operation at the time of capturing a still image, and the pupil AF is automatically activated at the time of capturing a moving image, so that the pupil AF operation with good usability according to the imaging mode can be provided to the user. In particular, in the case of the moving image, when it is assumed that the AF operation is continuously performed as AF-C, it is a very effective control for capturing a high-quality moving image that the pupil AF operation is automatically performed at the timing when the pupil is detected.

As described in the first embodiment, in the still image capturing mode, the display control unit 55 displays a pupil focus frame WHf as the pupil frame 152 when focusing is achieved by the pupil AF control (step S119 of FIG. 11 and steps S145 and S155 of FIG. 12). On the other hand, in the moving image capturing mode, the display control unit 55 displays a pupil detection frame WHd as the pupil frame 152 even when focusing is achieved by the pupil AF control (step S217 of FIG. 13 and steps S221 and S231 of FIG. 14).

In the moving image capturing mode, since the AF control is continuously performed (AF-C), even if the pupil focus frame WHf is displayed, the display tends to be unstable. In this case, there is concern that a screen presenting information may be difficult for the user to understand. Therefore, by continuing to display the pupil detection frame WHd, the captured monitor image can be stabilized, thereby providing a screen that is easy for the user to view.

Furthermore, in the moving image capturing mode, the pupil frame 152 can be stably displayed when focusing is achieved. Therefore, it is preferable as a display of information for the user to display the pupil frame 152 as the pupil detection frame WHd.

As described in the first embodiment, in the still image capturing mode, in a case where it is automatically set which one of left and right pupils is to be a target for the pupil AF control, that is, in the auto mode in the narrow sense, when the pupil AF control is performed according to the predetermined operation, the display control unit 55 does not display a pupil detection frame WHd as the pupil frame 152 until focusing is achieved (FIG. 9A, FIG. 9B, and steps S118 and S116 of FIG. 11).

In the auto mode, at a stage before focusing is achieved, even though pupils have been detected, it may not be necessarily stable which one of the left and right pupils is suitable as the AF target. In that case, it is assumed that the position of the pupil frame 152 may frequently change between the left and right pupils in a flickering manner. Therefore, at a stage where focusing is not performed, a face frame 150 is displayed without displaying a pupil frame 152, thereby preventing an unstable display.

Furthermore, the display of the pupil frame 152 enables the user to recognize that the pupil is in a focus-in state after performing a pupil AF control by a half-pressing operation.

Note that, in a case where the pupil AF operation is completed in an extremely short time, the time during which the pupil frame 152 does not appear is extremely short, and it is assumed that the user cannot actually recognize that the pupil frame 152 does not appear.

However, in a case where it is assumed that it is difficult to achieve focusing during the pupil AF operation for a certain reason and it takes a long time until focusing is achieved, it is also preferable as a processing example to display a pupil detection frame WHd, for example, before focusing is achieved.

Furthermore, in the right-eye fixed mode, in the left-eye fixed mode, or in the temporarily selected state, the position of the pupil frame 152 does not change frequently between the left and right pupils in a flickering manner. In this case, when the pupil AF control is performed according to the predetermined operation such as half-pressing, a pupil detection frame WHd is displayed as the pupil frame 152 until focusing is achieved (steps S145 and S155 of FIG. 12). Therefore, the user can confirm during, for example, the half-press operation a state in which the pupil AF control is being performed but the pupil is not yet in focus.

Note that, in a case where the pupil AF operation is completed in an extremely short time, the time during which the user can recognize the pupil detection frame WHd is extremely short, and it is also assumed that the user cannot actually recognize the pupil detection frame WHd. However, in a case where it is difficult to achieve focusing during the pupil AF operation for a certain reason, that is, in a case where the time for which focusing fails during the pupil AF operation is long, it is useful to display the pupil detection frame WHd.

In the embodiment, the pupil detection frame WHd and the pupil focus frame WHf are displayed in different colors (see FIGS. 9 and 10, etc.).

The difference in color enables the user to easily recognize the difference between the pupil detection frame WHd and the pupil focus frame WHf.

Furthermore, the shapes of the pupil detection frame WHd and the pupil focus frame WHf are substantially the same, such as a square surrounding the pupil. In many cases, it takes a short time from the initiation of the pupil AF operation until focusing is achieved. In some cases, frequent switches occur between the in-focus state and the out-of-focus state for a certain reason. At this time, if the shapes of the frames are different between the pupil detection frame WHd and the pupil WHf, the pupil frame 152 frequently changes on the captured monitor image, which may be difficult to view. At that point, by adopting a display form in which only the color changes between the pupil detection frame WHd and the pupil WHf, it is possible to make it easy for the user to visually recognize them.

In the embodiment, in the still image capturing mode, the pupil AF control is initiated by half-pressing the shutter button 110S.

As a result, the AF operation, which is generally used for an imaging apparatus, can be applied as a pupil AF operation. That is, the user can activate the pupil AF operation, which is more suitable for imaging a person or the like, similarly to the conventional AF operation.

As described in the first embodiment, in the auto mode in the narrow sense in which the pupil AF control is performed in the moving image capturing mode, such that it is automatically set which one of left and right pupils is to be a target for the pupil AF control, the display control unit 55 does not display a pupil frame 152 (step S216 of FIG. 13). On the other hand, in the fixed mode in which the target for the pupil autofocus control is a pupil designated by a user operation, for example, in the right-eye fixed mode or in the left-eye fixed mode, a pupil frame 152 (pupil detection frame WHd) is displayed even when the pupil is not in focus (steps S221 and S231 of FIG. 14).

In the moving image capturing mode, the pupil AF control is automatically performed when a pupil is detected. However, in the auto mode, in the auto mode, in a state where the pupil is not in focus, there is concern about flickering between left and right pupils or the like. For this reason, the display quality of the captured monitor image is maintained by not outputting a pupil frame.

On the other hand, in the right-eye fixed mode or in the left-eye fixed mode, the display of the pupil frame 152 is fixed to either a left eye side or a right eye side, and flickering between the left eye side and the right eye side does not occur even if focusing is not achieved. In addition, it is preferable to clearly indicate whether the focus target designated by the user is a left one or a right one. Therefore, the pupil frame 152 is displayed around the right eye in the right-eye fixed mode and the pupil frame 152 is displayed around the left eye in the left-eye fixed mode, thereby providing appropriate information to the user without impairing the display quality.

In the embodiment, the auto mode, the right-eye fixed mode, and the left-eye fixed mode can be selected by a user operation. However, for example, only the auto mode and the right-eye fixed mode may be selected, or only the auto mode and the left-eye fixed mode may be selected.

As described in the first embodiment, in the auto mode, it is possible to set the temporarily selected state in which the pupil AF control is performed with the target being temporarily fixed to a pupil designated by a user operation. In the temporarily selected state, for example, in the temporarily right-eye selected state or in the temporarily left-eye selected state, the display control unit 55 displays a pupil frame 152 (pupil detection frame WHd) even when the pupil is not in focus, similarly to the right-eye fixed mode or the left-eye fixed mode (steps S221 and S222 of FIG. 14).

In the temporarily right-eye selected state or in the temporarily left-eye selected state, the display of the pupil frame 152 is fixed to either the left eye side or the right eye side, similarly to the right-eye fixed mode or the left-eye fixed mode. That is, flickering between the left eye side and the right eye side does not occur. Furthermore, it preferable to clearly indicate a target for the pupil AF control, because it is selected according to the user operation. Therefore, the pupil frame 152 is displayed around the right eye in the temporarily right-eye selected state and the pupil frame 152 is displayed around the left eye in the temporarily left-eye selected state, thereby providing appropriate information to the user without impairing the display quality.

Note that, in the embodiment, both the temporarily right-eye selected state and the temporarily left-eye selected state are set to be selectable by the user operation, but only one of the temporarily right-eye selected state and the temporarily left-eye selected state may be set to be selectable by the user operation.

As described in the second embodiment, in the moving image capturing mode, when a pupil AF control is performed, the display control unit 55 displays a pupil detection frame WHd as the pupil frame 152 until focusing is achieved (steps S226 and S236 of FIG. 17). Then, when focusing is achieved, a pupil focus frame WHf is displayed as the pupil frame 152 (steps S227 and S237 of FIG. 17 and step S217A of FIG. 16).

Therefore, the user can confirm a state in which the pupil is in focus while capturing a moving image.

Note that, in the auto mode in the narrow sense, no pupil detection frame WHd is displayed during the out-of-focus period (step S216 of FIG. 16). This means that the pupil frame 152 is prevented from flickering between the left side and right side in the auto mode.

As described in the third embodiment, an on/off setting can be selected as to whether to display a face frame 150 when a face is detected by the face/pupil detection unit 61, and the display control unit 55 may perform a control as to whether to display a face frame according to the selection of the on/off setting in the moving image capturing mode (see FIGS. 18, 19, and 20).

In particular, while capturing a moving image, the face frame may complicate a display on the screen. At that point, the on/off setting can be selected by the user, thereby making the display easy to view.

In the example of the third embodiment, in the moving image capturing mode, in a case where the "off" setting for face frame display is selected, the display control unit 55 does not display a face frame 150 (step S242 of FIG. 19) in the auto mode in the narrow sense. In addition, in the right-eye fixed mode or in the left-eye fixed mode, a control is performed to display a pupil frame without displaying a face frame 150, when a pupil is detected, regardless of whether or not focusing is achieved (steps S252 and S262 of FIG. 20).

That is, in any mode, the user can select the off setting for face frame display.

In the auto mode in the narrow sense, there is concern about flickering between left and right sides or the like in a state where focusing is not achieved, and thus, the display quality of the captured monitor image can be maintained by not displaying a pupil frame 152 or by displaying a pupil frame 152 at least after focusing is achieved.

In the right-eye fixed mode or in the left-eye fixed mode, the display of the pupil frame 152 is fixed to either a left eye side or a right eye side, thereby preventing flickering between the left eye side and the right eye side. In addition, it preferable to clearly indicate a target designated by the user. Therefore, by displaying the pupil frame 152, appropriate information can be provided to the user without impairing the display quality.

As described in the third embodiment, in a case where the "off" setting for the display of the face frame 150 is selected, in the temporarily right-eye selected state or in the temporarily left-eye selected state, the display control unit 55 does not display a face frame 150 and displays a pupil frame 152 (pupil detection frame WHd) even when the pupil is not in focus, similarly to the right-eye fixed mode or the left-eye fixed mode (steps S221 and S231 of FIG. 20).

In the temporarily right-eye selected state or in the temporarily left-eye selected state, the display of the pupil frame 152 is fixed to either the left eye side or the right eye side, similarly to the right-eye fixed mode or the left-eye fixed mode, thereby preventing the pupil frame 152 from flickering between the left eye side and the right eye side. Furthermore, it preferable to clearly indicate a target for the pupil AF control, because it is selected according to the user operation. Therefore, by displaying the pupil frame 152, appropriate information can be provided to the user without impairing the display quality.

In the example of the third embodiment, it has been described that, in the auto mode, in a case where the "off" setting for the display of the face frame 150 is selected, a control is performed to display no face frame 150 and display a pupil frame when the pupil is in focus (step S242 of FIG. 19).

Even in the auto mode, the pupil frame 152 is displayed to indicate the focus-in state to the user, because it is assumed that the focus-in state stabilizes the display of the pupil frame 152.

In the examples of the first, second, and third embodiments, it has been described that, in the still image capturing mode, the temporarily right-eye selected state or the temporarily left-eye selected state is released according to a release operation for giving an instruction to record a still image (step S105 of FIG. 11), and in the moving image capturing mode, the temporarily right-eye selected state or the temporarily left-eye selected state is released according to an operation different from the release operation (by operating the enter button 110E) (step S212 of FIGS. 13, 16, and 19).

In the still image capturing mode, a timing for releasing the temporarily selected state can be caught by the release operation according to the user's intention. However, there is no trigger for such releasing while recording a moving image. As an operation different from the release operation, a specific operation is provided for the user to release the temporarily selected state, and is preferably used in a case where the user desires to return to the auto mode in the narrow sense. For example, it is possible to return to the auto mode without performing an operation for stopping the recording of the moving image or the like.

In addition, since the temporarily selected state can be released using a fixed key such as the enter button 110E at any time, the apparatus is easy for the user to use.

Note that, in FIG. 11, even in the still image capturing mode, the temporarily selected state can be released using a fixed key such as the enter button 110E (steps S111 and S112). In this way, the temporarily selected state can be released arbitrarily at any time, so as to provide an operation environment that is easy for the user to understand.

As described in the fourth embodiment, for example, the assignable button 110C is set as an operation element for giving an instruction for a pupil AF operation. In the still image capturing mode, when the assignable button 110C is operated, the AF control unit 52 initiates a pupil AF control based on the detection of the pupil in the entire captured image, and the display control unit 55 displays a pupil focus frame WHf as the pupil frame 152 when focusing is achieved. In the moving image capturing mode, when the assignable button 110C is operated, the AF control unit 52 switches an AF control with a face as a target to the pupil AF control based on the detection of the pupil in the entire captured image, and the display control unit 55 displays a pupil detection frame WHd as the pupil frame 152 when the pupil is detected (see FIG. 22).

Therefore, the pupil AF control based on the user operation is executed in different manners and the suitable pupil frame 152 is displayed in different manners in the still image capturing mode and the moving image capturing mode, respectively. That is, in the still image capturing mode, the pupil AF control is performed as AF-S to indicate that the pupil is in focus. In moving image capturing mode, the AF-C target is switched to a pupil to indicate as a pupil detection frame WHd that the pupil has been detected. As a result, it is possible to present information that is easy for the user to understand.

Note that an operation for giving the instruction for a pupil AF operation may be performed in various other ways, as well as the operation by the assignable button 110C. The operation may be an operation by an operation element such as a specific operation button, or may be an operation by a user's touch, behavior, voice, or the like.

As described in the fifth embodiment, for example, a captured monitor image is displayed and a touch operation can be performed on the display panel 101. Then, the AF control unit 52 performs a pupil AF control to track a pupil according to the touch operation in the still image capturing mode, and performs a pupil AF control with respect to a pupil selected after tracking a face according to the touch operation in the moving image capturing mode.

While capturing a moving image, since it is difficult for the user to perform a precise operation, a pupil AF control is performed by tracking a face designated by the touch and automatically selecting a left or right pupil of the face. As a result, the operation of the user can be facilitated.

As described in the fifth embodiment, in the still image capturing mode, when the touch operation is performed on the face in the captured monitor image, the AF control unit 52 can perform a pupil AF control for tracking a pupil on a side close to the touch location, and when the touch operation is performed on a portion other than the face in the captured monitor image, the AF control unit 52 can perform an AF control for tracking a face close to the touch location.

It is assumed that, in many cases, the user has more sufficient time to perform a more accurate touch operation in the still image capturing mode than in the moving image capturing mode. Thus, the tracking target can be designated, according to the touch location, among the right eye, the left eye, and the face. As a result, the user can specifically designate a tracking target only by performing a touch operation.

The program according to the embodiment is a program for causing, for example, a CPU, a DSP, or the like, or a device including the same to execute the processing of any of FIGS. 10, 11, 13, 14, 16, 17, 19, 20, 25, 26, and 27.

That is, the program according to the embodiment causes an arithmetic processing device to execute: image recognition processing for detecting a pupil in a captured image; AF control processing for executing a pupil AF control to perform AF on the pupil detected in the image recognition processing according to a predetermined operation in a still image capturing mode, and executing a pupil AF control when the pupil is detected by the image recognition processing in a moving image capturing mode; and display control processing for displaying a pupil frame indicating the pupil that is in focus on the captured monitor image when focusing is achieved by the pupil AF control.

The arithmetic processing device is, for example, an arithmetic processing device (microprocessor) as the camera control unit 30.

By using such a program, a device implementing the operations of the imaging apparatus 1 according to the present embodiment can be realized.

Such a program can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto-optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed in a personal computer or the like from the removable recording medium, or can be downloaded from a download site via a network such as a local area network (LAN) or the Internet.

Furthermore, such a program is suitable for providing the imaging apparatus 1 according to the embodiment in a wide range. For example, the imaging apparatus 1 according to the embodiment can be applied to a personal computer, a portable information processing device such as a smartphone or a tablet, a mobile phone, a game device, a video device, a personal digital assistant (PDA), or the like. By downloading the program to a device having an imaging function, the device can function as the imaging apparatus 1 according to the present disclosure.

Note that the effects described in the present specification are merely examples and are not limited, and there may be other effects as well.

Note that the present technology can also adopt the following configurations.

(1)
An imaging apparatus including:
a detection unit that detects a pupil in a captured image;
an autofocus control unit that executes a pupil autofocus control to perform autofocus on the pupil detected by the detection unit according to a predetermined operation in a still image capturing mode, and executes a pupil autofocus control when the pupil is detected by the detection unit in a moving image capturing mode; and
a display control unit that performs a control to display a pupil frame indicating the pupil that is in focus on the captured monitor image when focusing is achieved by the pupil autofocus control.

(2)
The imaging apparatus according to (1), in which
in the still image capturing mode, the display control unit performs the control to display a pupil focus frame as the pupil frame when focusing is achieved by the pupil autofocus control, and
in the moving image capturing mode, the display control unit performs the control to display a pupil detection frame, which is in a different display form from the pupil focus frame, as the pupil frame when focusing is achieved by the pupil autofocus control.

(3)
The imaging apparatus according to (1) or (2), in which
in the still image capturing mode, in a case where it is automatically set which one of left and right pupils is to be a target for the pupil autofocus control, when the pupil autofocus control has been performed according to the predetermined operation, the display control unit performs the control to display no pupil frame until focusing is achieved.

(4)
The imaging apparatus according to (2) or (3), in which
the pupil detection frame and the pupil focus frame are displayed in different colors.

(5)
The imaging apparatus according to any one of (1) to (4), in which
the predetermined operation is a half-pressing operation of a shutter button.

(6)
The imaging apparatus according to any one of (1) to (5), in which
a mode related to the pupil autofocus control is selectable between:
an auto mode in which it is automatically set which one of left and right pupils is to be a target for the pupil autofocus control; and
a fixed mode in which a pupil designated by a user operation is set as a target for the pupil autofocus control, and
in the moving image capturing mode, when the pupil is not in focus during the pupil autofocus control,
the display control unit performs the control to
display no pupil frame in the auto mode and
display the pupil frame in the fixed mode.

(7)
The imaging apparatus according to (6), in which
in the auto mode, a temporarily selected state is settable, so that the pupil autofocus control is performed with the target temporarily fixed to the pupil designated by the user operation, and
in the moving image capturing mode, when the pupil is not in focus during the pupil autofocus control, the display control unit performs the control to display the pupil frame in the temporarily selected state.

(8)

The imaging apparatus according to (1), in which
in the moving image capturing mode, when the pupil autofocus control has been performed, the display control unit performs the control to display a pupil detection frame as the pupil frame until focusing is achieved, and display a pupil focus frame, which is in a different display form from the pupil detection frame, as the pupil frame when focusing is achieved.

(9)

The imaging apparatus according to any one of (1) to (8), in which
an on/off setting is selectable as to whether to display a face frame when a face is detected by the detection unit, and
in the moving image capturing mode, the display control unit performs the control as to whether to display a face frame depending on whether the on setting or the off setting is selected.

(10)

The imaging apparatus according to (9), in which
a mode related to the pupil autofocus control is selectable between:
an auto mode in which it is automatically set which one of left and right pupils is to be a target for the pupil autofocus control; and
a fixed mode in which a pupil designated by a user operation is set as a target for the pupil autofocus control, and
in a case where the off setting is selected as to whether to display a face frame,
the display control unit performs the control to
display no face frame in the auto mode, and
display the pupil frame while displaying no face frame when the pupil is detected, regardless of whether or not focusing is achieved, in the fixed mode.

(11)

The imaging apparatus according to (10), in which
in the auto mode, a temporarily selected state is settable, so that the pupil autofocus control is performed with the target temporarily fixed to the pupil designated by the user operation, and
in a case where the off setting is selected as to whether to display a face frame, in the temporarily selected state, when the pupil is detected, the display control unit performs the control to display the pupil frame while displaying no face frame, regardless of whether or not focusing is achieved.

(12)

The imaging apparatus according to (10) or (11), in which
in a case where the off setting is selected as to whether to display a face frame, in the auto mode, when the pupil is in focus,
the display control unit performs the control to display the pupil frame while displaying no face frame.

(13)

The imaging apparatus according to any one of (1) to (12), in which
as one mode related to the pupil autofocus control, an auto mode is selectable to automatically set which one of left and right pupils is to be a target for the pupil autofocus control, in the auto mode, a temporarily selected state is settable, so that the pupil autofocus control is performed with the target temporarily fixed to a pupil designated by a user operation,
in the still image capturing mode, the temporarily selected state is released according to a release operation for giving an instruction to record a still image, and
in the moving image capturing mode, the temporarily selected state is released according to an operation different from the release operation.

(14)

The imaging apparatus according to any one of (1) to (13), in which
in the still image capturing mode, according to an operation for giving an instruction to operate autofocus on the pupil,
the autofocus control unit initiates the pupil autofocus control based on the detection of the pupil in the entire captured image, and
the display control unit displays a pupil focus frame as the pupil frame when focusing is achieved, and
in the moving image capturing mode, according to the operation,
the autofocus control unit switches an autofocus control with a face as a target to the pupil autofocus control based on the detection of the pupil in the entire captured image, and
the display control unit displays a pupil detection frame as the pupil frame when the pupil is detected.

(15)

The imaging apparatus according to any one of (1) to (14), in which
a touch operation is detectable on a screen where the captured monitor image is displayed,
in the still image capturing mode, the autofocus control unit performs the pupil autofocus control by tracking the pupil according to the touch operation, and
in the moving image capturing mode, the autofocus control unit performs the pupil autofocus control with respect to the pupil selected after tracking a face according to the touch operation.

(16)

The imaging apparatus according to (15), in which
in the still image capturing mode,
when the touch operation is performed on the face in the captured monitor image, the autofocus control unit performs the pupil autofocus control to track the pupil on a side close to a touch location, and
when the touch operation is performed on a portion other than the face in the captured monitor image, the autofocus control unit tracks a face close to a touch location and performs an autofocus control with respect to the face.

(17)

An imaging method performed by an imaging apparatus, including:
detection processing for detecting a pupil in a captured image;
autofocus control processing for executing a pupil autofocus control to perform autofocus on the pupil detected in the detection processing according to a predetermined operation in a still image capturing mode, and executing a pupil autofocus control when the pupil is detected in the detection processing in a moving image capturing mode; and display control processing for displaying a pupil frame indicating the pupil that is in focus on the captured monitor image when focusing is achieved by the pupil autofocus control.

(18)

A program causing an arithmetic processing device to execute:
detection processing for detecting a pupil in a captured image;
autofocus control processing for executing a pupil autofocus control to perform autofocus on the pupil detected in the detection processing according to a predetermined operation in a still image capturing mode, and executing a pupil autofocus control when the pupil is detected in the detection processing in a moving image capturing mode; and
display control processing for displaying a pupil frame indicating the pupil that is in focus on the captured monitor image when focusing is achieved by the pupil autofocus control.

REFERENCE SIGNS LIST

1 Imaging apparatus
2 Lens barrel
12 Imaging element
13 Camera signal processing unit
14 Recording control unit
16 Display unit
16 Output unit
17 Operation unit
18 Power supply unit
21 Lens system
22 Driver unit
23 Lens control unit
24 Operation unit
30 Camera control unit
31 Memory unit
51 AF distance measurement unit
52 AF control unit
53 Image recognition unit
54 Operation recognition unit
55 Display control unit
56 Assignable button setting unit
61 Face/pupil detection unit
62 Tracking processing unit
71 ISO sensitivity
72 Exposure value
73 Aperture value
74 Shutter Speed
75 Focus mark
76 Finder frame rate
77 Shutter scheme
78 Focus area
79 Focus mode
80 Drive mode
81 Imaging mode
82 Storage medium/number of pictures
83 Aspect ratio
84 Image size
85 Camera shake correction
86 Image quality
87 State-of-charge of battery
90 Focus frame
91 Tracking frame
150 Face frame
152 Pupil frame
155 Tracking icon
157 Switching display
100 Main body housing
101 Display panel
102 Viewfinder
103 Grasping unit
110 Operation element
110S Shutter button
110C Assignable button
110E Enter button
WDp Priority face frame
WDe Non-priority face frame
WHf Pupil focus frame
WHd Pupil detection frame

The invention claimed is:

1. An imaging apparatus, comprising:
processing circuitry configured to
detect a pupil in a captured image;
execute pupil autofocus control to perform autofocus on the detected pupil according to a predetermined operation in a still image capturing mode, and execute the pupil autofocus control when the pupil is detected in a moving image capturing mode; and
perform control to display a pupil frame indicating the pupil that is in focus, on the captured image, when focusing is achieved by the pupil autofocus control, the pupil frame being displayed differently depending on whether an imaging mode is the still image capturing mode or the moving image capturing mode.

2. The imaging apparatus according to claim 1, wherein in the still image capturing mode, the processing circuitry is further configured to perform the control to display a pupil focus frame as the pupil frame when focusing is achieved by the pupil autofocus control, and
in the moving image capturing mode, the processing circuitry is further configured to perform the control to display a pupil detection frame, which is in a different display form from the pupil focus frame, as the pupil frame when focusing is achieved by the pupil autofocus control.

3. The imaging apparatus according to claim 1, wherein in the still image capturing mode, when it is automatically set which one of left and right pupils is to be a target for the pupil autofocus control, and when the pupil autofocus control has been performed according to the predetermined operation, the processing circuitry is further configured to perform the control to display no pupil frame until focusing is achieved.

4. The imaging apparatus according to claim 2, wherein the pupil detection frame and the pupil focus frame are displayed in different colors.

5. The imaging apparatus according to claim 1, wherein the predetermined operation is a half-pressing operation of a shutter button.

6. The imaging apparatus according to claim 1, wherein a mode related to the pupil autofocus control is selectable between (1) an auto mode in which it is automatically set which one of left and right pupils is to be a target for the pupil autofocus control, and (2) a fixed mode in which a pupil designated by a user operation is set as a target for the pupil autofocus control, and
in the moving image capturing mode, when the pupil is not in focus during the pupil autofocus control, the processing circuitry is further configured to perform the control to display no pupil frame in the auto mode and display the pupil frame in the fixed mode.

7. The imaging apparatus according to claim 6, wherein
in the auto mode, a temporarily selected state is settable, so that the pupil autofocus control is performed with the target temporarily fixed to the pupil designated by the user operation, and
in the moving image capturing mode, when the pupil is not in focus during the pupil autofocus control, the processing circuitry is further configured to perform the control to display the pupil frame in the temporarily selected state.

8. The imaging apparatus according to claim 1, wherein
in the moving image capturing mode, when the pupil autofocus control has been performed, the processing circuitry is further configured to perform the control to display a pupil detection frame as the pupil frame until focusing is achieved, and display a pupil focus frame, which is in a different display form from the pupil detection frame, as the pupil frame when focusing is achieved.

9. The imaging apparatus according to claim 1, wherein
an on/off setting is selectable as to whether to display a face frame when a face is detected by the processing circuitry, and
in the moving image capturing mode, the processing circuitry is further configured to perform the control as to whether to display a face frame depending on whether the on setting or the off setting is selected.

10. The imaging apparatus according to claim 9, wherein
a mode related to the pupil autofocus control is selectable between (1) an auto mode in which it is automatically set which one of left and right pupils is to be a target for the pupil autofocus control, and (2) a fixed mode in which a pupil designated by a user operation is set as a target for the pupil autofocus control, and
when the off setting is selected as to whether to display a face frame, the processing circuitry is further configured to perform the control to display no face frame in the auto mode, and display the pupil frame while displaying no face frame when the pupil is detected, regardless of whether or not focusing is achieved, in the fixed mode.

11. The imaging apparatus according to claim 10, wherein
in the auto mode, a temporarily selected state is settable, so that the pupil autofocus control is performed with the target temporarily fixed to the pupil designated by the user operation, and
when the off setting is selected as to whether to display a face frame, in the temporarily selected state, when the pupil is detected, the processing circuitry is further configured to perform the control to display the pupil frame while displaying no face frame, regardless of whether or not focusing is achieved.

12. The imaging apparatus according to claim 10, wherein
when the off setting is selected as to whether to display a face frame, in the auto mode, when the pupil is in focus, the processing circuitry is further configured to perform the control to display the pupil frame while displaying no face frame.

13. The imaging apparatus according to claim 1, wherein
as one mode related to the pupil autofocus control, an auto mode is selectable to automatically set which one of left and right pupils is to be a target for the pupil autofocus control,
in the auto mode, a temporarily selected state is settable, so that the pupil autofocus control is performed with the target temporarily fixed to a pupil designated by a user operation,
in the still image capturing mode, the temporarily selected state is released according to a release operation for giving an instruction to record a still image, and
in the moving image capturing mode, the temporarily selected state is released according to an operation different from the release operation.

14. The imaging apparatus according to claim 1, wherein
in the still image capturing mode, according to an operation for giving an instruction to operate autofocus on the pupil, the processing circuitry is further configured to initiate the pupil autofocus control based on the detection of the pupil in the entire captured image, and display a pupil focus frame as the pupil frame when focusing is achieved, and
in the moving image capturing mode, according to the operation, the processing circuitry is further configured to switch an autofocus control with a face as a target to the pupil autofocus control based on the detection of the pupil in the entire captured image, and display a pupil detection frame as the pupil frame when the pupil is detected.

15. The imaging apparatus according to claim 1, wherein
a touch operation is detectable on a screen where the captured image is displayed,
in the still image capturing mode, the processing circuitry is further configured to perform the pupil autofocus control by tracking the pupil according to the touch operation, and
in the moving image capturing mode, the processing circuitry is further configured to perform the pupil autofocus control with respect to the pupil selected after tracking a face according to the touch operation.

16. The imaging apparatus according to claim 15, wherein
in the still image capturing mode,
when the touch operation is performed on the face in the captured monitor image, the processing circuitry is further configured to perform the pupil autofocus control to track the pupil on a side close to a touch location, and
when the touch operation is performed on a portion other than the face in the captured monitor image, the processing circuit is further configured to track a face close to a touch location and perform an autofocus control with respect to the face.

17. An imaging method performed by an imaging apparatus, comprising:
detection processing for detecting a pupil in a captured image;
autofocus control processing for executing a pupil autofocus control to perform autofocus on the detected pupil according to a predetermined operation in a still image capturing mode, and executing the pupil autofocus control when the pupil is detected in a moving image capturing mode; and
display control processing to display a pupil frame indicating the pupil that is in focus on the captured image, when focusing is achieved by the pupil autofocus control, the pupil frame being displayed differently depending on whether an imaging mode is the still image capturing mode or the moving image capturing mode.

18. A non-transitory computer-readable medium storing a program causing an arithmetic processing device to execute a method, comprising:
detection processing to detect a pupil in a captured image;
autofocus control processing to execute a pupil autofocus control to perform autofocus on the detected pupil according to a predetermined operation in a still image capturing mode, and executing a pupil autofocus control when the pupil is detected in a moving image capturing mode; and display control processing to display a pupil frame indicating the pupil that is in focus on the captured image, when focusing is achieved by the pupil autofocus control, the pupil frame being displayed differently depending on whether an imaging mode is the still image capturing mode or the moving image capturing mode.

* * * * *